US012595111B2

(12) United States Patent
Sollie et al.

(10) Patent No.: US 12,595,111 B2
(45) Date of Patent: Apr. 7, 2026

(54) MODULAR SHIPPING ASSEMBLY WITH INSULATOR WRAP AND INNER INSULATOR BOXES

(71) Applicant: Pratt Corrugated Holdings, Inc., Brookhaven, GA (US)

(72) Inventors: Greg Sollie, Sharpsburg, GA (US); Shifeng Chen, Newport News, VA (US); Jamie Waltermire, Peachtree City, GA (US); Paul Ott, Atlanta, GA (US); Merritt E. Meeks, Newnan, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 0 days.

(21) Appl. No.: 19/224,534

(22) Filed: May 30, 2025

(65) Prior Publication Data

US 2025/0368423 A1 Dec. 4, 2025

Related U.S. Application Data

(60) Provisional application No. 63/655,450, filed on Jun. 3, 2024.

(51) Int. Cl.
*B65D 81/38* (2006.01)
*B31B 50/00* (2017.01)

(52) U.S. Cl.
CPC ..... *B65D 81/3823* (2013.01); *B65D 81/3825* (2013.01); *B65D 81/3858* (2013.01); *B65D 81/386* (2013.01); *B31B 50/0044* (2017.08)

(58) Field of Classification Search
CPC ............ B65D 81/3823; B65D 81/3825; B65D 81/3858; B65D 81/386; F25D 3/00;
(Continued)

(56) References Cited

U.S. PATENT DOCUMENTS 1,481,333 A 1/1924 Agar
1,527,167 A * 2/1925 Birdseye ............ B65D 81/3858 229/103.11

(Continued)

FOREIGN PATENT DOCUMENTS

DE 2640582 3/1978
DE 3116499 11/1982

(Continued)

OTHER PUBLICATIONS

Sollie, Greg; Requirement for Restriction/Election for U.S. Appl. No. 19/224,547, filed May 30, 2025, mailed Jun. 30, 2025, 6 pgs.

(Continued)

*Primary Examiner* — Orlando E Aviles
*Assistant Examiner* — Brijesh V. Patel
(74) *Attorney, Agent, or Firm* — Taylor Duma LLP

(57) ABSTRACT

A shipping assembly for transporting refrigerated items includes an outer box defining an outer box cavity, a bottom insulator box assembly received in the outer box cavity superposed above the bottom panel, an insulated inner box positioned in the outer box cavity above the bottom insulated box assembly, the insulated inner box defining a ridge and an inner box cavity, wherein ridge panels and retention flaps of the outer box engage end panels of the insulated inner box such that the insulated inner box is retained in a position spaced from outer box side panels, with an insulation wrap occupying the space between the insulated inner box and the outer box walls. A top insulator box assembly is partially received in the inner box cavity, such that overhang portions of a top panel of the top insulator box assembly rest upon the ridge of the insulated inner box.

19 Claims, 25 Drawing Sheets

(58) Field of Classification Search
CPC ... F25D 3/125; F25D 3/06; F25D 3/08; F25D 3/14; F25D 2303/082–084; F25D 2303/8041; F25D 2303/0843–0845; B31B 50/0044
USPC ..... 220/592.25, 921, 23.87, DIG. 9; 62/371; 229/103.11, 122.32, 167, 939, 199, 229/122.34
See application file for complete search history.

(56) References Cited

U.S. PATENT DOCUMENTS 1,677,565 A * 7/1928 Oppenheim ............. B65D 5/58 229/122.32
1,682,410 A * 8/1928 Oppenheim ......... B65D 5/5035 206/521
2,165,327 A * 7/1939 Zalkind .................... B65D 5/58 229/199
2,632,311 A * 3/1953 Sullivan .................. F25D 3/125 220/62.13
2,717,114 A 9/1955 Parham, Jr.
2,927,720 A * 3/1960 Adams ............... B65D 81/3858 229/193
3,051,345 A 8/1962 Flynn
3,197,111 A 7/1965 Kozlowski et al.
3,348,667 A 10/1967 Beeby
3,465,948 A 9/1969 Boyer
3,756,496 A 9/1973 Oostdik
3,770,184 A 11/1973 Rockefeller
3,880,341 A * 4/1975 Bamburg ............... B65D 5/566 229/122.32
3,985,288 A 10/1976 Bell
3,986,656 A 10/1976 November
4,017,351 A 4/1977 Larson et al.
4,094,454 A 6/1978 Snyder
4,105,154 A 8/1978 Meyers et al.
4,194,678 A 3/1980 Jasper
4,219,146 A 8/1980 Skaggs et al.
4,272,008 A 6/1981 Wozniacki
4,287,250 A 9/1981 Rudy
4,294,359 A 10/1981 Berkel
4,415,398 A 11/1983 Ottaviano
4,469,272 A 9/1984 Mcfadden et al.
4,869,599 A 9/1989 Allen
4,895,250 A 1/1990 Schifrin
4,896,766 A 1/1990 Paley
4,951,867 A 8/1990 Mcmanus
5,002,188 A 3/1991 Dickie
5,277,955 A * 1/1994 Schelhorn ............... B32B 27/12 428/220
5,316,210 A 5/1994 Scullin
5,848,509 A 12/1998 Knapp et al.
5,967,406 A 10/1999 Moorman
6,164,526 A 12/2000 Dalvey
6,191,057 B1 * 2/2001 Patel ....................... B32B 27/12 428/68
6,227,442 B1 5/2001 Evans, Jr.
6,279,300 B1 8/2001 Simhaee
6,293,459 B1 9/2001 Burch, Jr.
6,295,830 B1 * 10/2001 Newman ............ B65D 81/3823 62/388
6,325,281 B1 * 12/2001 Grogan .............. B65D 81/3862 229/122.34
6,357,504 B1 * 3/2002 Patel ..................... E04B 1/7662 156/499
6,579,586 B1 * 6/2003 Fay ......................... E04B 1/767 52/406.1
D480,646 S 10/2003 Borchard et al.
6,684,591 B2 2/2004 Jean
6,868,982 B2 * 3/2005 Gordon .............. B65D 81/3823 220/592.25
7,252,868 B2 * 8/2007 Suda ......................... B32B 5/24 156/247
7,255,910 B1 8/2007 Seckel
7,293,694 B2 11/2007 Weimer, Jr.
7,533,774 B2 5/2009 Zimmerman
7,544,267 B2 * 6/2009 Suda ......................... B32B 5/24 428/36.1
D596,031 S 7/2009 Wehrmann
7,597,208 B2 10/2009 Wang
7,625,828 B2 * 12/2009 Suda ....................... B32B 29/02 442/164
7,780,886 B2 * 8/2010 Lembo .................... E04B 1/767 428/292.1
7,785,685 B2 8/2010 Fay
D633,792 S 3/2011 Wehrmann
7,913,842 B2 3/2011 Evans
7,935,410 B2 5/2011 Orologio
7,935,411 B2 5/2011 Orologio
D640,557 S 6/2011 Wehrmann
8,033,405 B2 10/2011 Wang
8,033,448 B2 10/2011 Breitfeld et al.
8,181,788 B2 5/2012 Meneses
8,951,376 B2 2/2015 Rasmussen
9,017,799 B2 4/2015 Chu et al.
9,429,350 B2 * 8/2016 Chapman, Jr. ............ F25D 3/00
9,669,966 B2 6/2017 Ruijssenaars et al.
10,189,227 B2 1/2019 Sachdev et al.
10,843,840 B2 * 11/2020 Sollie ................... B65D 5/5028
10,882,682 B2 * 1/2021 Collison ................ D21H 13/14
11,027,875 B2 6/2021 Sollie et al.
11,066,228 B2 7/2021 Sollie et al.
11,132,986 B2 9/2021 Sachdev et al.
11,137,190 B2 * 10/2021 Martino ............. B65D 81/3862
11,247,806 B2 2/2022 Sollie et al.
11,254,469 B2 2/2022 Herbeck et al.
11,352,191 B2 6/2022 Buhl et al.
11,414,247 B1 8/2022 Philips et al.
11,472,625 B2 * 10/2022 Mirzaee Kakhki .... B65D 81/18
11,511,927 B2 11/2022 Madanagopal et al.
11,634,266 B2 * 4/2023 Kulangara ............. B65D 81/18 220/592.2
11,724,851 B2 8/2023 Sollie et al.
11,731,826 B2 8/2023 Blezard et al.
11,760,555 B2 9/2023 Madanagopal et al.
11,820,578 B2 11/2023 Kagimoto et al.
11,884,470 B2 1/2024 Brewster et al.
D1,015,869 S 2/2024 Blezard et al.
11,891,229 B1 2/2024 Madigan, Jr.
11,939,135 B2 3/2024 Kilmer et al.
11,952,198 B2 4/2024 Streiff et al.
11,953,262 B2 4/2024 Blezard et al.
11,964,795 B2 4/2024 Longley et al.
12,038,227 B2 7/2024 Waltermire et al.
2001/0031339 A1 10/2001 Johnson
2003/0008093 A1 1/2003 Ray
2007/0000983 A1 * 1/2007 Spurrell ............. B65D 81/3858 229/5.84
2007/0051782 A1 3/2007 Lantz
2007/0122584 A1 * 5/2007 Song ......................... B32B 5/16 428/71
2009/0193765 A1 * 8/2009 Lantz ................... B65D 5/0005 220/592.2
2011/0042449 A1 * 2/2011 Copenhaver ......... B65D 81/382 229/120.01
2011/0094907 A1 4/2011 Meynard
2011/0127318 A1 6/2011 Philips
2011/0174824 A1 7/2011 Potts et al.
2011/0290796 A1 12/2011 Burgess
2011/0318522 A1 12/2011 Mueller et al.
2012/0031957 A1 2/2012 Whitaker
2012/0125039 A1 5/2012 Hwang et al.
2012/0273506 A1 11/2012 Adams et al.
2012/0279896 A1 * 11/2012 Lantz ..................... B65D 25/16 53/473
2014/0021208 A1 * 1/2014 Anti ....................... A01N 1/148 220/592.25
2014/0144161 A1 5/2014 Pointer et al.
2016/0046404 A1 2/2016 Cheeser et al.
2016/0185482 A1 6/2016 Youell et al.
2016/0185483 A1 6/2016 Youell et al.
2017/0043937 A1 * 2/2017 Lantz ..................... B65D 81/09

(56) References Cited

U.S. PATENT DOCUMENTS

| | | | | |
|---|---|---|---|---|
| 2018/0051460 | A1* | 2/2018 | Sollie | E04B 1/7608 |
| 2018/0117886 | A1 | 5/2018 | Wilson | |
| 2018/0334308 | A1* | 11/2018 | Moore | B65D 65/38 |
| 2019/0185246 | A1* | 6/2019 | Sollie | B65D 5/68 |
| 2019/0210790 | A1* | 7/2019 | Rizzo | F25D 3/06 |
| 2019/0367209 | A1* | 12/2019 | Jobe | B65D 81/3834 |
| 2020/0031556 | A1 | 1/2020 | Jobe | |
| 2020/0148453 | A1* | 5/2020 | Sollie | B65D 81/3823 |
| 2020/0346816 | A1* | 11/2020 | Sollie | B65D 5/68 |
| 2021/0114766 | A1 | 4/2021 | Dhadda et al. | |
| 2021/0163792 | A1 | 6/2021 | Lu et al. | |
| 2021/0291480 | A1 | 9/2021 | Opuszko et al. | |
| 2021/0300665 | A1* | 9/2021 | Melchor | B65D 81/3827 |
| 2022/0026140 | A1* | 1/2022 | Waltermire | B65D 25/28 |
| 2022/0081152 | A1 | 3/2022 | Sollie et al. | |
| 2022/0089353 | A1* | 3/2022 | Mangelsen | F25D 3/08 |
| 2022/0153505 | A1 | 5/2022 | Mccarthy et al. | |
| 2022/0411167 | A1 | 12/2022 | Sollie et al. | |
| 2023/0089954 | A1 | 3/2023 | Rivett et al. | |
| 2023/0093285 | A1 | 3/2023 | Lee et al. | |
| 2023/0117239 | A1* | 4/2023 | Madanagopal | B65D 65/466 |
| 2023/0257157 | A1 | 8/2023 | Sollie et al. | |
| 2023/0322466 | A1 | 10/2023 | Sollie et al. | |
| 2023/0322469 | A1 | 10/2023 | Taraschewski et al. | |
| 2023/0322471 | A1 | 10/2023 | Madanagopal et al. | |
| 2023/0339669 | A1 | 10/2023 | Blezard et al. | |
| 2024/0025623 | A1 | 1/2024 | Madanagopal et al. | |
| 2024/0052640 | A1 | 2/2024 | Garris | |
| 2024/0083658 | A1* | 3/2024 | Chaliotis | F25D 3/08 |
| 2025/0368426 | A1 | 12/2025 | Sollie et al. | |

FOREIGN PATENT DOCUMENTS

| | | | |
|---|---|---|---|
| DE | 1881480 | | 8/2025 |
| FR | 1358881 | | 4/1964 |
| GB | 713640 | A | 2/1951 |
| GB | 2488509 | | 9/2012 |
| GB | 2501863 | | 11/2013 |
| WO | 2004113073 | | 12/2004 |
| WO | 2021046395 | | 3/2021 |
| WO | 2025254977 | | 12/2025 |

OTHER PUBLICATIONS

BubbleWrap Brand Packaging Recycled Content Cushioning. Available online:, sealedair.com/products/protective-packaging/recycled-bubble (Year: 2024).

Recycled Grade—12" Small (1/8) American Bubble Boy Bubble Wrap—350—AmericanBubbleBoy, Site visited: Jul. 15, 2024. Available online:, https://www.americanbubbleboy.com/products/recycled-grade-12-small-1-8-american-bubble-boy-wrap-350-square-feet (Year: 2024).

Sollie, Greg; Non-Final Office Action for U.S. Appl. No. 19/224,547, filed May 30, 2025, mailed Sep. 16, 2025, 29 pgs.

Sollie, Greg; International Search Report and Written Opinion for PCT Application PCT/US25/31829, filed May 30, 2025, mailed Oct. 16, 2025, 32 pgs.

Sollie, Greg; Final Office Action for No. U.S. Appl. No. 19/224,547, filed May 30, 2025, mailed Jan. 2, 2026, 20 pgs.

* cited by examiner

MODULAR SHIPPING ASSEMBLY WITH INSULATOR WRAP AND INNER INSULATOR BOXES

CROSS-REFERENCE TO RELATED APPLICATION

This application claims the benefit of U.S. Provisional Patent Application Ser. No. 63/655,450, filed Jun. 3, 2024, the disclosure of which is hereby incorporated by reference herein in its entirety.

TECHNICAL FIELD

Field of Use

This disclosure relates to boxes. More specifically, this disclosure relates to an insulated packaging assembly.

Related Art

Boxes are commonly used to ship food. The food shipped can be a single perishable item or a combination of perishable items, such as meat products sold by companies such as Omaha Steaks®. For many reasons it is desirable to maintain such products in a refrigerated condition during shipment.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a shipping assembly for transporting refrigerated items, comprising an outer box defining a bottom and an outer box cavity; a bottom insulator box assembly received in the outer box cavity and superposed above the bottom of the outer box, the bottom insulator box assembly comprising a closed box defining a bottom insulator box cavity; an insulated inner box positioned in the outer box cavity above the bottom insulator box assembly, the insulated inner box defining an inner box cavity, an outer periphery, and a ridge; an insulation wrap positioned in the outer box cavity, the insulation wrap surrounding the outer periphery of the insulated inner box, the insulation wrap comprising an insulation batt core defining a core surface and a sheet layer attached to the core surface; and a top insulator box assembly, comprising a top insulator box, wherein the top insulator box defines a top insulator box cavity, the top insulator box comprising a top panel defining a first overhang portion and a second overhang portion, wherein the ridge of the insulated inner box defines ridge end portions comprising a front ridge portion and an opposed rear ridge portion, a first side portion extending between the ridge end portions, and a second side portion extending between the ridge end portions opposite the first side portion.

In a further aspect, disclosed is a method of assembling a shipping assembly for transporting refrigerated items, comprising the steps of moving into an open position top flaps, a rear flap, and a front flap of an outer box, the outer box comprising a first outer box side panel and an opposed second outer box side panel, a rear panel, and a front panel, the first outer box side panel, the second outer box side panel, the rear panel, and the front panel together at least partially defining an outer box cavity; inserting a bottom insulator box assembly into the outer box cavity; inserting an insulated inner box into the outer box cavity above the bottom insulator box assembly, the insulated inner box defining an outer periphery and comprising a rear panel; positioning an insulation wrap about the outer periphery the insulated inner box; and pivoting the rear flap and the front flap of the outer box inwardly toward a closed position until the rear flap and the front flap engage the insulated inner box to restrain the insulated inner box within the outer box cavity, such that the rear panel of the insulated inner box is spaced from the first outer box side panel by a gap distance.

Various implementations described in the present disclosure can comprise additional systems, methods, features, and advantages, which might not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations can be realized and obtained by means of the systems, methods, features particularly pointed out in the appended claims. These and other features will become more fully apparent from the following description and appended claims, or can be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures can be designated by matching reference characters for the sake of consistency and clarity.

DETAILED DESCRIPTION

Figure 1A:
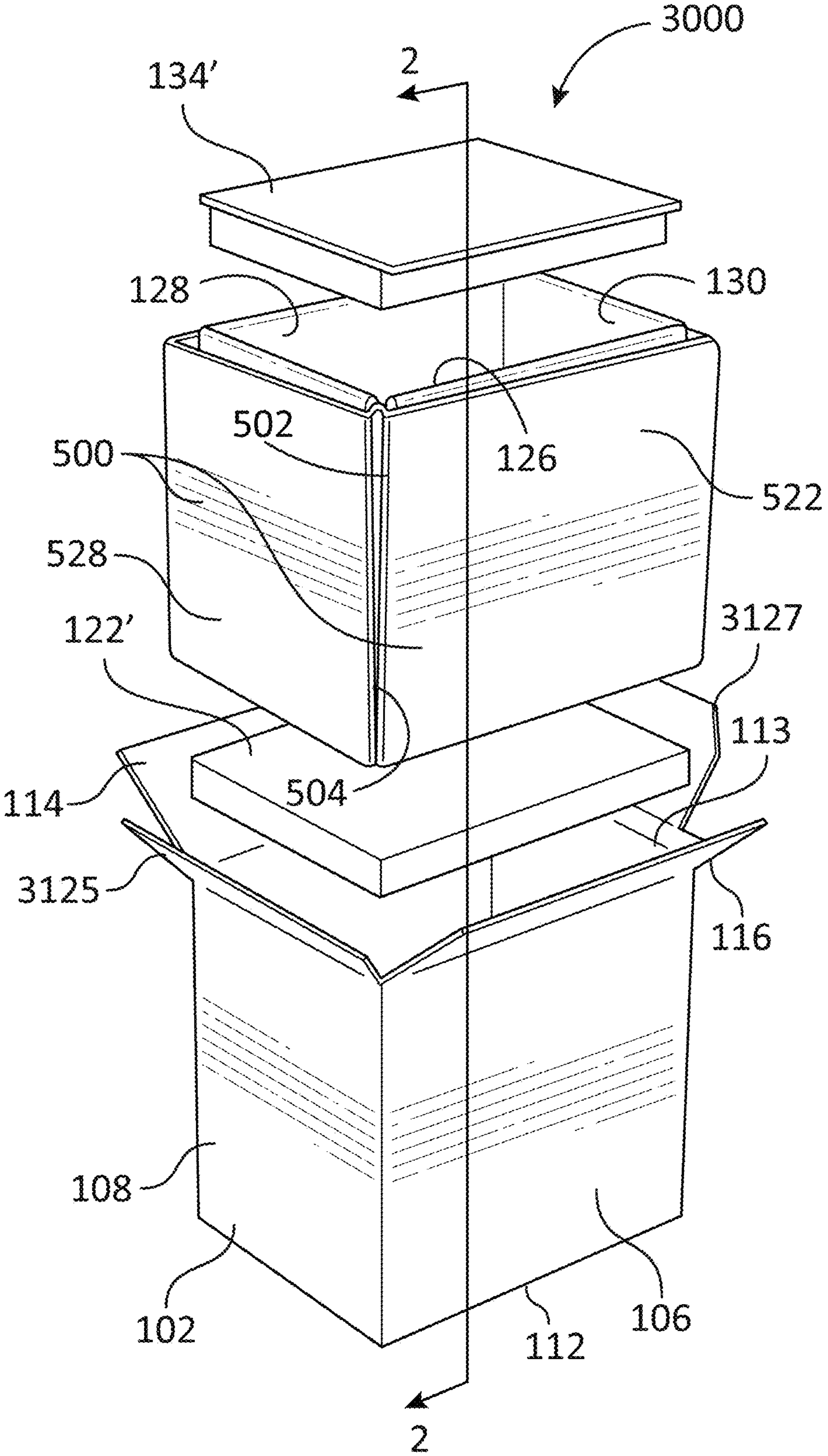
FIG. 1A is an exploded perspective view of a shipping assembly for transporting refrigerated items, the shipping assembly constructed in accordance with an aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms “a,” “an” and “the” include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a “widget” is referenced).

Ranges can be expressed herein as from “about” one particular value, and/or to “about” another particular value. When such a range is expressed, another aspect comprises from the one particular value and/or to the other particular value. Similarly, when values are expressed as approximations, by use of the antecedent “about” or “substantially,” it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" might be referenced. Unless stated otherwise, "front" describes that end of a blank or an assembled box or any portion thereof nearest to a primary or initial point of opening; "rear" is that end of the blank or the assembled box or any portion thereof that is opposite or distal the front; "left" is that which is to the left of or facing left from a person facing towards the front; and "right" is that which is to the right of or facing right from that same person facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

As disclosed in the figures disclosing blanks 300,400,410, 420, various line thicknesses and types can indicate certain characteristics of the geometry. In some aspects, a thicker solid line can indicate the edge of a part; a thinner solid line can indicate a bend line; a dash or dashed line can indicate a hidden edge (and edge covered by other geometry), a perforated cut or connection, or a boundary or boundaries of a detail view; a dot-dash line can indicate material that is cut away and not shown for clarity, and a double dot-dash line can indicate a boundary or boundaries of separately claimable elements. Unless otherwise specified, a geometric center of any thicker lines determine the shape and position of the disclosed geometry. Dimensions disclosed in the figures are recited in inches but are exemplary only, and it is contemplated that the blanks 300,400,410,420 and the shipping assembly 3000 formed therefrom can be any shape and size. In some aspects, for example and without limitation, the shipping assembly can be used for meat products such as those sold by Omaha Steaks®.

Overview of Shipping Assembly Components and the Outer Box 102

Figure 2:
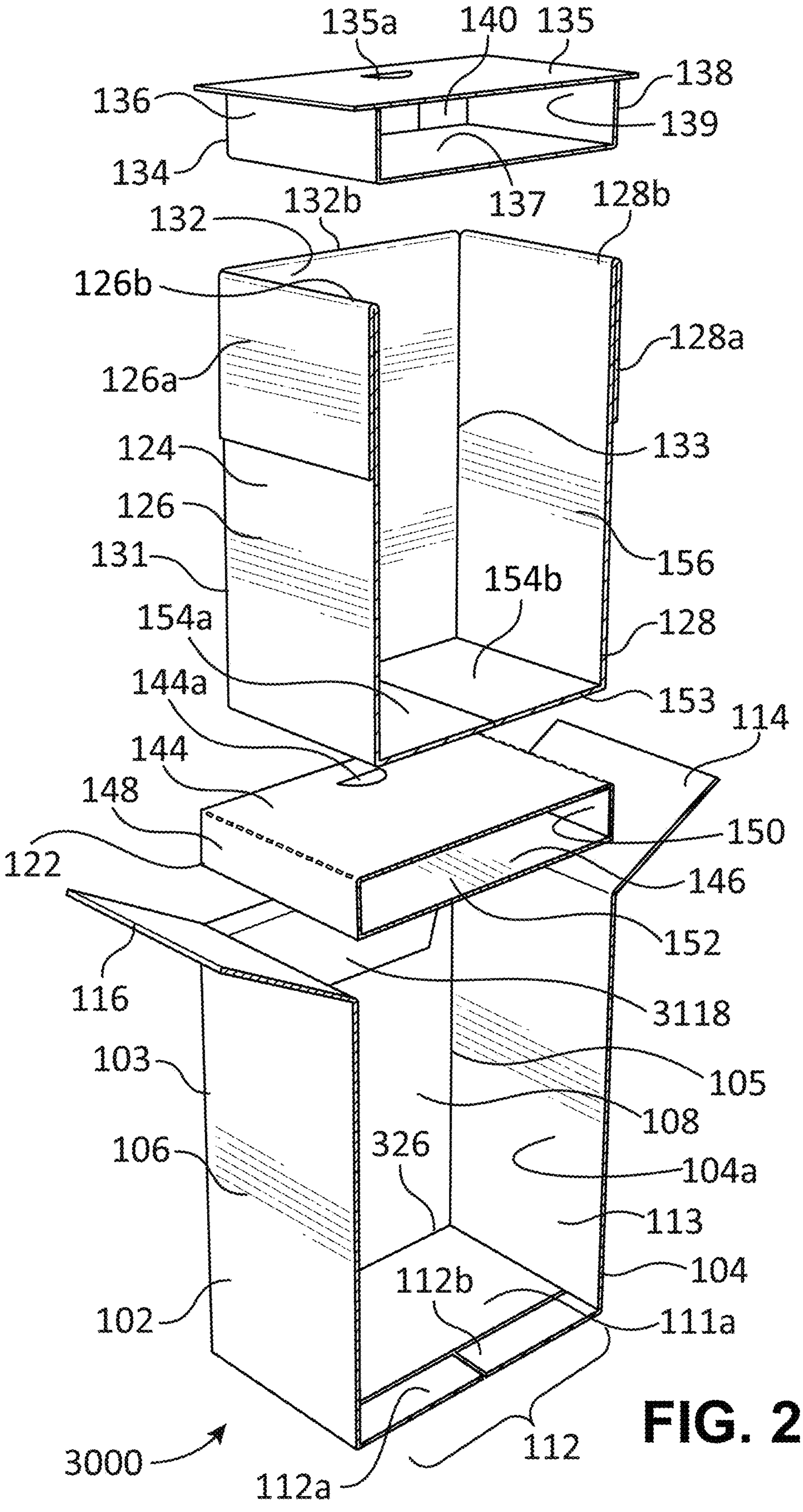
FIG. 2 is a sectional exploded view of the shipping assembly illustrated in FIG. 1A, taken along line 2-2 in FIG. 1A, except omitting the insulation wrap of FIGS. 1B and 1C for illustrative purposes.
Figure 3:
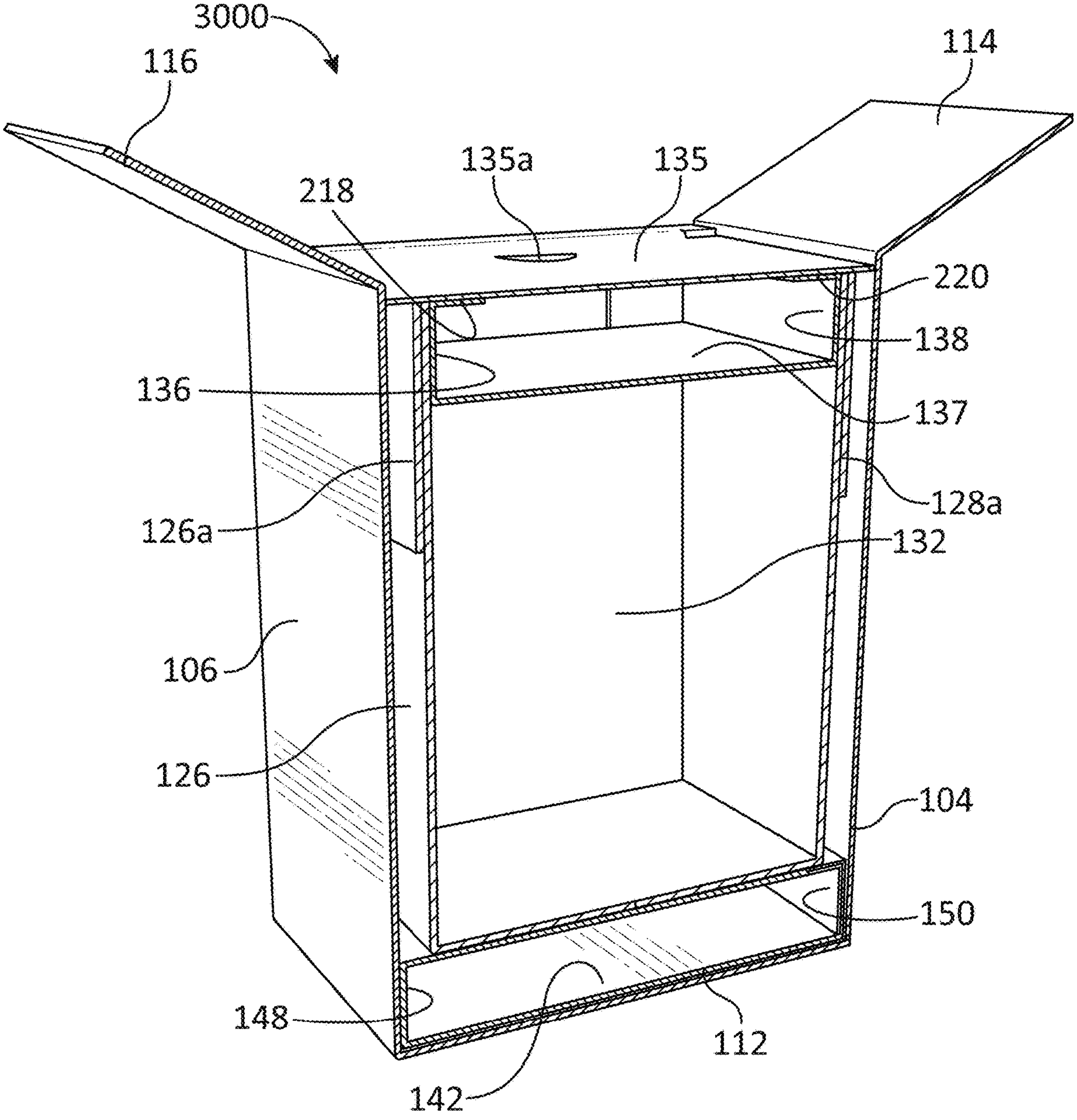
FIG. 3 is a sectional perspective view of the shipping assembly of FIG. 1A in a substantially assembled state except omitting the insulation wrap of FIGS. 1B and 1C for illustrative purposes.
Figure 4:
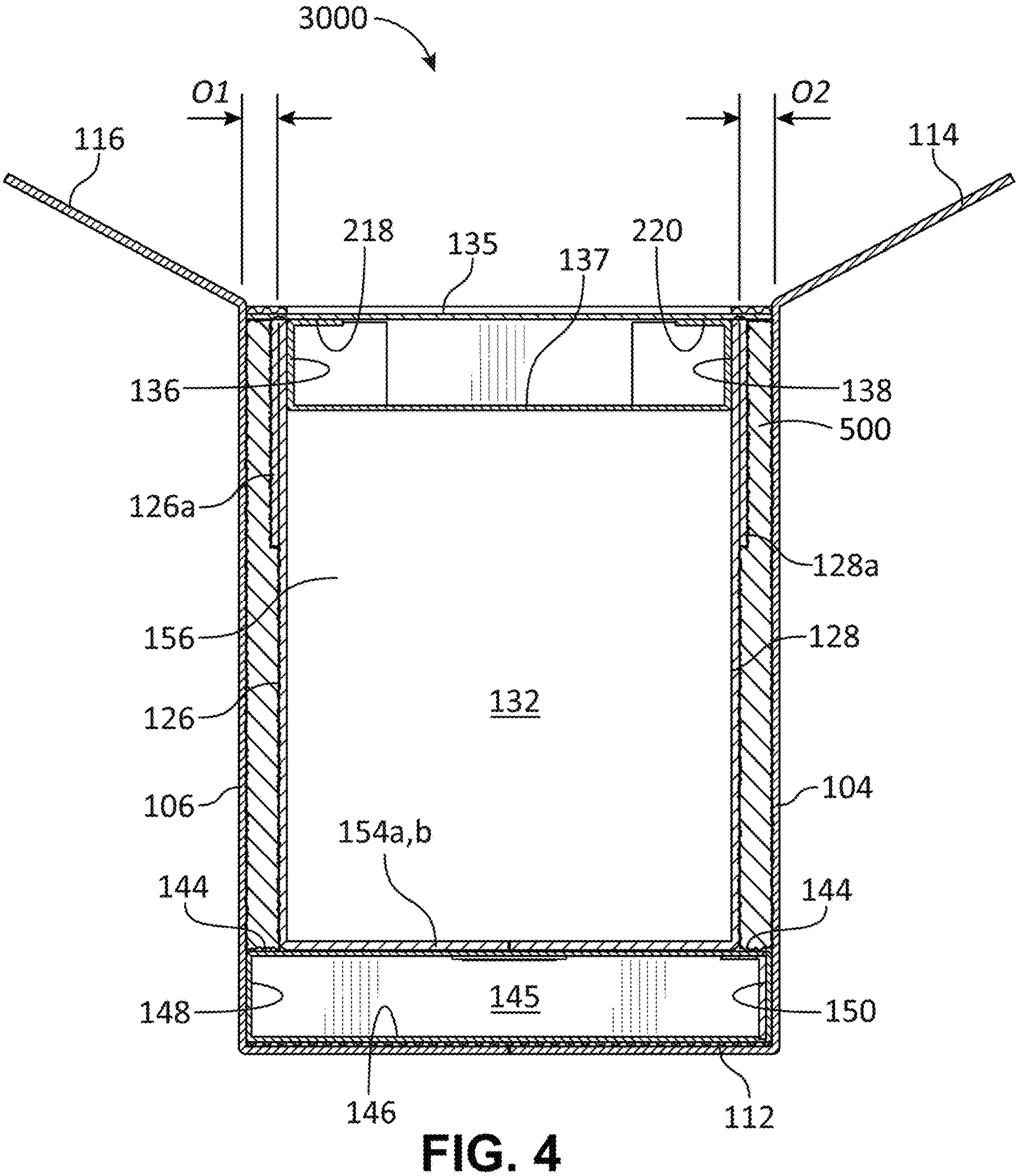
FIG. 4 is a front sectional view of the shipping assembly of FIG. 1A in a substantially assembled state.
Figure 5:
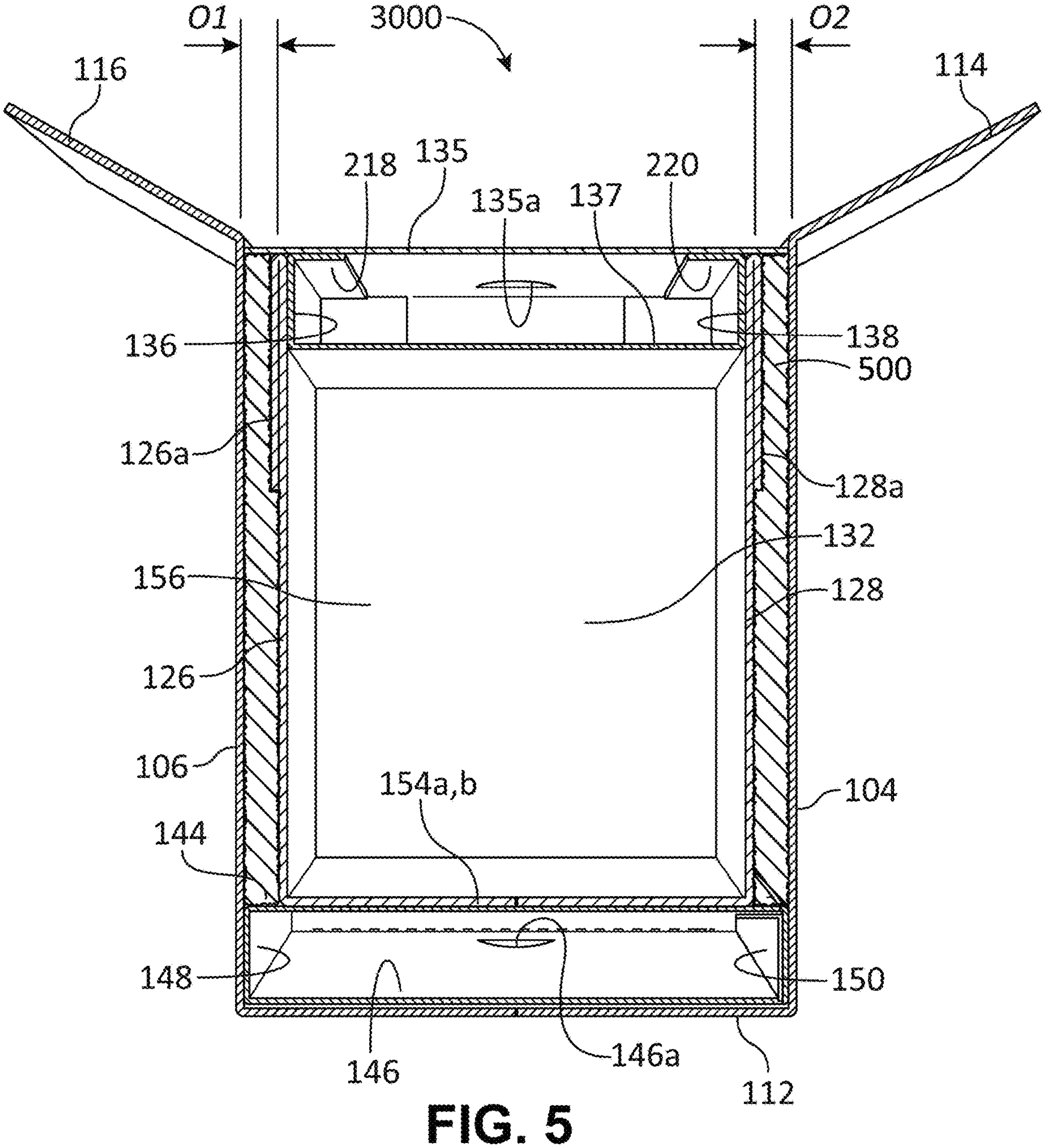
FIG. 5 is a sectional view similar to FIG. 4, except showing the shipping assembly rotated slightly upwardly to reveal more details of the underside of a top insulator box in the shipping assembly.
Figure 16:
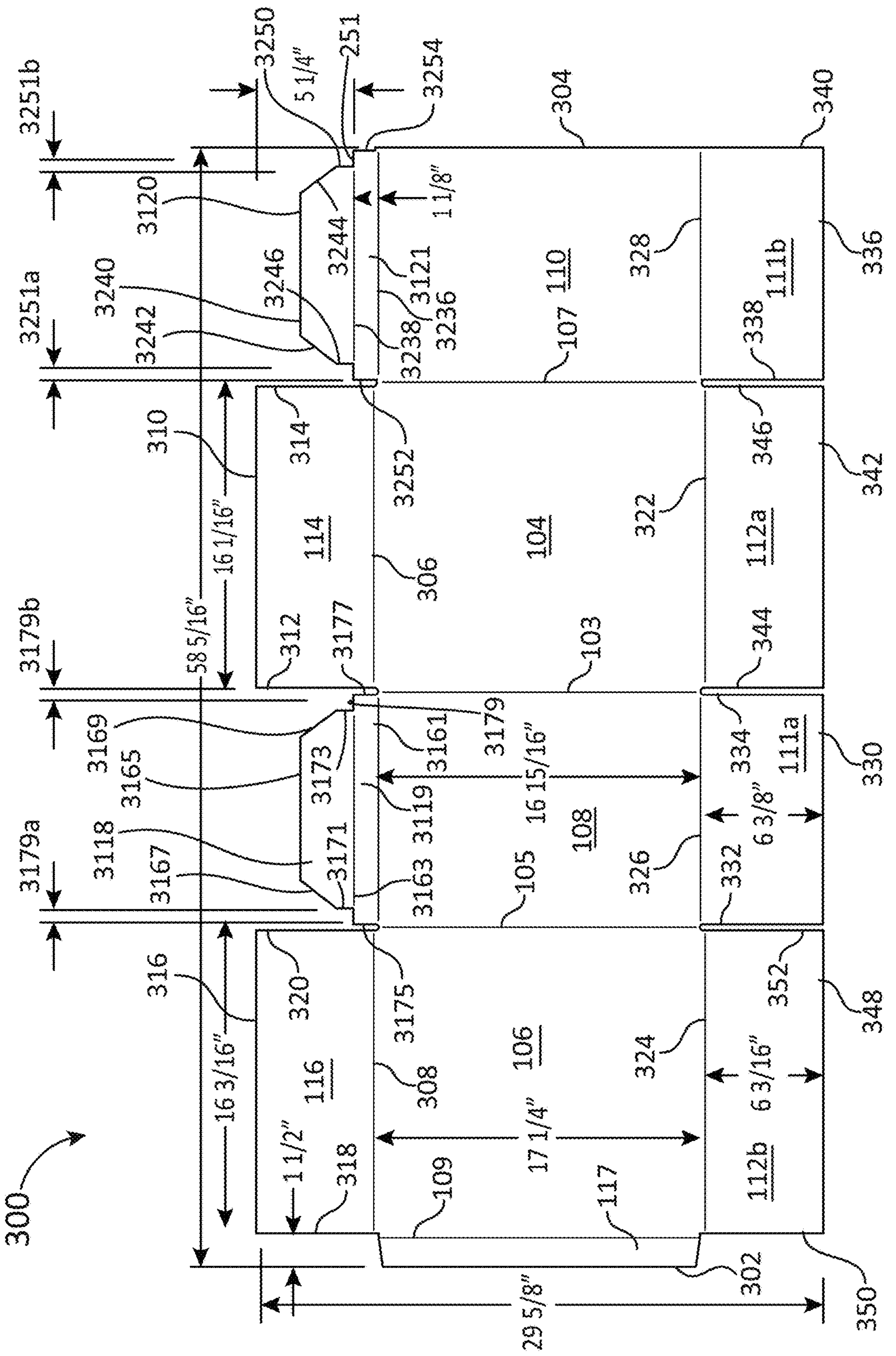
FIG. 16 is a top view of an outer box blank for the outer box illustrated in FIG. 1A, from the perspective of viewing the inside surface of the outer box blank.

FIG. 1A is an exploded view of a shipping assembly 3000 for transporting refrigerated items, according to two respective aspects of the present disclosure. The shipping assembly 3000 includes an outer box 102, assembled from an outer box blank 300, to be described in greater detail with regard to FIG. 16. The outer box 102 comprises a first outer box side panel 104 (FIG. 2), a second outer box side panel 106, a rear panel 108, a front panel 110, a bottom 112, a first top flap 114 joined to the first outer box side panel 104 by a fold line 306 (FIG. 16), and a second top flap 116 joined to the second outer box side panel 106 by a fold line 308 (FIG. 16). The side panels 104, 106, the rear panel 108, the front panel 110 (not shown), and the bottom 112 of the outer box 102 collectively define an outer box cavity 113 (also shown in FIGS. 2, 9A, and 10), which can be further defined upon closure of the top flaps 114, 116. As best seen in FIG. 2, the bottom 112 can comprise bottom flaps 112*a,b*, 111*a* and, although not shown, 111*b*. The top flaps 114,116 cover an upper opening of the outer box 102 that would otherwise be formed at the upper ends of the side panels 104, 106, the front panel 110 (not shown), and the rear panel 108. The outer box 102 additionally comprises rear and front retention flaps 3118,3120, respectively, joined to the top sides of the rear and front panels 108, 110, respectively. The retention flaps 3118,3120 are discussed in greater detail with regard to FIGS. 7 and 8. The outer box 102 of the present aspects can define a substantially rectangular cross-sectional shape (as best seen in FIGS. 3-5). However, in other aspects, the number of side and end panels can vary and/or the cross-section shape of the outer box 102 can vary—for example, the outer box 102 can define a triangular, square, or circular cross-sectional shape, or any other suitable cross-sectional shape. The outer box 102 can also comprise more or fewer top and bottom panels than those disclosed with regard to the present aspects of the current disclosure. The outer box 102 can be composed from corrugated cardboard and constructed as a regular slotted container (RSC), though other suitable materials for the outer box 102 are contemplated as being within the scope of the present disclosure.

The shipping assembly 3000 can, in some aspects, further comprise a bottom insulator box assembly 122', received in the outer box cavity 113 of the outer box 102 and superposed above the bottom 112 of the outer box 102. As used herein, "superposed above" encompasses arrangements in which a bottom of the bottom insulator box assembly 122' contacts at least a portion of the outer box bottom 112 and, alternatively, in which the bottom insulator box assembly 122' is spaced from the outer box bottom 112. The bottom insulator box assembly 122' includes a bottom insulator box 122 (FIG. 2) assembled from a bottom insulator box blank 410 (FIG. 18), the bottom insulator box 122 defining a bottom insulator box cavity 152 (FIG. 2). The bottom insulator box assembly 122' also includes a bottom insulation batt element 200 (FIGS. 11A and 12B) positioned within the bottom insulator box cavity 152. The positioning and composition of the bottom insulation batt element 200 are discussed in further detail herein with regard to FIG. 11A. In the assembled state of the shipping assembly 3000 exemplified in FIGS. 3-5, the bottom insulator box assembly 122' is positioned within the outer box cavity 113 and is superposed above the bottom 112 of the outer box 102.

Figure 9A:
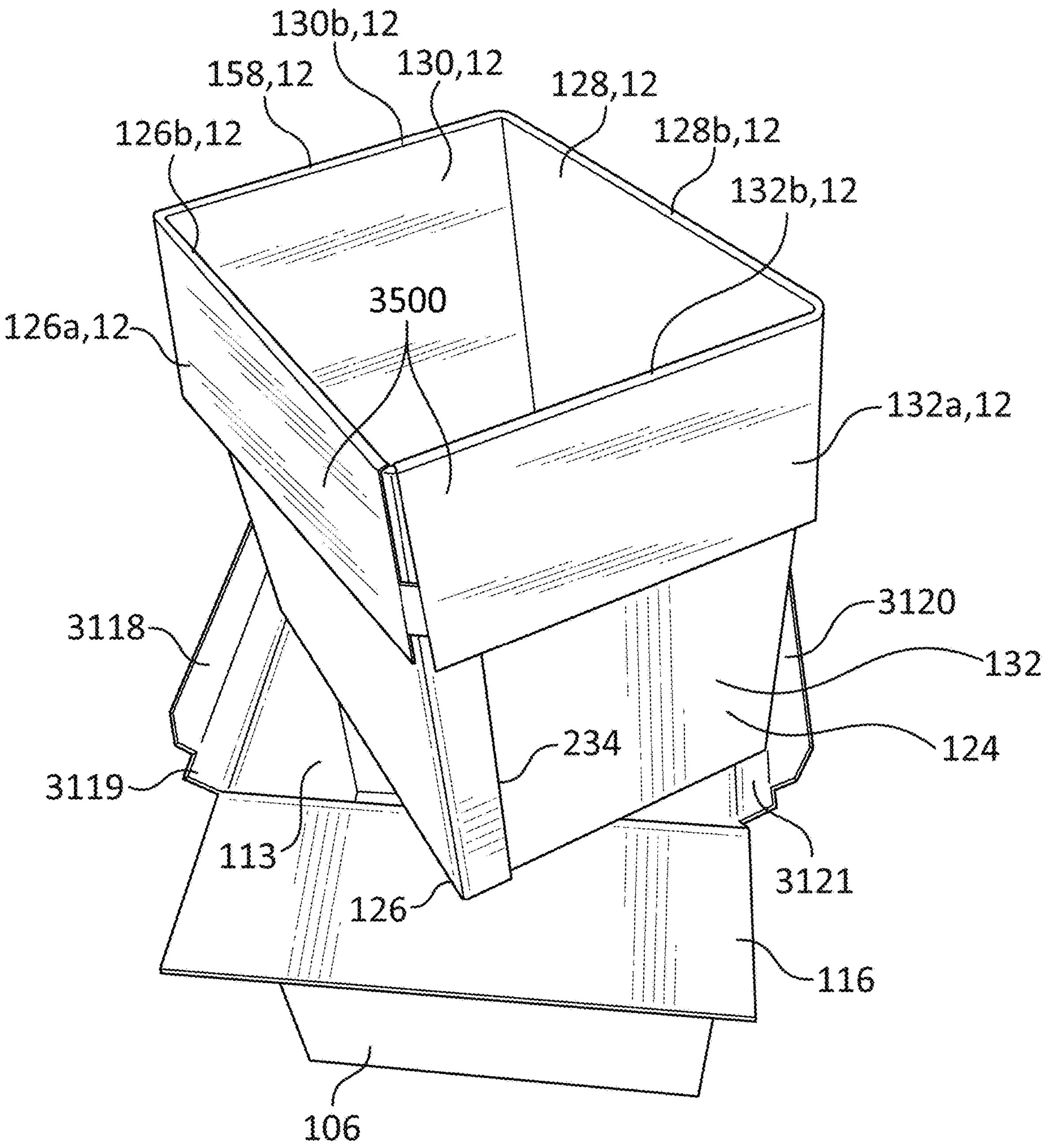
FIG. 9A is a perspective view of the insulated inner box shown in FIGS. 6-8.
Figure 9B:
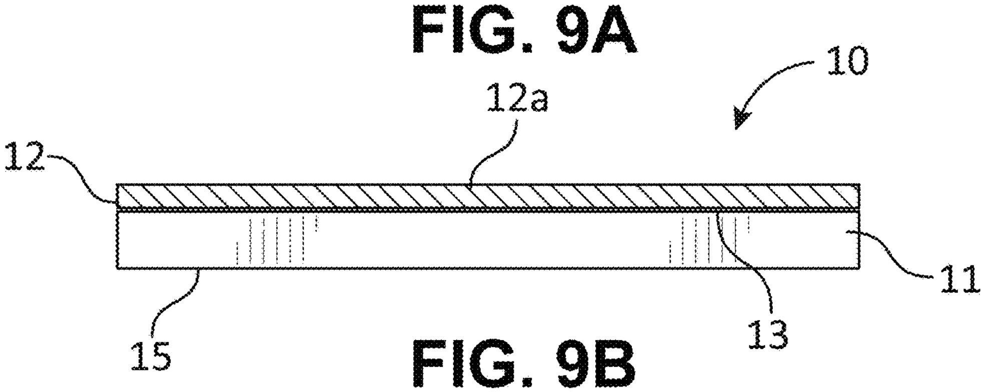
FIG. 9B is a cross sectional diagram showing a composite material comprising a thin repulpable insulation film superposed upon a cardboard layer, the composite material used in various components of the shipping assembly of FIG. 1A, including the insulated inner box of FIG. 9A.

In some aspects, the bottom insulator box 122 can be constructed of, with reference to FIG. 9B, an insulated material 10 such as a corrugated cardboard layer 11, the upper surface 13 of which is coated with a repulpable insulating film 12. Also as shown in FIG. 9B, the lower surface 15 of the corrugated cardboard layer 11 can remain uncoated. For all boxes disclosed herein that can be constructed of the insulated material 10, the side of the material 10 facing the cavity defined by the box is the coated side such that the exposed surface 12*a* of the repulpable insulating film 12 defines the inside surfaces of the box panels defining the cavity.

Referring now to FIGS. 1A and 2-5, the shipping assembly 3000 can, in some aspects, also include a top insulator box assembly 134' shown being partially received within the inner box cavity 156 of an insulated inner box 124 as well as completely received within the outer box cavity 113. The top insulator box assembly 134' includes a top insulator box 134 assembled from a top insulator box blank 420, discussed in greater detail herein with regard to FIG. 19. The top insulator box 134 comprises side panels 136, 138, a top panel 135, an end panel 140, a front panel 142, and a bottom panel 137, all of which collectively defines a top insulator box cavity 139. In some aspects, the insulated inner box 124 can be composed of the same insulated material 10 discussed above with regard to the bottom insulator box assembly 122' and the insulated inner box 124. Thus, the inside surfaces of each of these panels, that is, the surfaces facing the top insulator box cavity 139, are coated with the repulpable insulating film 12 discussed above with regard to FIG. 9B. The top insulator box assembly 134' also includes a top insulation batt element 201 (FIGS. 14A-14C) positioned within the top insulator box cavity 139. The positioning and composition of the top insulation batt element 201 are discussed in further detail herein with regard to FIGS. 14A-14C. In the assembled state of the shipping assembly 3000 exemplified in FIGS. 3-5, overhang portions O1 and O2 (FIGS. 4 and 13C) of the top panel 135 suspend the top insulator box assembly 134' above the bottom surface (bottom flaps 154*a,b*) of an insulated inner box 124, the box 124 described in further detail below.

The Insulated Inner Box 124 and the Insulation Wrap 500

Figure 17:
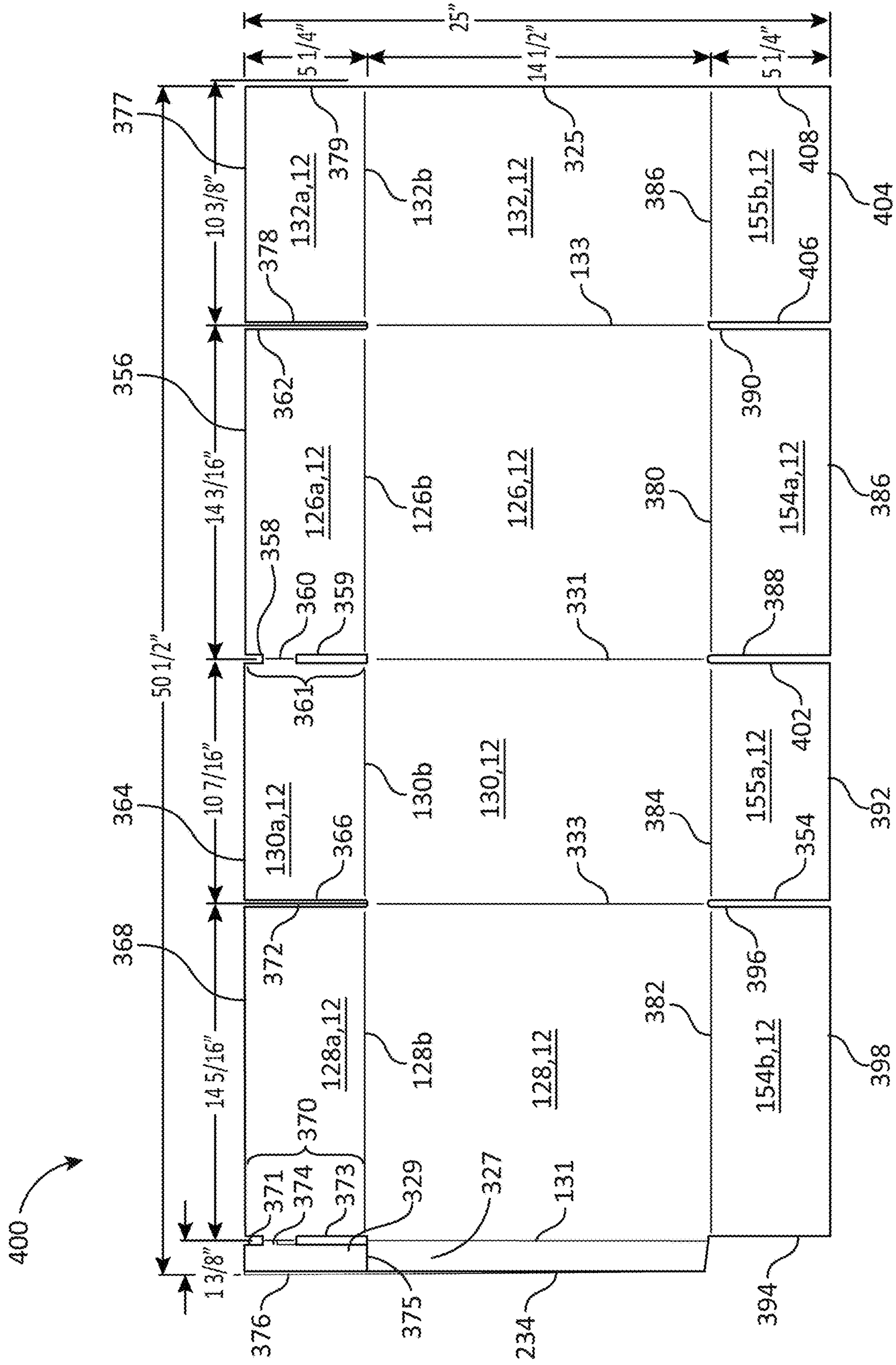
FIG. 17 is a top view of an insulated inner box blank for the insulated inner box best illustrated in FIGS. 1A, 2, and 9A, from the perspective of viewing the inside surface of the inner box blank.

Referring again to FIG. 1A, the shipping assembly 3000 can, in some aspects, further comprise an insulated inner box 124 positioned in the outer box cavity 113 above the bottom insulator box assembly 122'. As used herein, "above" encompasses arrangements in which a bottom 153 of the insulated inner box 124 contacts at least a portion of a top of the bottom insulator box assembly 122' and, alternatively, in which bottom 153 is spaced from the top of the bottom insulator box assembly 122'. The insulated inner box 124 comprises side panels 126, 130, end panels 130,132, and the bottom 153 comprised of bottom flaps 154*a,b* (FIG. 2), all of which partially define an inner box cavity 156 (FIGS. 2 and 4). The insulated inner box 124, which can be composed of the same insulated material 10 discussed above, can be assembled from an insulated inner box blank 400, discussed in greater detail with regard to FIG. 17. As best shown in FIGS. 1A and 9A, upper portions of the side panels 126, 128 and the end panels 130, 132 insulated inner box 124 are each folded outwardly at respective fold lines 126*b*, 128*b*, 130*b*, 132*b*, such that the exposed surface 12*a* (FIG. 9B) of the repulpable insulating film 12 coating each of those panels face outwardly, such panel portions labeled as 126*a*, 128*a*, 130*a*, 132*a* and designated as top flaps in the insulated inner box blank 400 (FIG. 17). In the assembled configuration of the insulated inner box 124 illustrated in FIGS. 1A and 9A, the fold lines 126*b*, 128*b*, 130*b*, 132*b* collectively define a ridge 158 (FIGS. 6, 7, and 9A) of the insulated inner box 124, with each of those fold lines defining a portion of the ridge 158. Also in this assembled configuration, the exterior surfaces of the panel portions labeled as 126*a*, 128*a*, 130*a*, 132*a* collectively define an outer periphery 3500 (FIG. 9A) of the insulated inner box 124. To the extent that the figures identified in this paragraph do not identify various panel edges and fold lines of the insulated inner box 124, these will be described herein with reference to the insulated inner box blank 400 (FIG. 17).

Figure 1B:
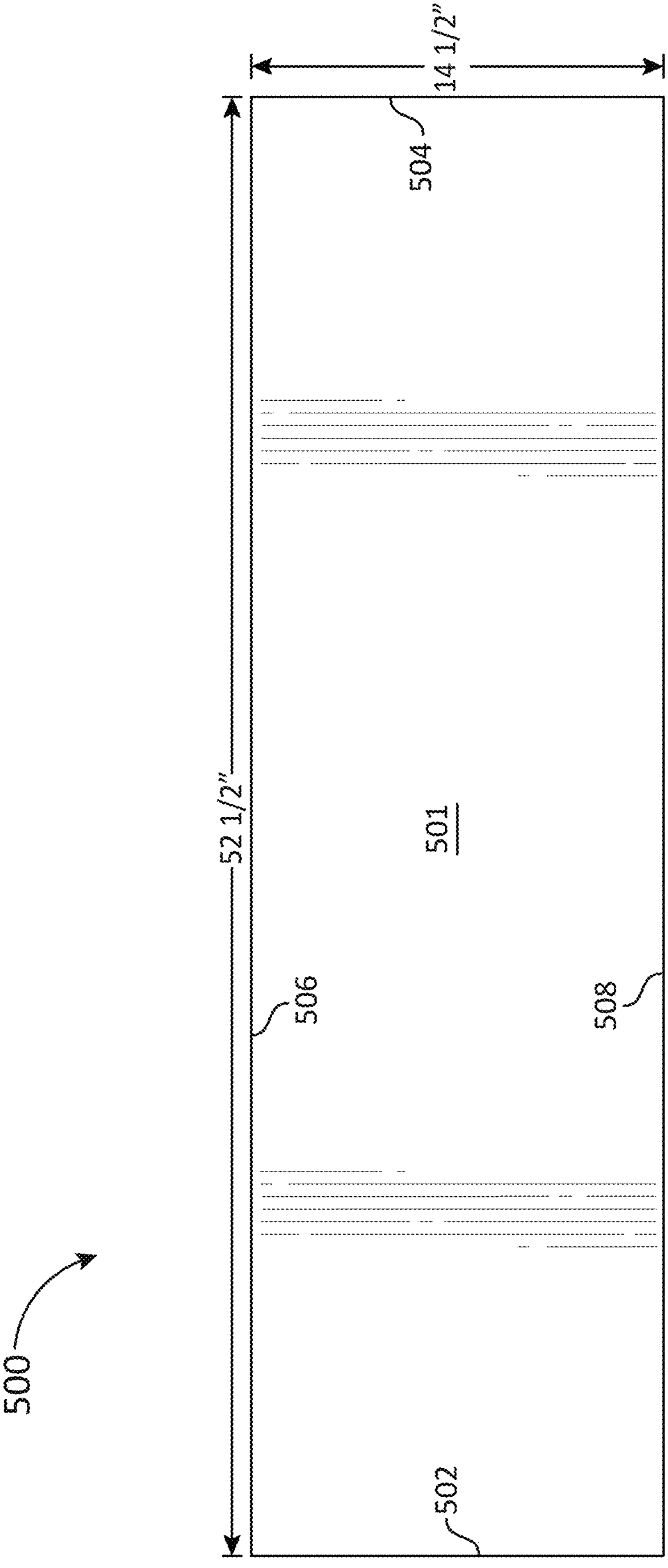
FIG. 1B is a side view of an insulation wrap for the shipping assembly of FIG. 1A.
Figure 1C:
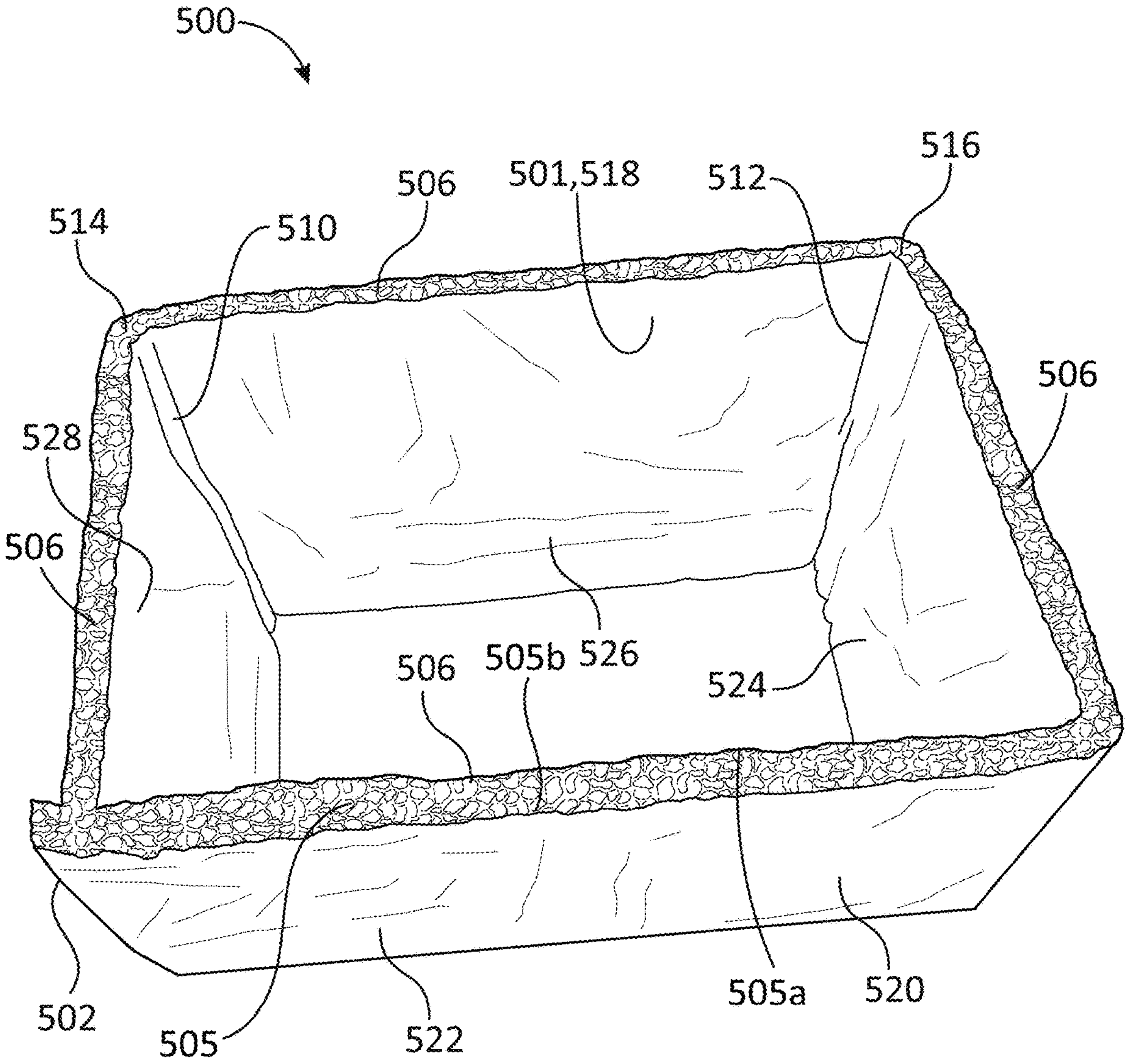
FIG. 1C is a top perspective view of the insulation wrap illustrated in FIG. 1B.

FIGS. 1A-1C disclose the construction of an insulator wrap 500 employed in the shipping assembly 3000 (FIG. 1A), with the insulator wrap 500 configured to be positioned around the outer periphery 3500 (FIG. 9A) of the insulated inner box 124. FIGS. 1B and 1C are side and top perspective views, respectively, of the insulator wrap 500. The insulation wrap 500 can, in some aspects, be composed of insulating batt material encapsulated within a paper casing. The insulation wrap 500 can assume the rectangular shape shown, comprising a top surface 506 a bottom surface 508, and opposed sides 502,504 each extending between the top surface 506 and the bottom surface 508. The insulation wrap 500 can comprise an insulation batt core 505 defining inner and outer core surfaces 505*a,b*, respectively. The insulation batt core 505 can comprise materials including, but not limited to, polyester film, such as polyethylene terephthalate (PET) film, foams, rubber, fiberglass, mineral wool, pellets, fabrics, nonwovens, polyethylene, polyurethane, polypropylene, paper, paper fiber, and any other suitable material that can contribute towards a cushioned and climate controlled protective layer in the insulation wrap 500. In some aspects, the insulation batt core 505 can be biodegradable, and in some aspects, the insulation batt core 505 can be compostable. In a particular aspect, the bottom insulation batt element 200 can be formed from R-4 poly encapsulated thermal 3000% recycled cotton, all of such materials discussed in U.S. Pat. No. 11,066,228 to Sollie et al., the disclosure of which is hereby incorporated by reference in its entirety.

Still referring to FIG. 1C, an inner sheet layer 518 is attached to the inner core surface 505*a*, the inner sheet layer 518 defining an inner surface 501 of the insulation wrap 500. Similarly, an outer sheet layer 520 is attached to the outer core surface 505*b*. The sheet layers 518,520 can be constructed of any of the paper-type materials, such as kraft paper, disclosed in U.S. Pat. No. 12,038,227, the disclosure of which is hereby expressly incorporated herein by reference in its entirety. The sheet layers 518,520 can be respectively attached to inner and outer core surface 505*a,b* in any suitable manner, such as by means of an adhesive. As so formed, the insulation wrap 500 can be bent at corners such as at 514,516 to form a rounded rectangle substantially conforming to the outer periphery 3500 (FIG. 9A) of the insulated inner box 124. In this configuration, the insulation wrap 500 can define a first side section 522, a first end section 524, a second side section 526, and a second end section 528.

Figure 8:
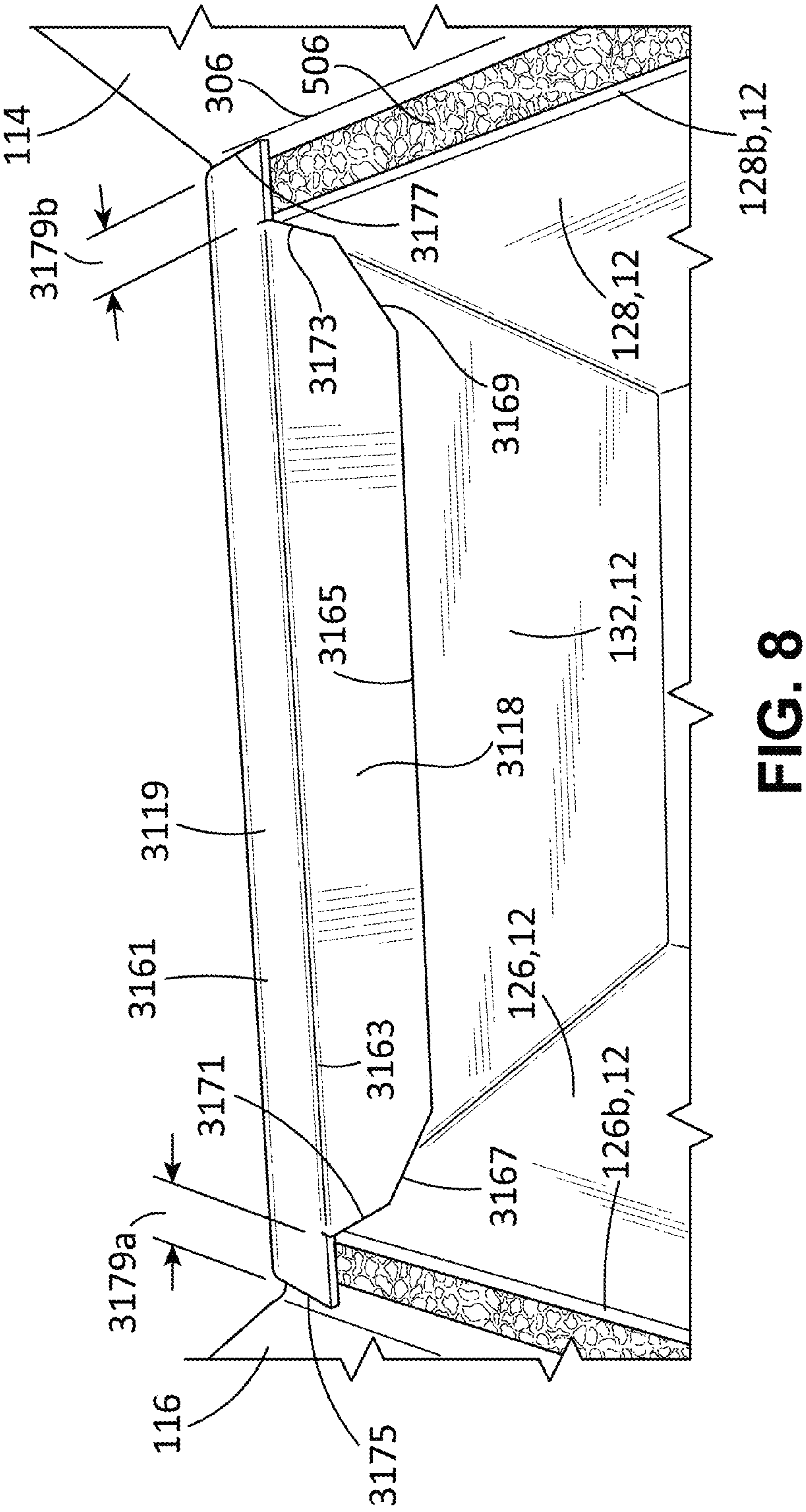
FIG. 8 is a front perspective view of a portion of the subassembly of FIG. 6, showing the rear flap illustrated in FIG. 7 moved to a fully closed position.
Figure 15B:
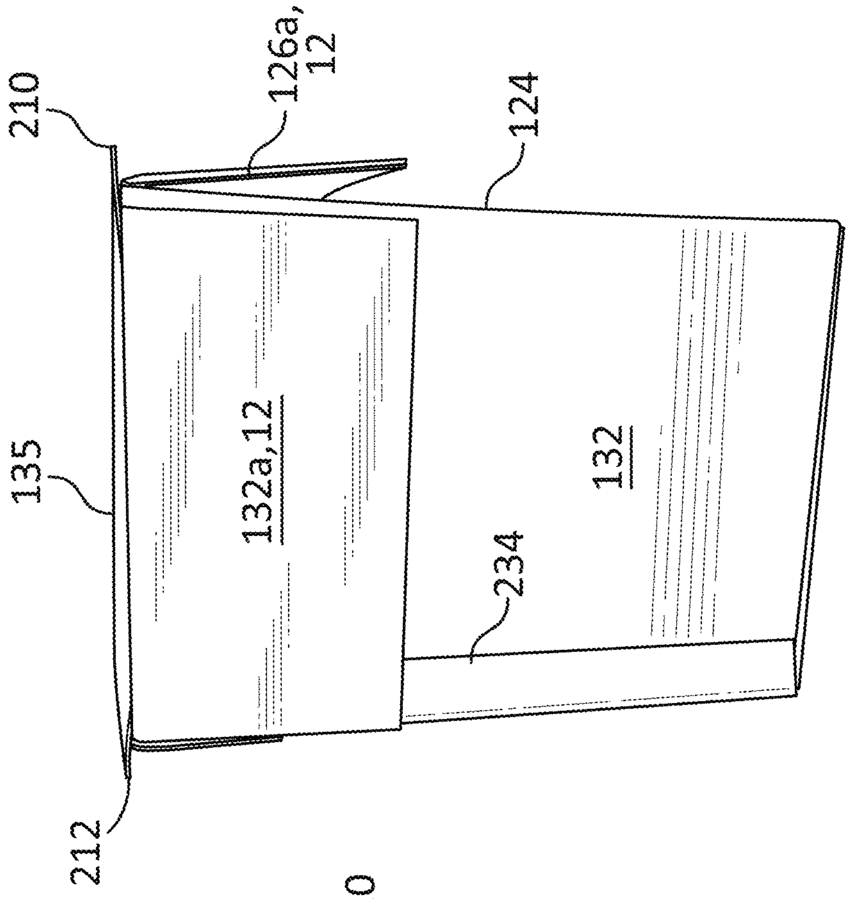
FIG. 15B is a rear perspective view of the subassembly illustrated in FIG. 15A.
Figure 15A:
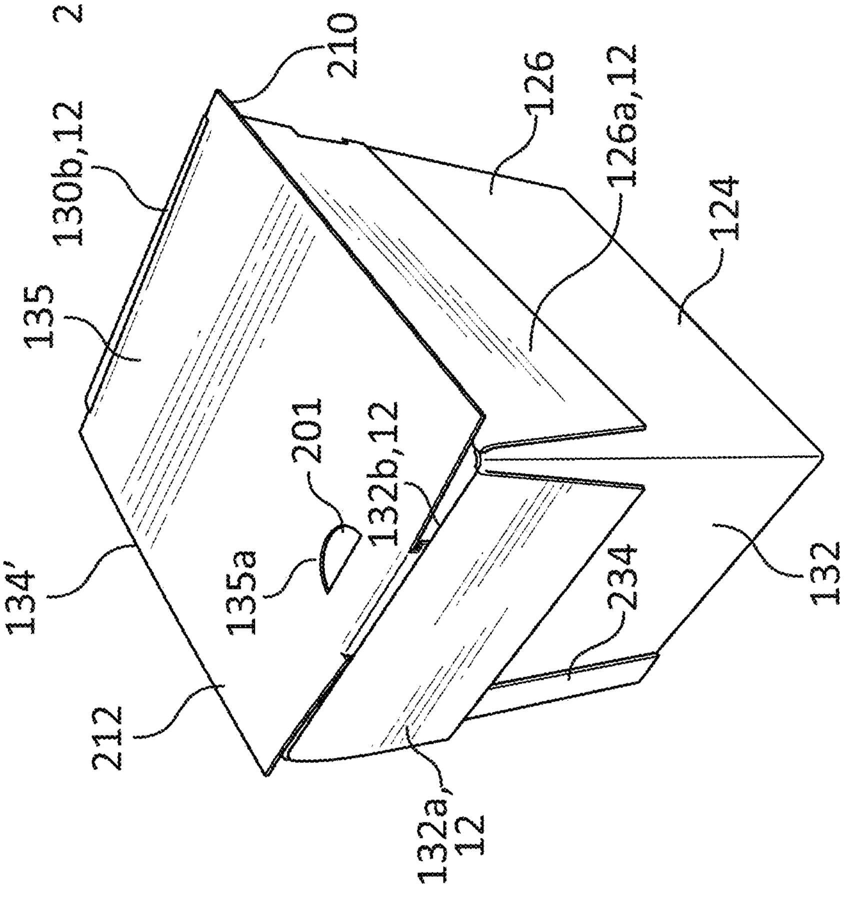
FIG. 15A is a perspective view of a subassembly comprising the top insulator box assembly of FIG. 13A seated partially within the insulated inner box illustrated in FIG. 1A.
Figure 15C:
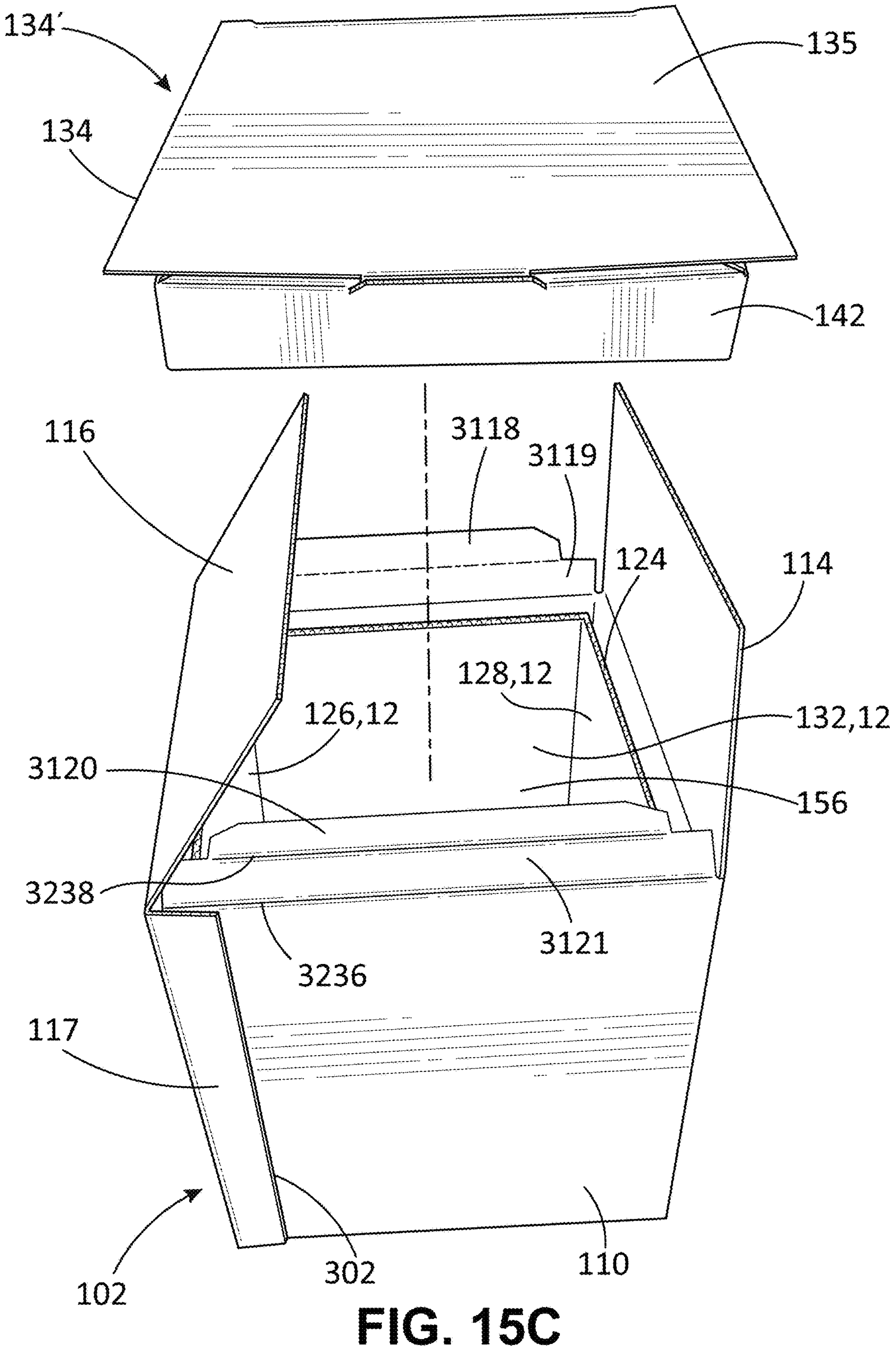
FIG. 15C is an exploded perspective view showing the components of the subassembly of FIGS. 15A and 15B in exploded relation to one another, with the insulated inner box seated within the outer box.

Once the insulated inner box 124 and the insulation wrap 500 are fully seated within the outer box cavity 113, the retention flaps 3118,3120 of the outer box 102 can be moved to a closed position to retain the insulated inner box 124 in a spaced relationship with respect to the side panels 104, 106 and the end panels 108,110 of the outer box 102, as discussed in greater detail with regard to FIGS. 8 and 15C.

The Top Insulator Box Assembly 134'

Figure 14A:
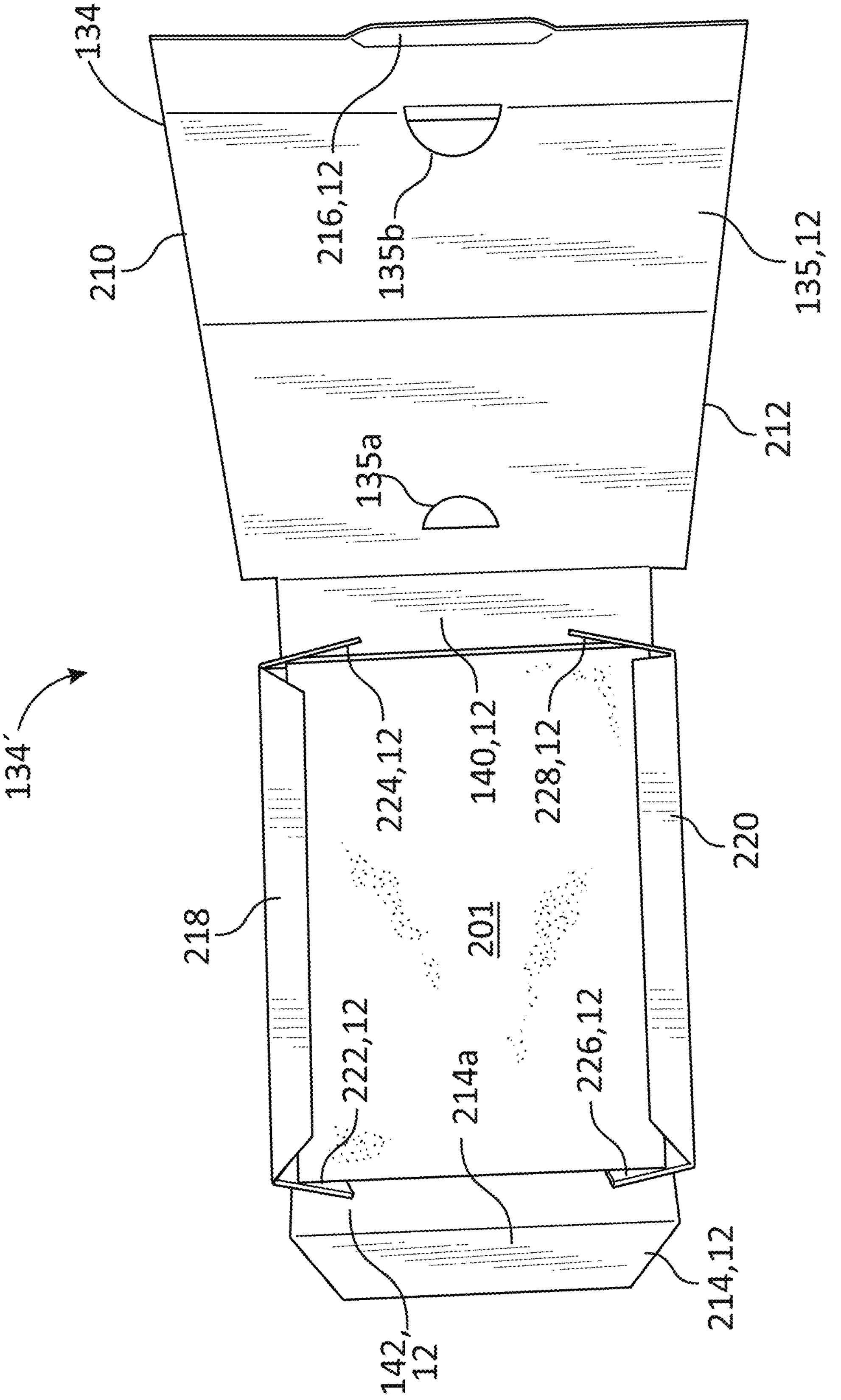
FIG. 14A is a top perspective view of the top insulator box assembly of FIG. 13A shown in a partially disassembled state to reveal a top insulation batt element contained therein.
Figure 14B:
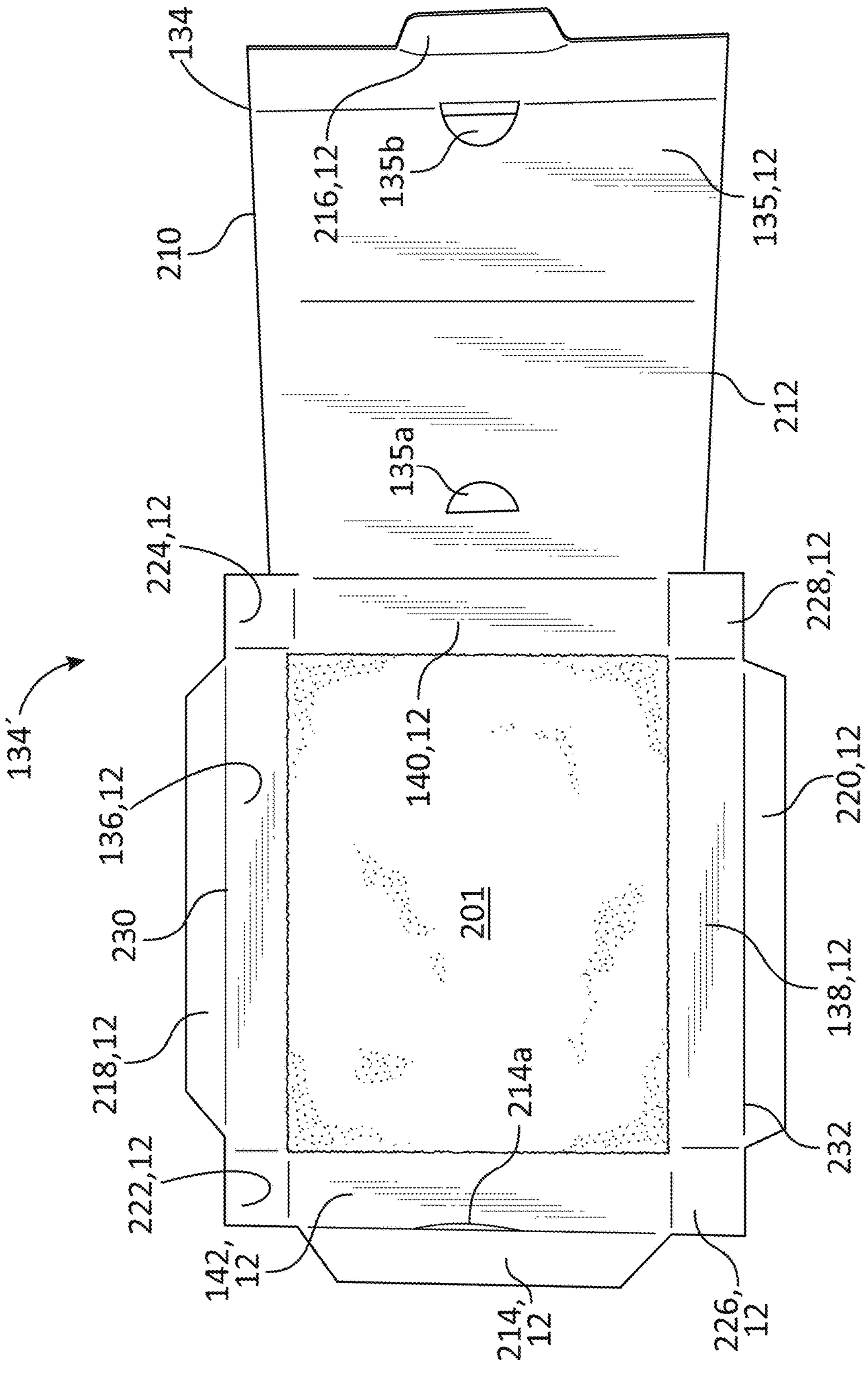
FIG. 14B is a top perspective view of the top insulator box assembly of FIG. 13A shown in a progressively further disassembled state than that depicted in FIG. 14A, such that the retention flaps of the top insulator box are shown in an unfolded position.
Figure 14C:
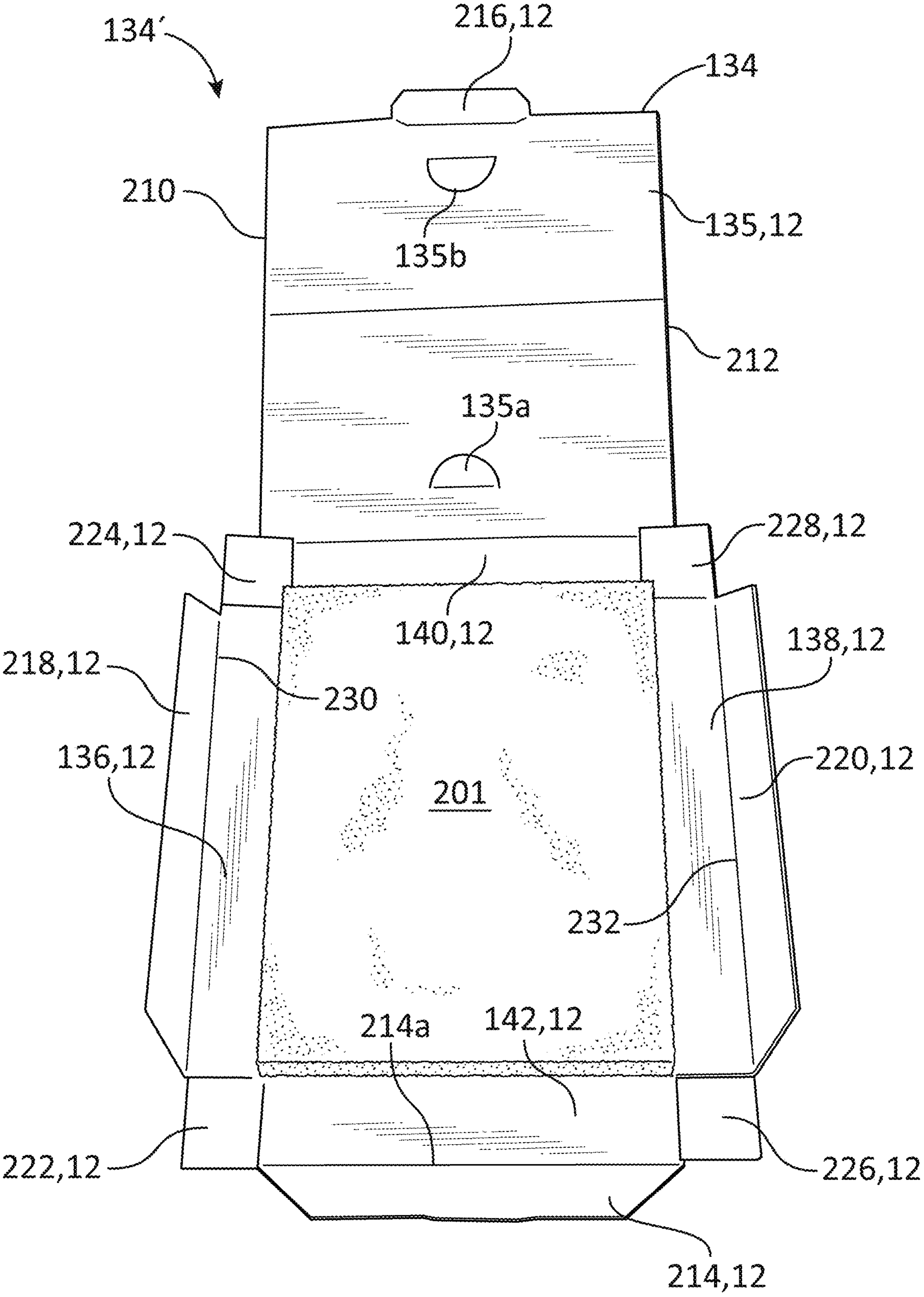
FIG. 14C is a front perspective view of the same state of disassembly of the top insulator box assembly depicted in FIG. 14B.
Figure 15D:
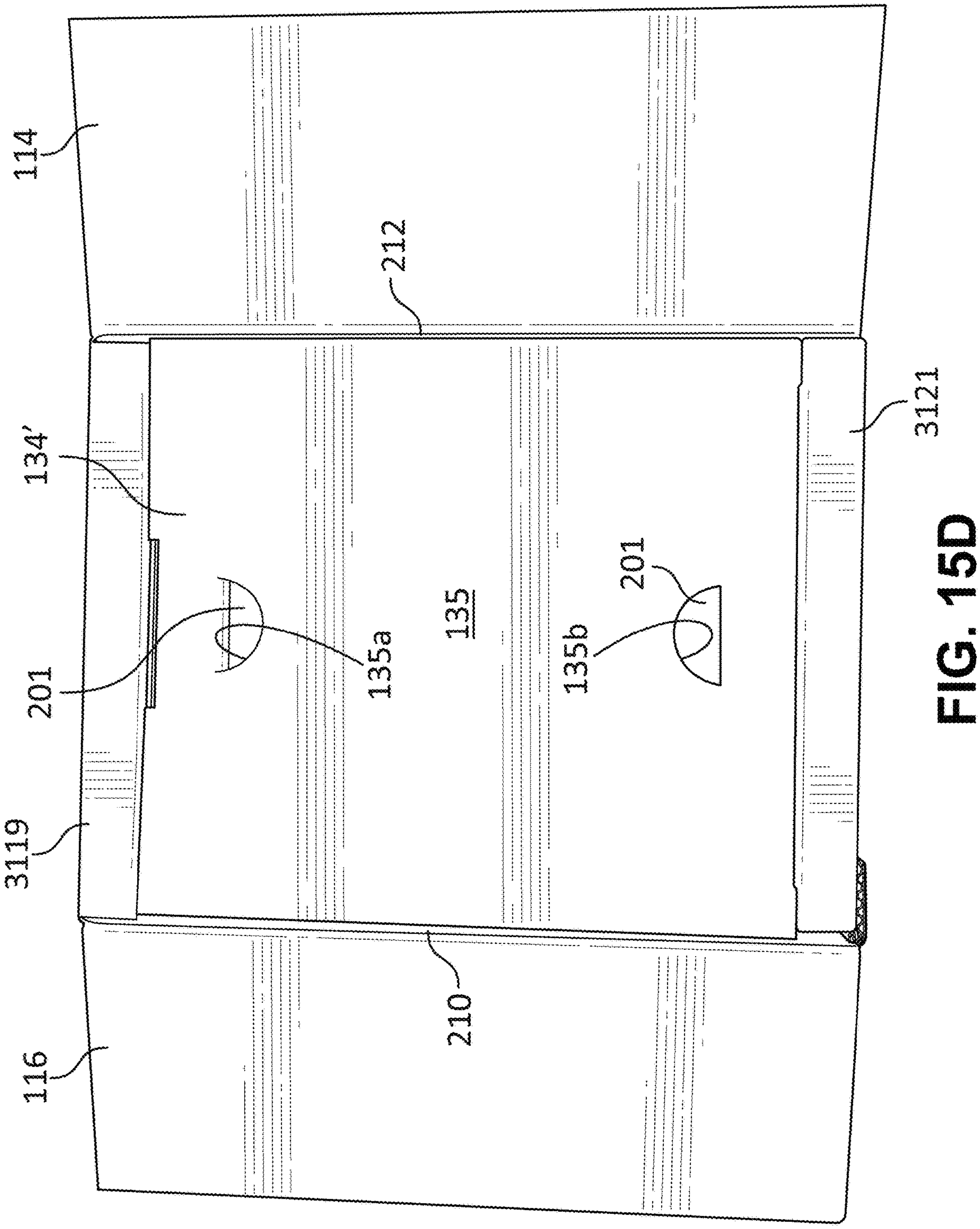
FIG. 15D is a top view of the subassembly of FIGS. 15A and 15B inserted into the outer box of the shipping assembly FIG. 1A, shown with the outer box top flaps in an open position to reveal the top of the top insulator box assembly.

FIGS. 13A-13C and 15D provide greater detail concerning the top panel 135 and the manner in which the top insulator box assembly 134' is positioned within the inner box cavity 156 and within the outer box cavity 113. As best seen in FIG. 15D, the top panel 135 can define a pair of thumb hole cut-out sections 135*a,b* configured to facilitate lifting of the top insulator box assembly 134' out of the outer box 102. Further details concerning the thumb hole cut-out sections are discussed herein with regard to FIG. 19. A top insulation batt element 201, positioned within the top insulator box cavity 139 (FIG. 2) is shown in FIG. 15D as being visible through both of the thumb hole cut-out sections 135*a,b*. The top insulation batt element 201 can be composed of the same material as the insulation batt core 505 discussed above with regard to FIG. 1C. In some aspects, the top insulation batt element 201 can assume as prismatic shape, as best seen in FIGS. 14A-14C, to be discussed in greater detail herein; however, the particular shape of the top insulation batt element 201 illustrated in those figures is not intended to be limiting, and the element 201 can assume any other suitable shape.

Figure 13A:
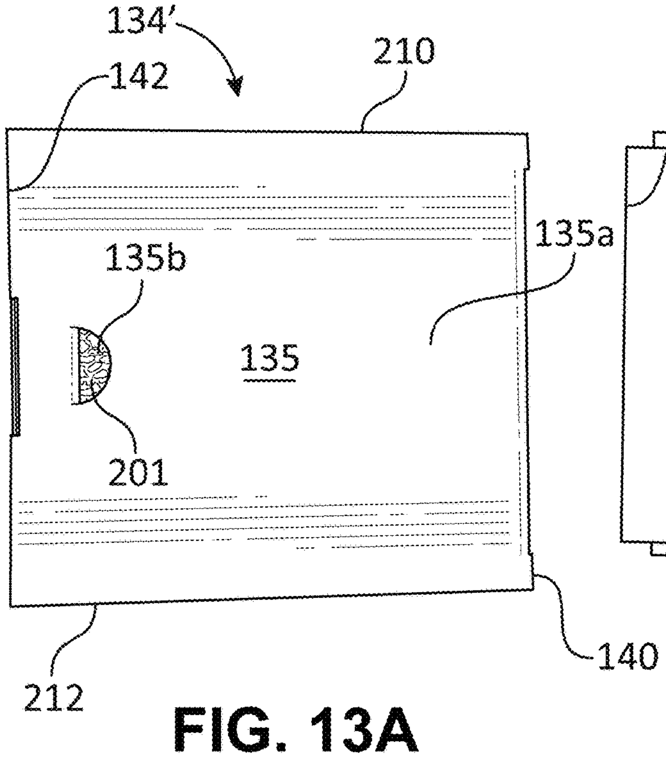
FIG. 13A is a top view of a top insulator box assembly comprising another portion of the shipping assembly of FIG. 1A.
Figure 13B:
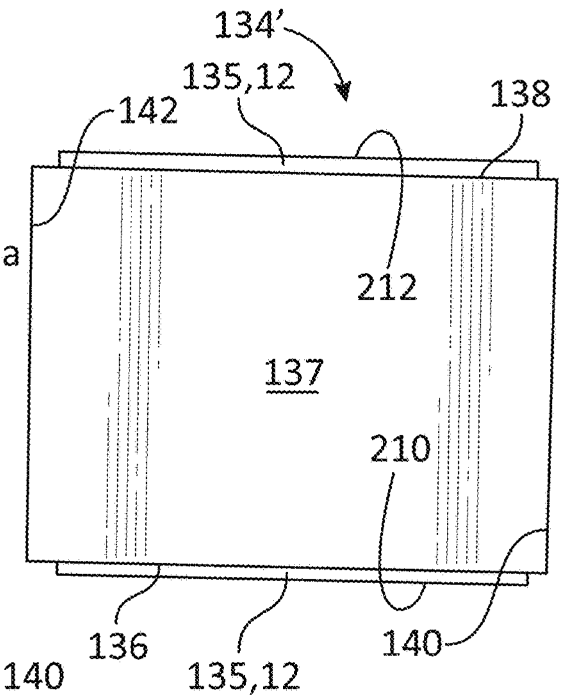
FIG. 13B is a bottom view of the top insulator box assembly of FIG. 13A.
Figure 13C:
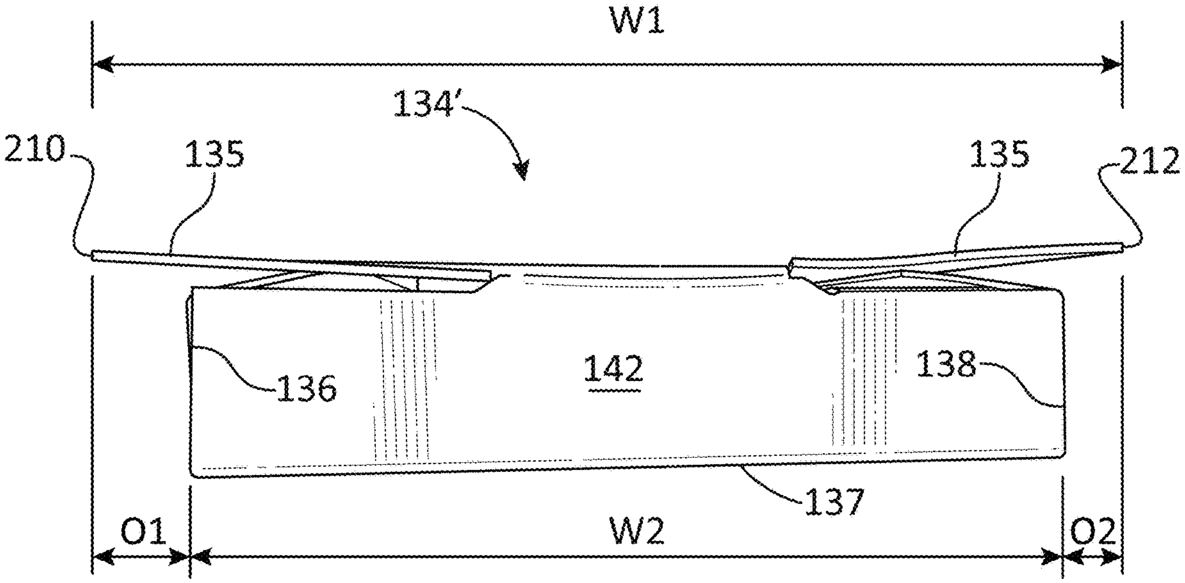
FIG. 13C is a front view of the top insulator box assembly of FIG. 13A.

Still referring to FIGS. 13A-13C and 15D, the top panel 135 of the top insulator box 134 of the top insulator box assembly 134' further defines a first edge 210 and an opposed second edge 212. As best seen in FIG. 13C, the top panel 135 has a first width W1 that is greater than a second width W2 of the front panel 142 of the top insulator box 134. As a result, the first edge 210 of the top panel 135 extends laterally beyond the left side panel 136 to define a first overhang portion O1 of the top panel 135. Similarly, the second edge 212 of the top panel 135 extends laterally beyond the right side panel 138 to define a second overhang portion O2 of the top panel 135. Although the perspective of FIG. 13C suggests that portions O1 and O2 have different lengths, those lengths are preferably equal, as seen in FIG. 4, but in some aspects of the present disclosure, those respective lengths may differ. In the assembled state of the shipping assembly 3000 exemplified in FIGS. 1-5, the first overhang portion O1 of the top panel 135 and the second overhang portion O2 of the top panel 135 rest upon the ridge 158 (FIGS. 6 and 9A) of the insulated inner box 124. In this spatial arrangement, the overhang portions O1 and O2 of the top panel 135 suspend the top insulator box assembly 134' above the bottom surface (bottom flaps 154*a,b*) of the insulated inner box 124, as best seen in FIG. 4.

Figure 6:
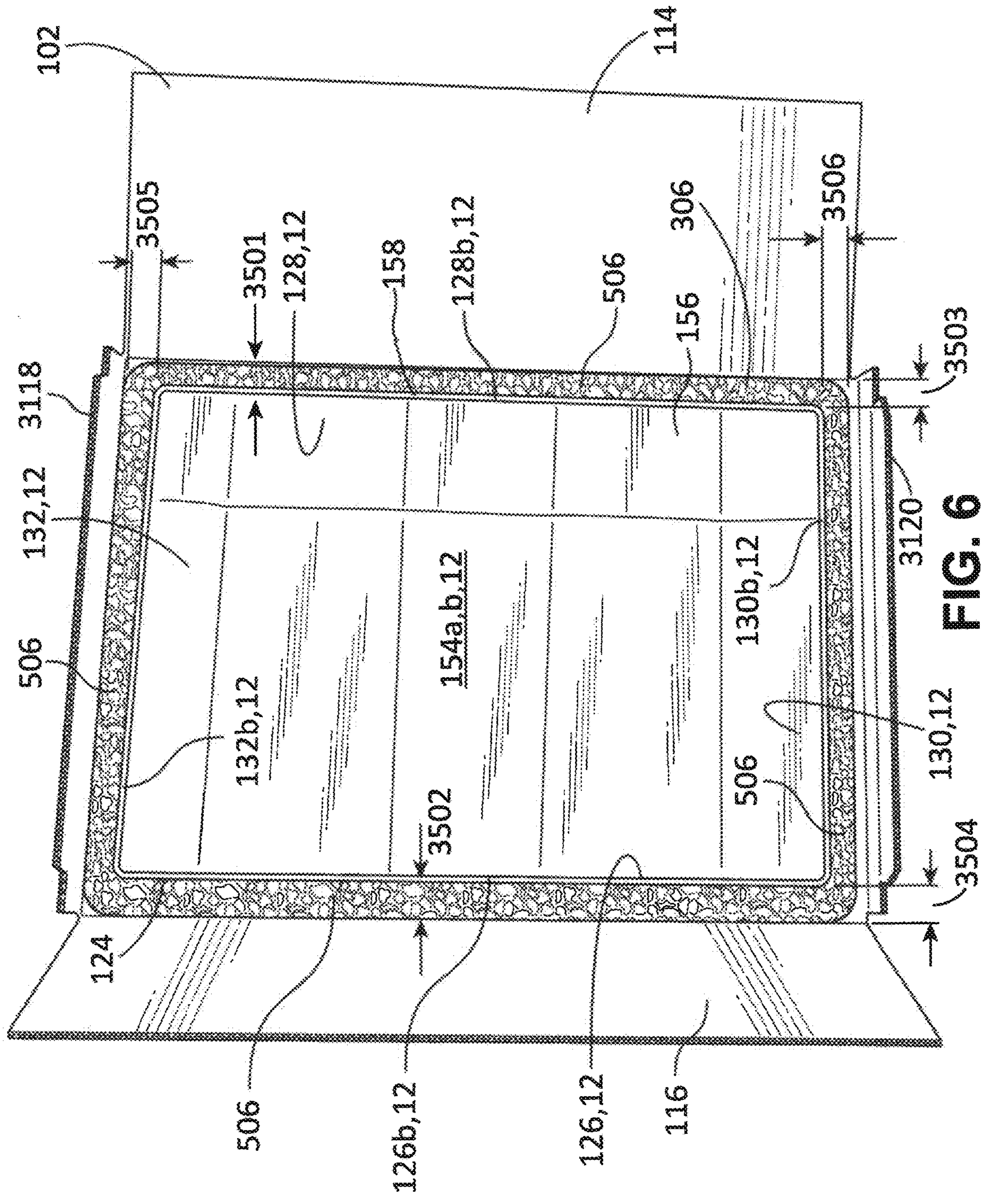
FIG. 6 is a top perspective view of a subassembly of the shipping assembly illustrated in FIG. 1A, showing the insulated inner box and the surrounding insulation wrap seated within the outer box.

FIGS. 15A and 15B are perspective and rear views, respectively, of a subassembly comprising the top insulator box assembly 134' seated partially within the insulated inner box 124. Ridge portions 130*b*, 132*b* (that is, the front ridge portion 130*b* and the rear ridge portion 132*b*) of the insulated inner box 124 are exposed in FIG. 15A because the top insulator box assembly 134' does not rest upon those portions of the ridge 158 (FIGS. 6 and 9A). Instead, the top insulator box assembly 134' rests upon the other two ridge portions obstructed from view by the upper panel 135, namely, the ridge portions 126*b*, 128*b*, over which the aforementioned overhang portions O1 and O2 of the upper panel 135 extend. The configuration shown is not meant to be limiting, however, and in other aspects the top insulator box assembly could instead extend over, and be supported by, the ridge portions 130*b*, 132*b*.

Figure 19:
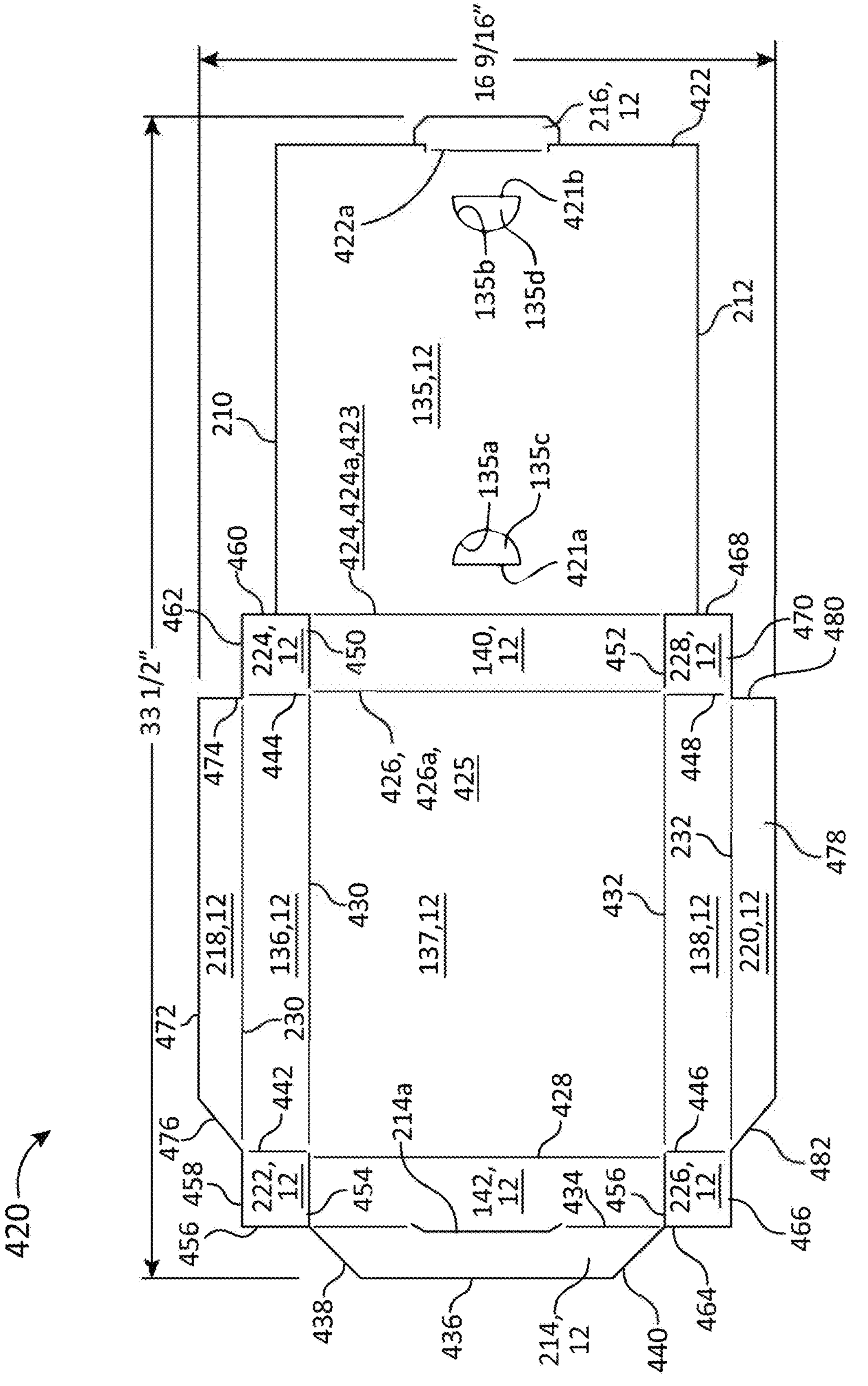
FIG. 19 is a top view of a blank for the top insulator box illustrated in FIG. 1A, from the perspective of viewing the inside surface of the blank.

FIGS. 14A-14C illustrate the top insulator box assembly 134' in two disassembled states: one of them shown in FIG. 14A and the other shown in both FIGS. 14B and 14C, which both show a progressively further disassembled state than that depicted in FIG. 14A. Given that the insulator box 134 is composed of the insulated material 10, which includes the repulpable insulating film 12 discussed above with regard to FIG. 9B, various panel and flap surfaces are denoted in FIGS. 14A-14C, as well as in certain other figures that involve the insulated material 10, with the reference numeral "12" appearing as a suffix to the reference numeral unique to the part being designated. This numbering convention is done as a shorthand designation, acknowledging that the visible portion of the repulpable insulating film 12 is the exposed surface 12*a* (FIG. 9B) of that film 12. To promote brevity, this numbering convention is applied to the figures only, and the suffix "12" is not repeated in the present textual descriptions. To the extent that FIGS. 14A-14C do not identify various panel edges and fold lines, these will be described herein with reference to the top insulator box blank 420 (FIG. 19).

In FIG. 14A, the top insulator box 134 has been opened to reveal the top insulation batt element 201 disposed on the bottom panel 137 (FIG. 2) of the top insulator box 134. The end panel 140 is connected to the top panel 135 on one side and to the bottom panel 137 on the other side. A locking tab 216 extends from a portion of the side of the top panel 135 extending between the first edge 210 and the second edge 212. In other words, the locking tab 216 extends from the side of the top panel 135 opposite the end panel 140. A left side upper insulation retention flap 218, which extends from the left side panel 136 (FIGS. 14B and 14C), is shown extending over a portion of the upper surface of the top insulation batt element 201 proximate the left side panel 136. Similarly, a right side upper insulation retention flap 220, which extends from the right side panel 138 (FIGS. 14B and 14C), is shown extending over a portion of the upper surface of the top insulation batt element 201 proximate the right side panel 138. The front panel 142 of the top insulator box 134 extends from a front side of the bottom panel 137, the front panel 142 joined to the bottom panel 137 along a fold line (not shown). The front panel 142 includes a front side from which extends a front upper insulation retention flap 214 that, in an assembled position, extends over a front portion of the upper surface of the top insulation batt element 201. The front upper insulation retention flap 214 defines a slot 214*a* therein, the slot 214*a* configured to receive the locking tab 216 when the top insulator box 134 is assembled from the top insulator box blank 420 (FIG. 19). The locking tab 216 can be configured to maintain a closed configuration between the top panel 135 and the bottom panel 137 following insertion of the locking tab 216 into the slot 214*a*. Although the various openings disclosed herein can be slot-shaped, they can assume any shape that suitably accommodates and lockably engages at least a portion of their corresponding locking tabs. FIG. 14A also shows that the top insulator box 134 further comprises a first front insulation retention flap 222 extending from at least a portion of the left side panel 136 and a second front insulation retention flap 226 extending from at least a portion of the right side panel 138. In some aspects, the top insulator box 134 can additionally include a first rear insulation retention flap 224 extending from at least a portion of the left side panel 136 and a second rear insulation retention flap 228 extending from at least a portion of the right side panel 138.

In FIGS. 14B and 14C, the side upper insulation retention flaps 218,220 have been folded outwardly, thereby fully exposing the sides of the top insulation bat element 201. The illustrated position more clearly shows the connection of the left side upper insulation retention flap 218 to the left side panel 136 along a fold line 230, and the connection of the right side upper insulation retention flap 220 to the second side panel along a fold line 232.

Positioning, Configuration, and Functions of Outer Box End Flaps

Figure 7:
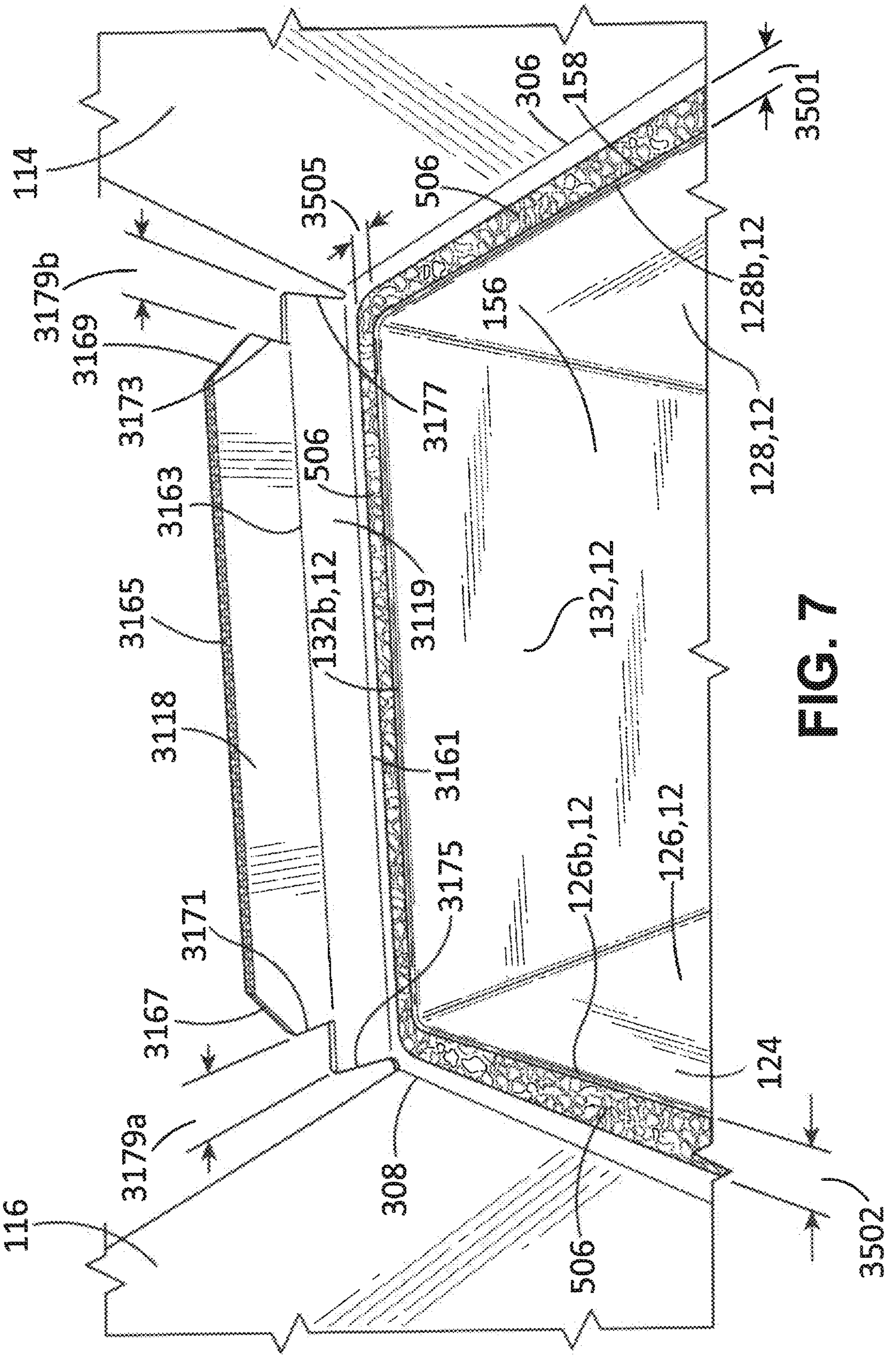
FIG. 7 is a front perspective view of a portion of the subassembly of FIG. 6, showing the configuration of an outer box end flap (rear flap) in greater detail.

FIGS. 6-8 illustrate the configuration of the retention flaps 3118,3120 of the outer box 102, as well as that of related outer box elements and their functions relative to the insulated inner box 124. For clarity of illustration, the views of FIGS. 6-8 omit the top insulator box assembly 134', which would otherwise be seated within the insulated inner box 124 in the manner discussed above with regard to FIGS. 15A and 15B. To the extent that FIGS. 6-8 do not identify various panel edges and fold lines, these will be described herein with regard to the outer box blank 300 (FIG. 16).

Referring to FIGS. 6 and 7, FIG. 6 is a top perspective view of a subassembly of the shipping assembly 3000, showing the insulated inner box 124 and the insulation wrap 500 (visible via the upper end 506 of the insulation wrap 500) fully seated within the outer box 102, with all flaps and panels of the outer box 102 oriented in a fully open position, and FIG. 7 is a front perspective view of a portion of the subassembly of FIG. 6, showing the configuration of rear flap 3119 in greater detail. The outer box 102 includes ridge panels 3119,3121 that are respectively connected along panel fold lines 3161,3236 to the upper ends of the rear panel 108 and of the front panel 110 (FIG. 1A). The rear ridge panel 3119 defines an elongated side 3179 opposite the panel fold line 3161, a first end 3175 extending between the panel fold line 3161 and the elongated side 3179, and a second end 3177 opposite the first end 3175, the second end 3177 also extending between the panel fold line 3161 and the elongated side 3179. Similarly, the rear ridge panel 3121 defines an elongated side 3251 opposite the panel fold line 3236, a first end 3252 extending between the panel fold line 3236 and the elongated side 3251, and a second end 3254 opposite the first end 3252, the second end 3254 also extending between the panel fold line 3236 and the elongated side 3251. Respective portions of the elongated sides 3179,3251 of the ridge panels 3119,3121 define flap fold lines 3163, 3238. The retention flaps 3118,3120 are respectively connected to the ridge panels 3119,3121 along the flap fold lines 3163,3238. Thus, the ridge panel 3119 provides a double fold line arrangement, i.e., fold lines 3161,3163, as does the ridge panel 3121, i.e., fold lines 3236,3238. With this configuration, the rear flap 3125 (the combination of the rear ridge panel 3119 and the rear retention flap 3118) of the outer box 102 is moved to a fully open position when both the ridge panel 3119 is pivoted fully outwardly about the panel fold line 3161, and the rear retention flap 3118 is pivoted fully outwardly about the flap fold line 3163. Similarly, the front flap 3127 (the combination of the front ridge panel 3121 and the front retention flap 3120) of the outer box 102 is moved to a fully open position when both the front ridge panel 3121 is pivoted fully outwardly about the panel fold line 3236, and when the front retention flap 3120 is pivoted fully outwardly about the flap fold line 3238. In the fully open position shown in FIG. 6, the entirety of the ridge 158 of the insulated inner box 124, that is, the combination of portions 126*b*, 128*b*, 130*b*, 132*b*, is fully visible.

FIGS. 7 and 16 also show shoulder portions 3179*a,b* and 3251*a,b* defined by the configuration of each retention flap 3118,3120 relative to each respective ridge panel 3119,3121. In particular, the rear retention flap 3118 defines a free edge 3165 opposite the elongated side 3179, a first edge 3171 extending between the elongated side 3179 and the free edge 3165, and a second edge 3173 (FIG.) opposite the first edge 3171, the second edge 3173 also extending between the elongated side 3179 and the free edge 3165. The rear ridge panel 3119 defines a first shoulder portion 3179*a* extending along the elongated side 3179 for a first length measured from the first end 3175 of the rear ridge panel 3119 to the first edge 3171 of the rear retention flap 3118. The rear ridge panel 3119 further defines a second shoulder portion 3179*b* extending along the elongated side 3179 for a second length measured from the second end 3177 of the rear ridge panel 3119 to the second edge 3173 of the rear retention flap 3118. Similarly, the front retention flap 3120 defines a free edge 3240 opposite the elongated side 3251, a third edge 3246 extending between the elongated side 3251 and the free edge 3240, and a fourth edge 3250 opposite the third edge 3246, the fourth edge 3250 also extending between the elongated side 3251 and the free edge 3240. The front ridge panel 3121 defines a third shoulder portion 3251*a* extending along the elongated side 3251 for a third length measured from the first end 3252 of the front ridge panel 3121 to the third edge 3246 of the front retention flap 3120. The front ridge panel 3121 further defines a fourth shoulder portion 3251*b* extending along the elongated side 3251 for a fourth length measured from the second end 3254 of the front ridge panel 3121 to the fourth edge 3250 of the front retention flap 3120.

Referring to FIGS. 7, 8, and 16, edges each of the retention flaps 3118,3120 can, in some aspects, be further defined by chamfered portions. In particular, the first edge 3171 of the rear retention flap 3118 defines a first chamfered portion 3167 that extends at an angle with respect to the free edge 3165 of the rear retention flap 3118, and the second edge 3173 of the rear retention flap 3118 defines a second chamfered portion 3169 that also extends at an angle to the free edge 3165. Similarly, the third edge 3246 of the front retention flap 3120 defines a third chamfered portion 3242 that extends at an angle with respect to the free edge 3240 of the front retention flap 3120, and the fourth edge 3250 of the front retention flap 3120 defines a fourth chamfered portion 3244 that also extends at an angle to the free edge 3240.

Referring to FIGS. 6-8, FIG. 8 illustrates a closed position of the rear flap 3125 (comprising the rear ridge panel 3119 and the rear retention flap 3118), which is also typical of the front flap 3127 (comprising the front ridge panel 3121 and the front retention flap 3120) of the outer box 102 with respect to the end panels 130, 132 of the insulated inner box 124. This closed position produces certain spatial relationships between the insulated inner box 124 and the side panels 104, 106 of the outer box 102 as best seen in (FIGS. 6 and 7). In particular, the rear ridge panel 3119 covers ridge portion 132*b* of the of the insulated inner box 124. Additionally, the first end 3175 of the rear ridge panel 3119 can frictionally engage at least a portion of an inside surface 106*a* (not shown) of the second outer box side panel 106, while the second end 3177 of the rear ridge panel 3119 can frictionally engage at least a portion of an inside surface 104*a* (FIG. 2) of the first outer box side panel 104. As best seen in FIG. 8, the first edge 3171 of the rear retention flap 3118 can frictionally engage at least a portion of an inside surface 126, 12 of the first side panel 126 of the insulated inner box 124, while the second edge 3173 of the rear retention flap 3118 can frictionally engage at least a portion of an inside surface 128,12 of the second side panel 128 of the insulated inner box 124. In this position, the rear retention flap 3118 and the rear ridge panel 3119 engage at least a portion of the rear panel 132 of the insulated inner box 124 such that the rear panel 132 is spaced from the first outer box side panel 104 by a first gap distance 3501 substantially equaling the length of the second shoulder portion 3179*b* of the rear ridge panel 3119, and the rear panel 132 is also spaced from the second outer box side panel 106 by a second gap distance 3502 substantially equaling the length of the first shoulder portion 3179*a* of the rear ridge panel 3119. Spatial relationships similar to those described above exist at the fronts of the outer box 102 and the insulated inner box 124. In particular, the front ridge panel 3121 covers ridge portion 130*b* (FIG. 15A) of the insulated inner box 124. Additionally referring to FIGS. 2, 6, and 16), the first end 3252 of the front ridge panel 3121 can frictionally engage at least a portion of an inside surface 104*a* of the first outer box side panel 104, while the second end 3254 of the front ridge panel 3121 can frictionally engage at least a portion of an inside surface 106*a* (not shown) of the second outer box side panel 106 (FIG. 2). The third edge 3246 of the front retention flap 3120 can frictionally engage at least a portion of an inside surface 128,12 of the second side panel 128 of the insulated inner box 124, while the fourth edge 3250 of the front retention flap 3120 can frictionally engage at least a portion of an inside surface 126, 12 of the first side panel 126 of the insulated inner box 124. In this position, the front retention flap 3120 and the front ridge panel 3121 can engage at least a portion of the front panel 130 of the insulated inner box 124 such that the front panel 130 is spaced from the first outer box side panel 104 by a third gap distance 3503 substantially equaling the length of the third shoulder portion 3251*a* of the front ridge panel 3121, and such that the front panel 130 is also spaced from the second outer box side panel 106 by a fourth gap distance 3504 substantially equaling the length of the fourth shoulder portion 3251*b* of the front ridge panel 3121. In some aspects, gap distances 3501 and 3503 are identical, and gap distances 3502 and 3504 are identical, if the respective side panels of the insulated inner box 124 and of the outer box 102 are parallel to one another. In other aspects, all of the gap distances 3501-3504 can equal one another. However, such identities between gap distances are not required.

The present disclosure contemplates arrangements where in the absence of partial insertion of the top insulator box assembly 134' into the insulated inner box 124, the end flaps 3125,3127 have a natural tendency when moved toward a closed position to assume only a partially closed orientation in which neither of the end flaps 3125,3127 contact an associated end panel 132, 130 of the insulated inner box 124. This condition can result either from a flap element failing to frictionally engage a box inside surface, from insufficient frictional force to allow the end flaps 3125,3127 to maintain a fully closed orientation in the absence of other assembly elements exerting force upon them, or a combination of both conditions. In such arrangements, the fully closed flap position depicted in FIG. 8 is reached only when the top insulator box assembly 134' is assembled into the insulated inner box 124). The rear retention flap 3118 need not frictionally engage the insulated inner box 124 at both of the retention flap edges 3171,3173. Lack of frictional engagement at a point can result from dimensional variations attained when the outer box 102 and/or the insulated inner box 124 are manufactured. Nevertheless, in a shipping assembly 3000 constructed in accordance with the present disclosure, fully closed end flaps 3125,3127 still tend to restrain the insulated inner box 124 within the outer box 102, as explained below.

FIG. 15C is an exploded perspective view showing the subassembly of FIGS. 15A and 15B in exploded relation to the top insulator box assembly 134', with the insulated inner box 124 seated within the outer box 102. When the top insulator box assembly 134' is partially inserted into the inner box cavity 156 of the insulated inner box 124 in the same manner discussed above with regard to FIGS. 15A and 15B, the front panel 142 of the top insulator box 134 engages the front retention flap 3120 and forces the front retention flap 3120 downwardly to assume the fully closed orientation discussed above with regard to FIG. 8. Similarly, such movement causes the end panel 140 (FIGS. 14A-14C) of the top insulator box 134 to engage the rear retention flap 3118 and to force the rear retention flap 3118 downwardly to assume the fully closed orientation discussed above with regard to FIG. 8. When forced into these fully closed orientations, the retention flaps 3118,3120 can exert opposing forces upon the insulated inner box 124, namely, the rear retention flap 3118 can exert a force tending to pull the rear panel 132 rearwardly, and the front retention flap 3120 can exert a force tending to pull the front panel 130 in an opposing frontward manner. Such opposing forces can act to restrain the insulated inner box 124 from movement in a longitudinal direction inside the outer box cavity 113. Additionally, once the top insulator box assembly 134' is fully inserted into the insulated inner box 124 and into the outer box 102, as best seen in FIG. 15D, the opposed edges 210,212 of the top panel 135 of the top insulator box 134 can engage respective inside surfaces of the outer box side panels 106, 104. Further, this fully inserted position can result in the side panels 136, 138 of the top insulator box 134 engaging respective inside surfaces of the insulated inner box side panels 126, 128. As a result, the illustrated inserted position of the top insulator box assembly 134' can act to restrain the insulated inner box 124 against lateral movement within the outer box cavity 113.

The closed end flap position shown in FIG. 8 also produces certain spatial relationships between the insulated inner box 124 and the end panels 108, 110 (FIG. 1A) of the outer box 102. In particular, the rear panel 132 of the insulated inner box 124 is restrained in a spaced relationship with respect to the rear panel 108 of the outer box 102, the separation defining a fifth gap distance 3505 that substantially equals a depth of the rear ridge panel 3119. Similarly, the front panel 130 of the insulated inner box 124 is restrained in a spaced relationship with respect to the front panel 110 of the outer box 102, the separation defining a sixth gap distance 3506 that substantially equals a depth of the front ridge panel 3121. It is therefore seen that the closed end flap position exemplified in FIG. 8 maintains gaps on all four sides of the insulated inner box 124. If the insulation wrap 500 maintains a uniform thickness throughout its length following insertion into the outer box cavity 113, the respective magnitudes of the gap distances 3501-3506 can all equal one another throughout the length of the insulation wrap 500, that is, all around the outer periphery 3500 (FIG. 9A) of the insulated inner box 124. However, such identities between gap distances 3501-3506 are not required. As so installed in the outer box 102, the insulation wrap 500 promotes insulation of any food product placed within the inner box cavity 156 from conductive heat originating from external heat sources such as hot surfaces on which the shipping assembly 3000 can be placed (including, for example, a front porch of a residence).

The Bottom Insulator Box Assembly 122'

Figure 18:
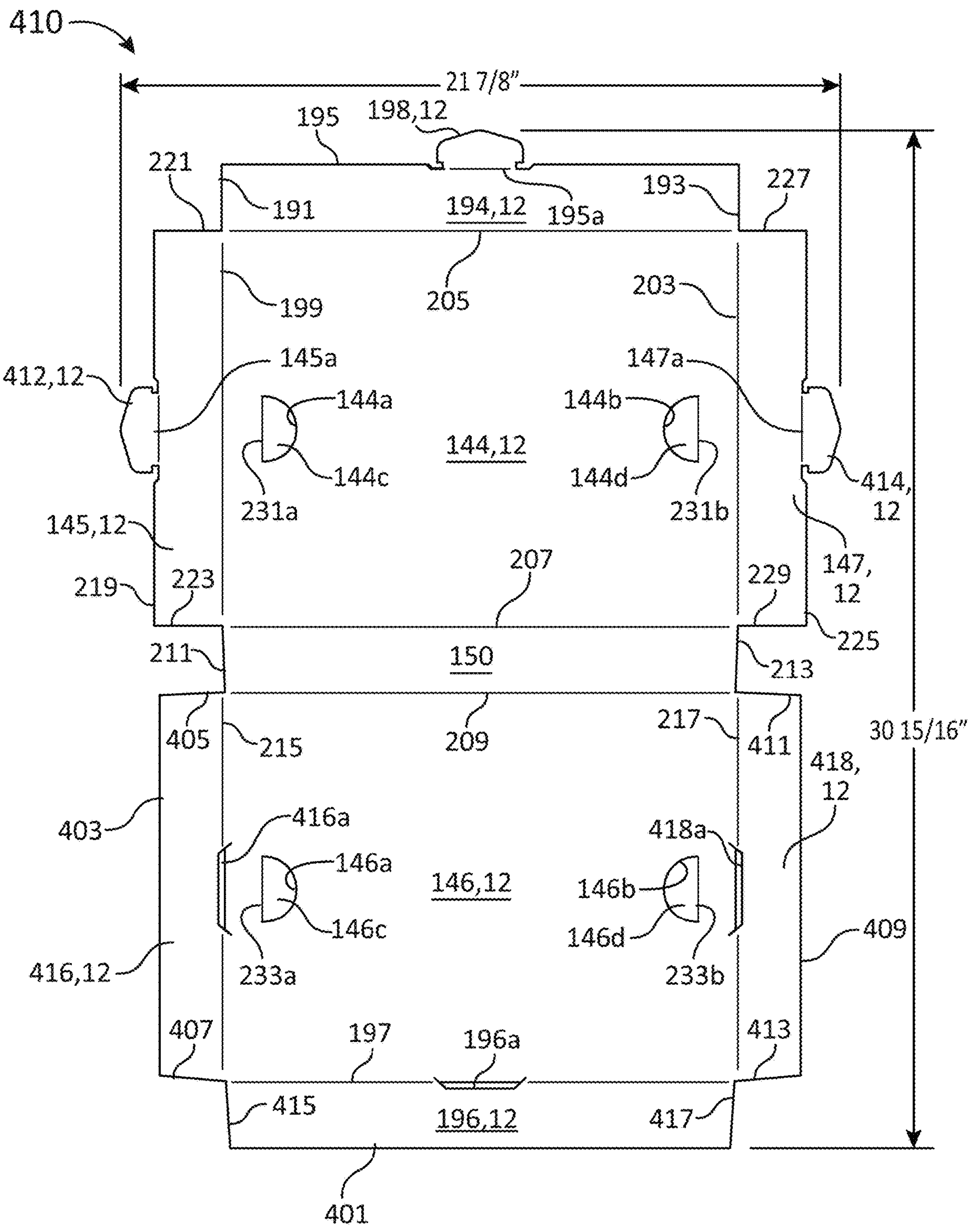
FIG. 18 is a top view of a blank for the bottom insulator box illustrated in FIG. 1A, from the perspective of viewing the inside surface of the blank.

Further details concerning the bottom insulator box assembly 122' will now be described with reference to FIGS. 2 and 10-12B. The bottom insulator box assembly 122' includes the bottom insulator box 122, which defines the bottom insulator box cavity 152 (FIGS. 2 and 11B), as well as the bottom insulation batt element 200 (FIGS. 11A and 12B) positioned within the bottom insulator box cavity 152. To the extent that FIGS. 2 and 10-12B do not identify various panel edges and fold lines of the bottom insulator box 122, these will be described herein with reference to the bottom insulator box blank 410 (FIG. 18).

Figure 10:
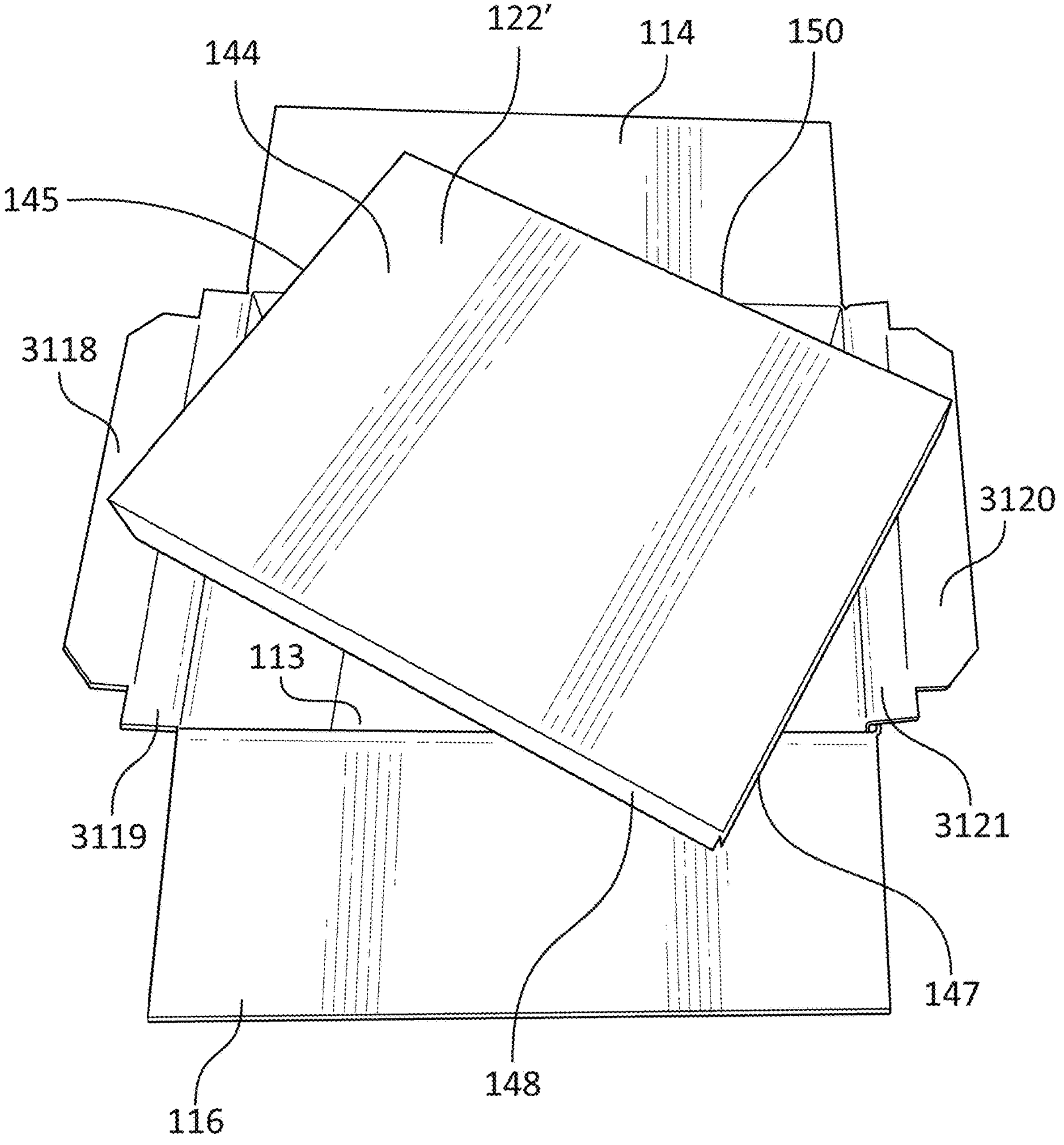
FIG. 10 is a top perspective view of a bottom insulator box assembly comprising a portion of the shipping assembly of FIG. 1A, the bottom insulator box shown removed from a cavity defined by the outer box but resting atop the outer box flaps for illustrative purposes.

FIGS. 2 and 10 show the bottom insulator box 122 defining side panels 148, 150, a rear panel 145, a front panel 147, a top panel 144, and a bottom panel 146, all of which define the bottom insulator box cavity 152. The top panel 144 defines a thumb hole cut-out section 144*a* configured to facilitate lifting of the bottom insulator box 122 out of the outer box cavity 113 of the outer box 102, when the bottom insulator box 122 has been positioned in the outer box cavity 113 with the bottom panel 146 facing upwardly. Also, in some aspects, as shown in FIG. 5, the bottom panel 146 can define a similar thumb hole cut-out section 146*a*. Additional such cut-out sections, and further details concerning them, are discussed with regard to the bottom insulator box blank 410 of FIG. 18.

Figure 11A:
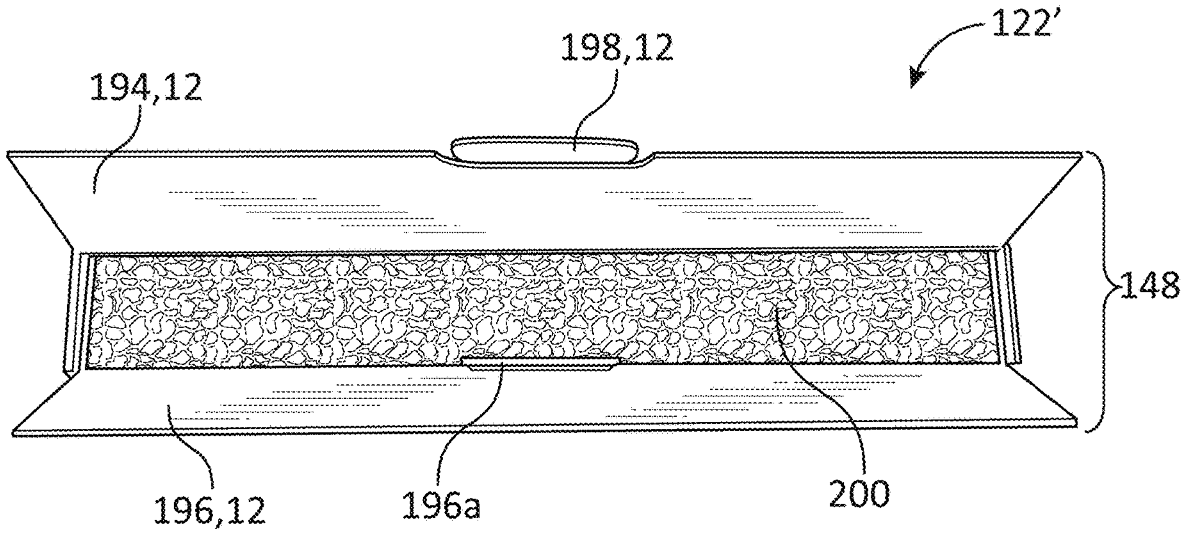
FIG. 11A is a side perspective view of the bottom insulator box assembly of FIG. 10 shown with side flaps of the bottom insulator box open to expose a bottom insulation batt element encapsulated within the bottom insulator box.
Figure 11B:
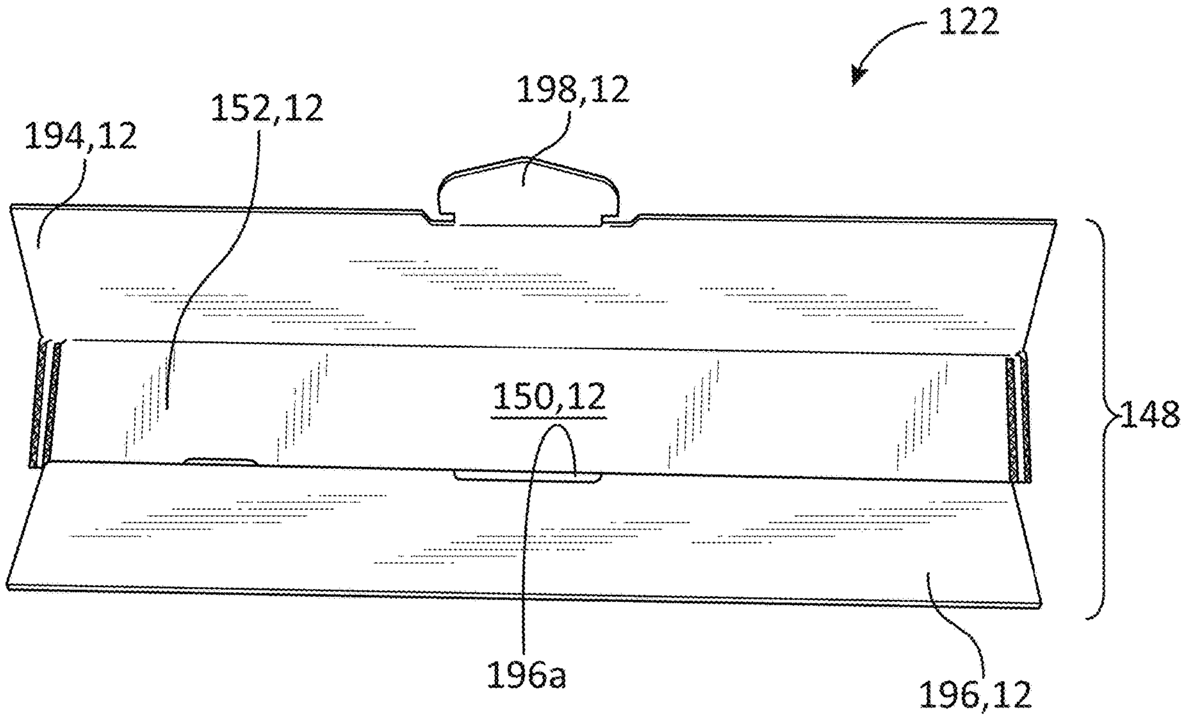
FIG. 11B is a side perspective view of the bottom insulator box of the bottom insulator box assembly of FIG. 10, also with the side flaps open as in FIG. 11A, except excluding the bottom insulation batt element to show the cavity defined by the bottom insulator box.

FIG. 11A is a side perspective view of the bottom insulator box assembly 122' shown with side flaps of the bottom insulator box 122 open to expose a bottom insulation batt element 200 encapsulated within the bottom insulator box 122, and FIG. 11B is a side perspective view of the bottom insulator box 122, also with the side flaps open as in FIG. 11A, except excluding the bottom insulation batt element 200 to show the bottom insulator box cavity 152. These figures show that the left side 148 of the bottom insulator box 122 comprises an upper left side flap 194 and a cooperating lower left side flap 196. A side locking tab 198 extends from a portion of a distal edge 195 (FIG. 12A) of the upper left side flap 194. The lower left side flap 196 defines a side slot 196*a*, the side slot 196*a* configured to receive the side locking tab 198 when the bottom insulator box 122 is assembled from the bottom insulator box blank 410 (FIG. 18). The side locking tab 198 is configured to maintain a closed configuration between the top panel 144 and the bottom panel 146 following insertion of the side locking tab 198 into the side slot 196*a*. The bottom insulation batt element 200 shown in FIG. 11A can be composed of the same material as the insulation batt core 505 discussed above with regard to FIG. 1C. With the bottom insulation batt element 200 removed as shown in FIG. 11B, one is able to observe both the bottom insulator box cavity 152 and inside surface 150, 12 of the right side panel 150 on the side of the bottom insulator box 122 opposite the opening at the left side 148.

Figure 12A:
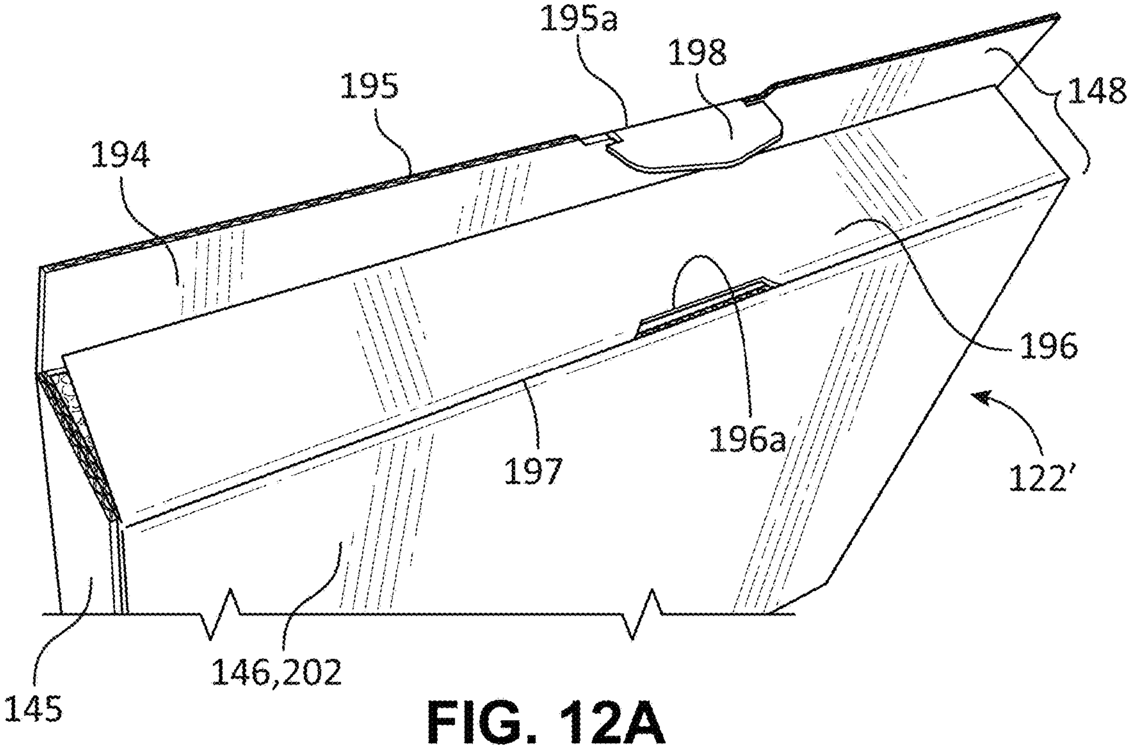
FIG. 12A is a top perspective view of the left side of the bottom insulator box assembly of FIG. 11A, with one of the side flaps shown in an open position and another of the side flaps shown in a substantially closed position.
Figure 12B:
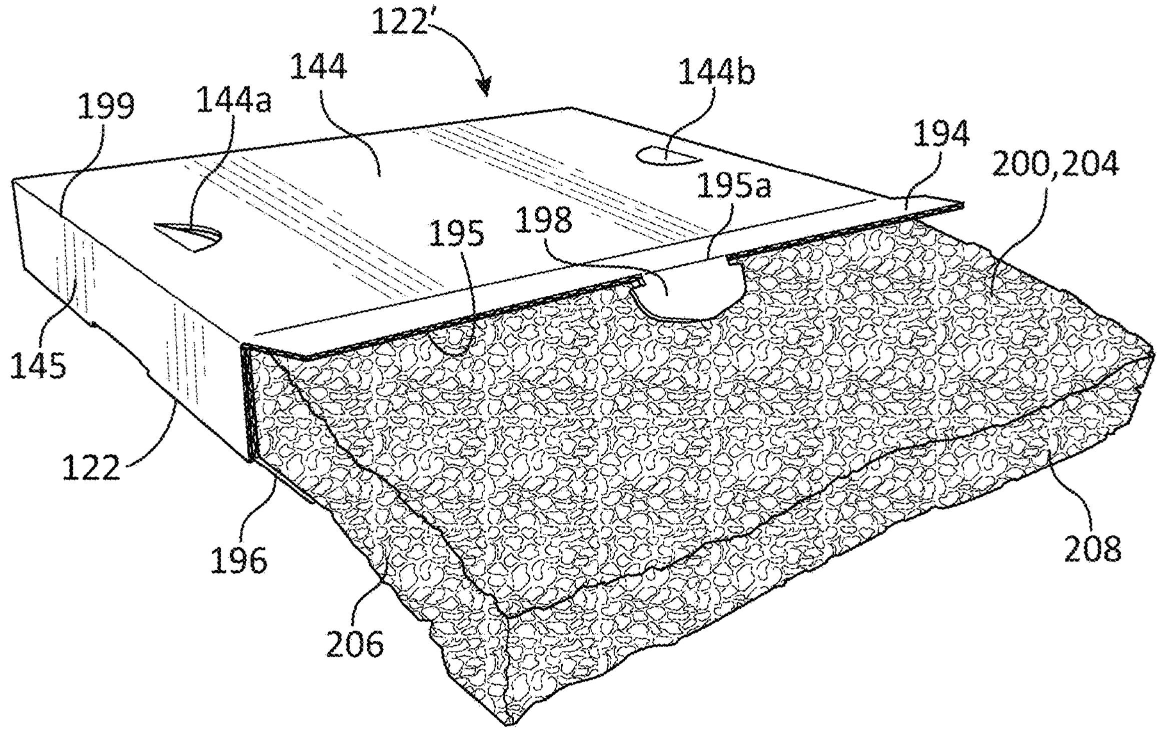
FIG. 12B is a perspective view of the left side of the bottom insulator box assembly of FIG. 11A, shown with both side flaps open and with the bottom insulation batt element partially removed from the cavity defined by the bottom insulator box.

FIG. 12A is a top perspective view of the left side 148 of the bottom insulator box assembly 122' with the upper left side flap 194 shown in an open position and the lower left side flap 196 shown in a substantially closed position, and FIG. 12B is a perspective view of the left side 148 of the bottom insulator box assembly 122', shown with both side flaps 194, 196 open and with the bottom insulation batt element 200 partially removed from the bottom insulator box cavity 152. FIG. 12A also shows that the bottom insulator box 122 defines a bottom 202, and that the side locking tab 198 is joined to the upper left side flap 194 along a fold line 195*a* substantially colinear with the distal edge 195 of the upper left side flap 194. The fold line 195*a* defines a joint between the side locking tab 198 and the upper left side flap 194. In some aspects, the bottom insulation batt element 200, like the top insulation batt element 201 discussed above, can assume a substantially prismatic shape, including an upper surface 204, a left side 206, and a front side 208. Finally, as will be discussed with regard to the bottom insulator box blank 410 of FIG. 18, the bottom insulator box 122 can additionally be provided with locking tabs and cooperating slots at each of its end panels.

Method of Assembling the Shipping Assembly 3000

A method of assembling the shipping assembly 3000 (FIG. 1) is now described with reference to all of the figures described above. The method can begin with moving into an open position the top flaps 114, 116, the retention flaps 3118,3120, and the ridge panels 3119,3121 of the outer box 102, the open position best illustrated in, and discussed above with regard to, FIG. 8. Next, the bottom insulator box assembly 122' can be inserted into the outer box cavity 113, insertion of the bottom insulator box assembly 122' occurring until its bottom 202 contacts a bottom panel 111*a,b* of the outer box 102. The insulated inner box 124 can then be inserted into the outer box cavity 113 until the bottom 153 of the insulated inner box 124 contacts the top panel 144 of the bottom insulator box assembly 122'.

With the insulated inner box 124 fully inserted into the outer box cavity 113, the ridge panels 3119,3121 of the outer box 102 are pivoted about their respective ridge panel fold lines 3161,3236 inwardly with respect to the inner box cavity 156 until the ridge panels 3119,3121 cover respective portions 130*b*, 132*b* of the ridge 158 defined by the end panels 130, 132 of the insulated inner box 124, and until respective ends 3175,3177 and 3252,3254 of the ridge panels 3119,3121 frictionally engage at least a respective portion of each of the inside surfaces 104*a*, 106*a* of the outer box side panels 104, 106. Next, the retention flaps 3118, 3120 of the outer box 102 are respectively pivoted about retention flap fold lines 3163,3238 inwardly with respect to the inner box cavity 156 until the outer edges 3171,3173 and 3246,3250 of each retention flap 3118,3120 respectively engage at least a portion of the inside surfaces 126, 12 and 128, 12 of the insulated inner box side panels 126, 128 such that the retention flaps 3118,3120 respectively cover at least portions of the inside surfaces of the respective end panels 130, 132 of the insulated inner box 124.

Following the steps of pivoting the ridge panels 3119, 3121 and pivoting the retention flaps 3118,3120, the insulated inner box 124 is restrained within the outer box cavity 113 such that: (1) the rear panel 132 of the insulated inner box 124 is spaced from the first outer box side panel 104 by a first gap distance 3501 substantially equaling the length of the second shoulder portion 3179*b* of the rear ridge panel 3119; (2) the rear panel 132 of the insulated inner box 124 is spaced from the second outer box side panel 106 by a second gap distance 3502 substantially equaling the length of the first shoulder portion 3179*a* of the rear ridge panel 3119; (3) the front panel 130 of the insulated inner box 124 is spaced from the first outer box side panel 104 by a third gap distance 3503 substantially equaling the length of the third shoulder portion 3251*a* of the front ridge panel 3121; and (4) the front panel 130 of the insulated inner box 124 is spaced from the second outer box end panel 110 of the outer box 102 by a fourth gap distance 3504 that substantially equals the length of the fourth shoulder portion 3251*b* of the front ridge panel 3121; (5) the rear panel 132 of the insulated inner box 124 is restrained in a spaced relationship with respect to the rear panel 108 of the outer box 102, the separation defining a fifth gap distance 3505 that substantially equals a depth of the rear ridge panel 3119; and (6) the front panel 130 of the insulated inner box 124 is restrained in a spaced relationship with respect to the front panel 110 of the outer box 102, the separation defining a sixth gap distance 3506 that substantially equals a depth of the front ridge panel 3121.

The method of assembling the shipping assembly 3000 includes positioning the insulation wrap 500 about the outer periphery 3500 (FIG. 9A) of the insulated inner box 124. This positioning step can be performed before the step of inserting the insulated inner box 124 into the outer box cavity 113, such that the insulated inner box 124 with the insulation wrap 500 surrounding it are together inserted into the outer box cavity 113. As best seen in FIG. 6, the fully-inserted insulation wrap 500 is positioned within the peripheral space between the insulated inner box 124 and the outer box 102 defined by the aforementioned gap distances.

The method of assembling the shipping assembly 3000 can further include the step of partially inserting the top insulator box assembly 134' into the inner box cavity 156 of the insulated inner box 124, such that the first overhang portion O1 of the top panel 135 and the second overhang portion O2 of the top panel 135 rest upon the ridge 158 of the insulated inner box 124.

The Outer Box Blank 300 (FIG. 16)

FIG. 16 is a top view of an outer box blank 300 for the outer box 102, from the perspective of viewing the inside surface of the outer box blank 300. The outer box blank 300 includes the first outer box side panel 104, which defines a first side 103, a second side 107, a third side 306, and a fourth side 322. As shown, the second side 107 can be distal from the first side 103, and the fourth side 322 can be distal from the third side 306. In some aspects, as shown, the first outer box side panel 104 can define a rectangular shape. In other aspects, the first outer box side panel 104 can define a non-rectangular shape such as polygonal shape with fewer than four or more than four sides 103, 107,306,322 or even a rounded shape. Adjacent sides such as the sides 103,306, the sides 306, 107, the sides 107,322, and the sides 322, 103 can intersect at corners of the first outer box side panel 104.

A rear panel 108 can extend from at least a portion of the first side 103 of the first outer box side panel 104, the rear panel 108 joined to the first outer box side panel 104 along a fold line 103. The numbering convention used herein, where the same reference numeral denotes both a side and a fold line (such as the "103" just recited for both the first side and the fold line), is intentional and is meant to convey that the fold line runs along the length of the side assigned the same reference numeral as the side. The fold line 103 defines a joint between the first outer box side panel 104 and the rear panel 108. The rear panel 108 further defines a second side 105, a third side defining the rear ridge panel fold line 3161 at a top side 3161 of the rear panel 108, and a fourth side 326. As shown, the second side 105 can be distal from the first side 103, and the fourth side 326 can be distal from the third side 3161. In some aspects, as shown, the rear panel 108 can define a rectangular shape. In other aspects, the rear panel 108 can define a non-rectangular shape such as polygonal shape with fewer than four or more than four sides 103, 105,3161,326 or even a rounded shape. Adjacent sides such as the sides 103,336, the sides 326, 105, the sides 105,3161, and the sides 3161, 103 can intersect at corners of the rear panel 108.

A rear ridge panel 3119 can extend from at least a portion of the rear ridge panel fold line 3161, the rear ridge panel fold line 3161 defining a joint between the rear panel 108 and the rear ridge panel 3119. The ridge panel 3119 can define an elongated side 3179 opposite the rear ridge panel fold line 3161, a first end 3175 extending between the rear ridge panel fold line 3161 and the elongated side 3179, and a second end 3177 opposite the first end 3175, the second end 3177 also extending between the second fold line 3161 and the elongated side 3179. Thus, the rear ridge panel 3119 can be defined by the rear ridge panel fold line 3161 as its first side, the elongated side 3179 as its second side, the first end 3175 as its third side, and the second end 3177 as its fourth side. In some aspects, as shown, the rear ridge panel 3119 can define a rectangular shape. In some aspects, the rear ridge panel 3119 can define a non-rectangular shape such as polygonal shape with fewer than four or more than four sides 3161,3179,3175,3177, or even a rounded shape. Adjacent sides such as the sides 3161,3175, the sides 3175,3179, the sides 3179,3177, and the sides 3177,3161 can intersect at corners of the rear ridge panel 3119.

A rear retention flap 3118 can extend from a portion of the elongated side 3179 of the rear ridge panel 3119, the portion of the elongated side 3179 defining a rear retention flap fold line 3163, the rear retention flap fold line 3163 defining a joint between the rear retention flap 3118 and the rear ridge panel 3119. The rear retention flap 3118 can define a free edge 3165 opposite the elongated side 3179, a first edge 3171 extending between the elongated side 3179 and the free edge 3165, and a second edge 3173 opposite the first edge 3171, the second edge 3173 also extending between the elongated side 3179 and the free edge 3165. In some aspects, the first edge 3171 of the rear retention flap 3118 can further define the first chamfered portion 3167 that extends at an angle with respect to the free edge 3165 of the rear retention flap 3118, and the second edge 3173 of the rear retention flap 3118 can define a second chamfered portion 3169 that also extends at an angle to the free edge 3165.

The rear ridge panel 3119 can further define a first shoulder portion 3179*a* extending along the elongated side 3179 for a first length measured from the first end 3175 of the rear ridge panel 3119 to the first edge 3171 of the rear retention flap 3118. The rear ridge panel 3119 can also define a second shoulder portion 3179*b* extending along the elongated side 3179 for a second length measured from the second end 3177 of the rear ridge panel 3119 to the second edge 3173 of the retention flap 3118. The first end 3175 of the rear ridge panel 3119 can be configured to frictionally engage at least a portion of an inside surface 106*a* of the second outer box side panel 106, while the second end 3177 of the rear ridge panel 3119 can be configured to frictionally engage an inner surface 104*a* of the first outer box side panel 104, upon assembly of the outer box 102 from the outer box blank 300. In such a configuration, a rear panel 132 of the insulated inner box 124 engaged by the rear retention flap 3118 is spaced from the inside surface: (i) 104*a* of the first outer box side panel 104 by a first gap distance 3501 (FIGS. 6 and 7) substantially equaling the second length of the second shoulder portion 3179*b*, and (ii) 106*a* of the second outer box side panel 106 by a second gap distance 3502 (FIGS. 6 and 7) substantially equaling the first length of the first shoulder portion 3179*a*.

A second outer box side panel 106 can extend from at least a portion of the second side 105 of the rear panel 108, the second outer box side panel 106 joined to the rear panel 108 along a fold line 105 defining a joint between the second outer box side panel 106 and the rear panel 108. The second outer box side panel 106 can further define a second side panel end 109 opposite the fold line 105, third side 308, and a fourth side 324 opposite the third side 308. Thus, the second outer box side panel 106 can be defined by the fold line 105 as its first side, the second side panel end 109 as its second side, the third side 308, and the fourth side 324. In some aspects, as shown, the second outer box side panel 106 can define a rectangular shape. In some aspects, the second outer box side panel 106 can define a non-rectangular shape such as polygonal shape with fewer than four or more than four sides 105, 109,308,324, or even a rounded shape. Adjacent sides such as the sides 103,326, the sides 326,109, the sides 109,308, and the sides 308,105 can intersect at corners of the second outer box side panel 106.

A front panel 110 can extend from the second side 107 of the first outer box side panel 104, the front panel 110 joined to the first outer box side panel 104 along a fold line 107 defining a joint between the first outer box side panel 104 and the front panel 110. The front panel 110 can define an outer edge 304 opposite the fold line 107, the front ridge panel fold line 3236, and a fourth side 328 opposite the front ridge panel fold line 3236. Thus, the front panel 110 can be defined by the fold line 107 as its first side, the outer edge 304 as its second side, the front ridge panel fold line 3236 as its third side, and the fourth side 328. In some aspects, as shown, the front panel 110 can define a rectangular shape. In some aspects, the front panel 110 can define a non-rectangular shape such as polygonal shape with fewer than four or more than four sides 107,304,3236,328, or even a rounded shape. Adjacent sides such as the sides 107,3236, the sides 3236,304, the sides 304,328, and the sides 328, 107 can intersect at corners of the front panel 110.

In some aspects, the outer box blank 300 can further comprise a connection tab 117 extending from at least a portion of the second side panel end 109 of the second outer box side panel 106, the connection tab 117 configured to attach to a surface of the front panel 110 when the outer box 102 is assembled. The connection tab 117 can define an outer edge 302 opposite a line defining a junction between the connection tab 117 and the second side panel end 109.

A front ridge panel 3121 can extend from at least a portion of the front ridge panel fold line 3236, the front ridge panel fold line 3236 defining a joint between the front panel 110 and the front ridge panel 3121. The front ridge panel 3121 can define an elongated side 3251 opposite the fold line 3236, a first end 3252 extending between the front ridge panel fold line 3236 and the elongated side 3251, and a second end 3254 opposite the first end 3252, the second end 3252 also extending between the front ridge panel fold line 3236 and the elongated side 3251. Thus, the front ridge panel 3121 can be defined by the front ridge panel fold line 3236 as its first side, the elongated side 3251 as its second side, the first end 3252 as its third side, and the second end 3254 as its fourth side. In some aspects, as shown, the front ridge panel 3121 can define a rectangular shape. In some aspects, the front ridge panel 3121 can define a non-rectangular shape such as polygonal shape with fewer than four or more than four sides 3236,3251,3252,3254, or even a rounded shape. Adjacent sides such as the sides 3236,3252, the sides 3252,3251, the sides 3251,3254, and the sides 3254,3236 can intersect at corners of the front ridge panel 3121.

A front retention flap 3120 can extend from a portion of the elongated side 3251, the portion of the elongated side 3251 defining a fold line 3238, the fold line 3238 defining a joint between the front retention flap 3120 and the front ridge panel 3121. The front retention flap 3120 can define a free edge 3240 opposite the elongated side 3251, a third edge 3246 extending between the elongated side 3251 and the free edge 3240, and a fourth edge 3250 opposite the third edge 3246, the fourth edge 3250 also extending between the elongated side 3251 and the free edge 3240. In some aspects, the third edge 3246 of the front retention flap 3120 can define the third chamfered portion 3242 that extends at an angle with respect to the free edge 3240 of the front retention flap 3120, and the fourth edge 3250 of the front retention flap 3120 can define a fourth chamfered portion 3244 that also extends at an angle to the free edge 3240.

The front ridge panel 3121 can further define a third shoulder portion **3251*a* extending along the elongated side 3251 for a third length measured from the first end 3252 of the front ridge panel 3121 to the third edge 3246 of the front retention flap 3120, and a fourth shoulder portion 3251*b* extending along the elongated side 3251 for a fourth length measured from the second end 3252 of the front ridge panel 3121 to the fourth edge 3250 of the front retention flap 3120. The first end 3252 of the front ridge panel 3121 can be configured to frictionally engage at least a portion of an inside surface 104*a* of the first outer box side panel 104, while the second end 3254 of the front ridge panel 3121 can be configured to frictionally engage an inner surface 106*a* of the second outer box side panel 106, upon assembly of the outer box 102 from the outer box blank 300. In such a configuration, a front panel 130 of the insulated inner box 124 engaged by the front retention flap 3120 is spaced from the inside surface: (i) 104*a* of the first outer box side panel 104 by a third gap distance 3503 (FIG. 6) substantially equaling the third length of the third shoulder portion 3251*a*, and (ii) 106*a* of the second outer box side panel 106 by a fourth gap distance 3504 (FIG. 6) substantially equaling the fourth length of the fourth shoulder portion 3251*b***.

A first top flap 114 can extend from at least a portion of the third side 306 of the first outer box side panel 104, and the third side 306 can define a fold line 306 that defines a joint between the first top flap 114 and the first outer box side panel 104. The first top flap 114 can further define a free (distal) edge 310 opposite the fold line 306, a first end 312, and a second end 314 opposite the first end 312. Thus, the first top flap 114 can be defined by the fold line 306 as its first side, the free edge 310 as its second side, the first end 312 as its third side, and the second end 314 as its fourth side. In some aspects, as shown, the first top flap 114 can define a rectangular shape. In some aspects, the first top flap 114 can define a non-rectangular shape such as polygonal shape with fewer than four or more than four sides 306,310, 312,314, or even a rounded shape. Adjacent sides such as the sides 306,312, the sides 312,310, the sides 310,314, and the sides 314,306 can intersect at corners of the first top flap 114.

A second top flap 116 can extend from at least a portion of the third side 308 of the second outer box side panel 106, and the third side 308 can define a fold line 308 that defines a joint between the second top flap 116 and the second outer box side panel 106. The second top flap 116 can further define a free (distal) edge 316 opposite the fold line 308, a first end 318, and a second end 320 opposite the first end 318. Thus, the second top flap 116 can be defined by the fold line 308 as its first side, the free edge 316 as its second side, the first end 318 as its third side, and the second end 320 as its fourth side. In some aspects, as shown, the second top flap 116 can define a rectangular shape. In some aspects, the second top flap 116 can define a non-rectangular shape such as polygonal shape with fewer than four or more than four sides 308,316,318,320, or even a rounded shape. Adjacent sides such as the sides 308,318, the sides 318,316, the sides 316,320, and the sides 320,308 can intersect at corners of the second top flap 116.

A first side bottom flap **112*a* can extend from at least a portion of the fourth side 322 of the first outer box side panel 104, and the fourth side 322 can define a fold line 308 that defines a joint between the first side bottom flap 112*a* and the first outer box side panel 104. The first side bottom flap 112*a* can further define a free (distal) edge 342 opposite the fold line 322, a first end 344, and a second end 346 opposite the first end 344. Thus, first side bottom flap 112*a* can be defined by the fold line 322 as its first side, the free edge 342 as its second side, the first end 344 as its third side, and the second end 346 as its fourth side. In some aspects, as shown, the first side bottom flap 112*a* can define a rectangular shape. In some aspects, the first side bottom flap 112***a* can define a non-rectangular shape such as polygonal shape with fewer than four or more than four sides 322,342,344,346, or even a rounded shape. Adjacent sides such as the sides 322,346, the sides 346,342, the sides 342,344, and the sides 344,322 can intersect at corners of the first side bottom flap 112*a*.

A second side bottom flap 112*b* can extend from at least a portion of the fourth side 324 of the second outer box side panel 106, and the fourth side 324 can define a fold line 324 that defines a joint between the second side bottom flap 112*b* and the second outer box side panel 106. The second side bottom flap 112*b* can further define a free (distal) edge 348 opposite the fold line 324, a first end 350, and a second end 352 opposite the first end 350. Thus, the second side bottom flap 112*b* can be defined by the fold line 324 as its first side, the free edge 348 as its second side, the first end 350 as its third side, and the second end 352 as its fourth side. In some aspects, as shown, the second side bottom flap 112*b* can define a rectangular shape. In some aspects, the second side bottom flap 112*b* can define a non-rectangular shape such as polygonal shape with fewer than four or more than four sides 324,348,350,352, or even a rounded shape. Adjacent sides such as the sides 324,352, the sides 352,348, the sides 348,350, and the sides 350,324 can intersect at corners of the second side bottom flap 112*b*.

A first end bottom flap 111*a* can extend from at least a portion of the fourth side 326 of the rear panel 108, and the fourth side 326 can define a fold line 336 that defines a joint between the first end bottom flap 111*a* and the rear panel 108. The first end bottom flap 111*a* can further define a free (distal) edge 330 opposite the fold line 326, a first end 332, and a second end 334 opposite the first end 332. Thus, the first end bottom flap 111*a* can be defined by the fold line 326 as its first side, the free edge 330 as its second side, the first end 332 as its third side, and the second end 334 as its fourth side. In some aspects, as shown, the first end bottom flap 111*a* can define a rectangular shape. In some aspects, the first end bottom flap 111*a* can define a non-rectangular shape such as polygonal shape with fewer than four or more than four sides 326,330,332,334, or even a rounded shape. Adjacent sides such as the sides 326,334, the sides 334,330, the sides 330,332, and the sides 332,326 can intersect at corners of the first end bottom flap 111*a*.

A second end bottom flap 111*b* can extend from at least a portion of the fourth side 328 of the front panel 110, and the fourth side 328 can define a fold line 328 that defines a joint between the second end bottom flap 111*b* and the front panel 110. The second end bottom flap 111*b* can further define a free (distal) edge 336 opposite the fold line 328, a first end 338, and a second end 340 opposite the first end 338. Thus, the second end bottom flap 111*b* can be defined by the fold line 328 as its first side, the free edge 336 as its second side, the first end 338 as its third side, and the second end 340 as its fourth side. In some aspects, as shown, the second end bottom flap 111*b* can define a rectangular shape. In some aspects, the second end bottom flap 111*b* can define a non-rectangular shape such as polygonal shape with fewer than four or more than four sides 328,336,340,342, or even a rounded shape. Adjacent sides such as the sides 328,340, the sides 340,336, the sides 336,338, and the sides 338,328 can intersect at corners of the second end bottom flap 111*b*.

The Insulated Inner Box Blank 400 (FIG. 17)

FIG. 17 is a top view of an insulated inner box blank 400 for the insulated inner box 124, from the perspective of viewing the inside surface of the inner box blank 400. The insulated inner box blank 400 includes the first side panel 126, which defines a top side 126*b*, a second side 331 adjacent to the top side 126*b*, a third side 133 opposite the second side 331, and a fourth side 380 opposite the top side 126*b*. In some aspects, as shown, the first side panel 126 can define a rectangular shape. In some aspects, the first side panel 126 can define a non-rectangular shape such as polygonal shape with fewer than four or more than four sides 126*b*, 331, 133,380, or even a rounded shape. Adjacent sides such as the sides 126*b*, 133, the sides 133,380, the sides 380,331, and the sides 331, 126*b* can intersect at corners of the first side panel 126.

A first top flap 126*a* can extend from at least a portion of the top side 126*b* of the first side panel 126, the first top flap 126*a* joined to the first side panel 126 along a fold line 126*b* defining a joint between the first top flap 126*a* and the first side panel 126, the first top flap 126*a* defining a first top flap edge 356 opposite the fold line 126*b*, a first side 361, a second side 362 opposite the first side 361. In some aspects, as shown, the second end bottom flap 111*b* can define a rectangular shape. In some aspects, the first top flap 126*a* can define a non-rectangular shape such as polygonal shape with fewer than four or more than four sides 126*b*,356,361, 362, or even a rounded shape. Adjacent sides such as the sides 126*b*,361, the sides 361,356, the sides 356,362, and the sides 362, 126*b* can intersect at corners of the first top flap 126*a*.

A front panel 130 can extend from at least a portion of the second side 331 of the first side panel 126, the front panel 130 joined to the first side panel 126 along a fold line 331, the fold line 331 defining a joint between the first side panel 126 and the front panel 130. The fold line 331 can further define a first side of the front panel 130, and the front panel 130 can further define a second side 333 opposite the fold line 331, a top side 130*b* adjacent to the fold line 331, and a fourth side 384 opposite the top side 130*b*. In some aspects, as shown, the front panel 130 can define a rectangular shape. In some aspects, the front panel 130 can define a non-rectangular shape such as polygonal shape with fewer than four or more than four sides 331,333, 130*b*,384, or even a rounded shape. Adjacent sides such as the sides 331,384, the sides 384,333, the sides 333, 130*b*, and the sides 130*b*, 331 can intersect at corners of the front panel 130.

A second top flap 130*a* can extend from at least a portion of the top side 130*b* of the front panel 130, the second top flap 130*a* joined to the front panel 130 along a fold line 130*b* defined by the top side 130*b* of the front panel 130, the fold line 130*b* defining a joint between the front panel 130 and the second top flap 130*a*. The second top flap 130*a* can define a second top flap edge 364 opposite the fold line 130*b*, a first side 366, and a second side opposite the first side 366, the second side of the second top flap 130*a* defined by the first side 361 of the first top flap 126*a*. In some aspects, as shown, second top flap 130*a* can define a rectangular shape. In some aspects, second top flap 130*a* can define a non-rectangular shape such as polygonal shape with fewer than four or more than four sides 130*b*, 364,366,361, or even a rounded shape. Adjacent sides such as the sides 130*b*,366, the sides 366,364, the sides 364,361, and the sides 361, 130*b* can intersect at corners of the second top flap 130*a*.

The first side 361 of the first top flap 126*a* can define a first cut-out section 358 extending downwardly from the first top flap edge 356 and from the second top flap edge 364, a second cut-out section 359 axially spaced from the first cut-out section 358, the second cut-out section 359 forming a partial gap between the first top flap 126*a* and the second top flap 130*a*, and a fold line 360 axially extending between the first cut-out section 358 and the second cut-out section 359, the fourth fold line 360 defining a joint between the first top flap 126*a* and the second top flap 130*a*.

A second side panel 128 can extend from at least a portion of the second side 333 of the front panel 130, the second side panel 128 joined to the front panel 130 along a fold line 333, the fold line 333 defining a joint between the second side panel 128 and the front panel 130. The second side panel 128 can defining an end 131 opposite the fold line 333; a top side 128*b*, and a bottom side 382 opposite the top side 128*b*. Thus, the second side panel 128 can be defined by the fold line 333 as its first side, the end 131 as its second side, the top side 128*b* as its third side, and the bottom side 382 as its fourth side. In some aspects, as shown, the second side panel 128 can define a rectangular shape. In some aspects, the second side panel 128 can define a non-rectangular shape such as polygonal shape with fewer than four or more than four sides 333, 131, 128*b*,382, or even a rounded shape. Adjacent sides such as the sides 333,382, the sides 382, 131, the sides 131, 128*b*, and the sides 128*b*,333 can intersect at corners of the second side panel 128.

A rear panel 132 can extend from at least a portion of the third side 133 of the first side panel 126, the rear panel 132 joined to the first side panel 126 along a fold line 133, the fold line 133 defining a joint between the rear panel 132 and the first side panel 126. The rear panel 132 can define a panel edge 325 opposite the fold line 133, a top side 132*b*, and a bottom side 386 opposite top side 132*b*. Thus, the rear panel 132 can be defined by the fold line 133 as its first side, the panel edge 325 as its second side, the top side 132*b* as its third side, and the bottom side 386 as its fourth side. In some aspects, as shown, the rear panel 132 can define a rectangular shape. In some aspects, the rear panel 132 can define a non-rectangular shape such as polygonal shape with fewer than four or more than four sides 133,325, 132*b*, 386, or even a rounded shape. Adjacent sides such as the sides 133,132*b*, the sides 132*b*, 325, the sides 325,386, and the sides 386, 133 can intersect at corners of the rear panel 132.

In some aspects, a side panel connection tab 327 can extend from at least a portion of the end 131 of the second side panel 128, the side panel connection tab 327 configured to attach to a surface of the rear panel 132 when the insulated inner box 124 is assembled from the insulated inner box blank 400. The side panel connection tab 327 can define an outer edge 234, which is visible in the views of the assembled insulated inner box 124 shown in FIGS. 9A, 15A, and 15B.

A third top flap 128*a* can extend from at least a portion of the top side 128*b* of the second side panel 128, the third top flap 128*a* joined to the second side panel 128 along a fold line 128*b*, the fold line 128*b* defining a joint between the third top flap 128*a* and the second side panel 128. The third top flap 128*a* can define a third top flap edge 368 opposite the fold line 128*b*, a first side 370, and a second side 372 opposite the first side 370. In some aspects, as shown, the third top flap 128*a* can define a rectangular shape. In some aspects, the third top flap 128*a* can define a non-rectangular shape such as polygonal shape with fewer than four or more than four sides 128*b*,368,370,372, or even a rounded shape. Adjacent sides such as the sides 128*b*,370 the sides 370,368, the sides 368,372, and the sides 372, 128*b* can intersect at corners of the third top flap 128*a*.

A fourth top flap 132*a* can extend from at least a portion of the top side 132*b* of the rear panel 132, the fourth top flap 132*a* joined to the rear panel 132 along a fold line 132*b*, the fold line 132*b* defining a joint between the fourth top flap 132*a* and the rear panel 132. The fourth top flap 132*a* can define a fourth top flap edge 377 opposite the fold line 132*b*, a first side 378, and a second side 379 opposite the first side 378. Opposite the fold line 128*b*, a first side 370, and a second side 372 opposite the first side 370. In some aspects, as shown, the fourth top flap 132*a* can define a rectangular shape. In some aspects, the fourth top flap 132*a* can define a non-rectangular shape such as polygonal shape with fewer than four or more than four sides 132*b*,377,378,379, or even a rounded shape. Adjacent sides such as the sides 132*b*,378, the sides 378,377, the sides 377,379, and the sides 379, 132*b* can intersect at corners of the fourth top flap 132*a*.

In some aspects, a top flap connection tab 329 can be attached to the first side 370 of the third top flap 128*a*, the top flap connection tab 329 configured to attach to a surface of the fourth top flap 132*a* when the insulated inner box 124 is assembled from the insulated inner box blank 400. The first side 370 of the third top flap 128*a* can define a third cut-out section 371 defined between the top flap connection tab 329 and the third top flap 128*a*; a fourth cut-out section 373 axially spaced from the third cut-out section 371, the fourth cut-out section 373 forming a partial gap between the top flap connection tab 329 and the third top flap 128*a*; and a fold line 374 axially extending between the third cut-out section 371 and the fourth cut-out section 359, the fold line 374 defining a joint between the top flap connection tab 329 and the third top flap 128*a*. In some aspects, another fold line 375 can be defined between the side panel connection tab 327 and the top flap connection tab 329. The top flap connection tab 329 can also define an outer edge 376 opposite the fold line 374.

A first side bottom flap 154*a* can extend from at least a portion of the fourth side 380 of the first side panel 126, and the fourth side 380 can define a fold line 380 that defines a joint between the first side bottom flap 154*a* and the first side panel 126. The first side bottom flap 154*a* can further define a free (distal) edge 386 opposite the fold line 380, a first end 388, and a second end 390 opposite the first end 388. Thus, first side bottom flap 154*a* can be defined by the fold line 380 as its first side, the free edge 386 as its second side, the first end 388 as its third side, and the second end 390 as its fourth side. In some aspects, as shown, the first side bottom flap 154*a* can define a rectangular shape. In some aspects, the first side bottom flap 154*a* can define a non-rectangular shape such as polygonal shape with fewer than four or more than four sides 380,386,388,390, or even a rounded shape. Adjacent sides such as the sides 380,390, the sides 390,386, the sides 386,388, and the sides 388,380 can intersect at corners of the first side bottom flap 154*a*.

A second side bottom flap 154*b* can extend from at least a portion of the fourth side 382 of the second side panel 128, and the fourth side 382 can define a fold line 382 that defines a joint between the second side bottom flap 154*b* and the second side panel 128. The second side bottom flap 154*b* can further define a free (distal) edge 398 opposite the fold line 382, a first end 394, and a second end 396 opposite the first end 394. Thus, the second side bottom flap 154*b* can be defined by the fold line 382 as its first side, the free edge 398 as its second side, the first end 394 as its third side, and the second end 396 as its fourth side. In some aspects, as shown, the second side bottom flap 154*b* can define a rectangular shape. In some aspects, the second side bottom flap 154*b* can define a non-rectangular shape such as polygonal shape with fewer than four or more than four sides 382,398,394,396, or even a rounded shape. Adjacent sides such as the sides 382,396, the sides 396,398, the sides 398,394, and the sides 394,382 can intersect at corners of the second side bottom flap 154*b*.

A front bottom flap 155*a* can extend from at least a portion of the fourth side 384 of the front panel 130, and the fourth side 384 can define a fold line 384 that defines a joint between the front bottom flap 155*a* and the front panel 130. The front bottom flap 155*a* can further define a free (distal) edge 392 opposite the fold line 384, a first end 354, and a second end 402 opposite the first end 354. Thus, the front bottom flap 155*a* can be defined by the fold line 384 as its first side, the free edge 392 as its second side, the first end 354 as its third side, and the second end 402 as its fourth side. In some aspects, as shown, the front bottom flap 155*a* can define a rectangular shape. In some aspects, the front bottom flap 155*a* can define a non-rectangular shape such as polygonal shape with fewer than four or more than four sides 384,392,354,402, or even a rounded shape. Adjacent sides such as the sides 384,388, the sides 388,392, the sides 392,354, and the sides 354,384 can intersect at corners of the front bottom flap 155*a*.

A rear bottom flap 155*b* can extend from at least a portion of the fourth side 386 of the rear panel 132, and the fourth side 386 can define a fold line 386 that defines a joint between the rear bottom flap 155*b* and the rear panel 132. The rear bottom flap 155*b* can further define a free (distal) edge 404 opposite the fold line 386, a first end 406, and a second end 408 opposite the first end 406. Thus, the rear bottom flap 155*b* can be defined by the fold line 386 as its first side, the free edge 404 as its second side, the first end 406 as its third side, and the second end 408 as its fourth side. In some aspects, as shown, the rear bottom flap 155*b* can define a rectangular shape. In some aspects, the rear bottom flap 155*b* can define a non-rectangular shape such as polygonal shape with fewer than four or more than four sides 386,404,406,408, or even a rounded shape. Adjacent sides such as the sides 386,408, the sides 408,404, the sides 404,406, and the sides 406,386 can intersect at corners of the rear bottom flap 155*b*.

The Bottom Insulator Box Blank 410 (FIG. 18)

FIG. 18 is a top view of a blank 410 for the bottom insulator box 122, from the perspective of viewing the inside surface of the blank 410. The bottom insulator box blank 410 includes a right side panel 150 defining a first side 207, a second side 209 opposite the first side 207, a third side 211, and a fourth side 213 opposite the third side 211. In some aspects, as shown, the right side panel 150 can define a rectangular shape. In some aspects, the right side panel 150 can define a non-rectangular shape such as polygonal shape with fewer than four or more than four sides 207,209,211, 213, or even a rounded shape. Adjacent sides such as the sides 207, 213, the sides 213,209, the sides 209,211, and the sides 211,207 can intersect at corners of the right side panel 150.

A top panel 144 can extend from at least a portion of the first side 207 of the right side panel 150, the top panel 144 joined to the right side panel 150 along a fold line 207 defining a joint between the top panel 144 and the right side panel 150. The top panel 144 can define a first side along the fold line 207, a second side 205 opposite the fold line 207, a third side 199, and a fourth side 203 opposite the third side 199. In some aspects, as shown, the top panel 144 can define a rectangular shape. In some aspects, the top panel 144 can define a non-rectangular shape such as polygonal shape with fewer than four or more than four sides 207,205, 199,203, or even a rounded shape. Adjacent sides such as the sides 207,199, the sides 199,205, the sides 205,203, and the sides 203,207 can intersect at corners of the top panel 144.

In some aspects, the top panel 144 can define thumb hole cut-out sections 144*a,b* configured to facilitate lifting of the bottom insulator box 122 out of the outer box 102. The thumb hole cut-out sections 144*a,b* can respectively define thumb hole flaps 144*c,d*. The thumb hole flap 144*c* can be joined to the top panel 144 by a fold line 231*a*, and the thumb hole flap 144*d* can be joined to the top panel 144 by a fold line 231*b*.

An upper left side flap 194 can extend from at least a portion of the second side 205 of the top panel 144, the upper left side flap 194 joined to the top panel 144 along a fold line 205 defining a joint between the upper left side flap 194 and the top panel 144. The upper left side flap 194 can define a distal edge 195 opposite the fold line 205, a first end 191, and a second end 193 opposite the first end 191. In some aspects, as shown, the upper left side flap 194 can define a rectangular shape. In some aspects, the upper left side flap 194 can define a non-rectangular shape such as polygonal shape with fewer than four or more than four sides 205, 195, 191, 193, or even a rounded shape. Adjacent sides such as the sides 205, 191, the sides 191, 195, the sides 195, 193, and the sides 193,205 can intersect at corners of the upper left side flap 194.

A side locking tab 198 can extend from a portion of the distal edge 195 of the upper left side flap 194, the side locking tab 198 joined to the upper left side flap 194 along a fold line 195*a* defining a joint between the side locking tab 198 and the upper left side flap 194.

An upper rear flap 145 can extend from at least a portion of the third side 199 of the top panel 144, the upper rear flap 145 joined to the top panel 144 along a fold line 199 defining a joint between the upper rear flap 145 and the top panel 144. The upper rear flap 145 can define distal edge 219 opposite the fold line 199, a first end 221, and a second end 223 opposite the first end 221. In some aspects, as shown, the upper rear flap 145 can define a rectangular shape. In some aspects, the upper rear flap 145 can define a non-rectangular shape such as polygonal shape with fewer than four or more than four sides 199,219,221,223, or even a rounded shape. Adjacent sides such as the sides 199,223, the sides 223,219, the sides 219,221, and the sides 221, 199 can intersect at corners of the upper rear flap 145.

A rear locking tab 412 can extend from a portion of the distal edge 219 of the upper rear flap 145, the rear locking tab 412 joined to the upper rear flap 145 along a fold line 145*a* defining a joint between the rear locking tab 412 and the upper rear flap 145.

A bottom panel 146 can extend from at least a portion of the second side 209 of the right side panel 150, the bottom panel 146 joined to the right side panel 150 along a fold line 209 defining a joint between the bottom panel 146 and the right side panel 150. The bottom panel 146 can define a first side along the fold line 209, a second side 197 opposite the fold line 207, a third side 215, and a fourth side 217 opposite the third side 215. In some aspects, as shown, the bottom panel 146 can define a rectangular shape. In some aspects, the bottom panel 146 can define a non-rectangular shape such as polygonal shape with fewer than four or more than four sides 209, 197,215,217, or even a rounded shape. Adjacent sides such as the sides 209,217, the sides 217, 197, the sides 197,215, and the sides 215,209 can intersect at corners of the bottom panel 146.

In some aspects, the bottom panel 146 can define a thumb hole cut-out sections 146*a,b* configured to facilitate lifting of the bottom insulator box 122 out of the outer box 102 when the bottom insulator box 122 has been positioned in the outer box 102 with the bottom panel 146 facing upwardly. The thumb hole cut-out sections 146*a,b* respectively define thumb hole flaps 146*c,d*. The thumb hole flap 146*c* is joined to the bottom panel 146 by a fold line 233*a*, and the thumb hole flap 146*d* is joined to the bottom panel 146 by a fold line 233*b*.

A lower left side flap 196 can extend from at least a portion of the second side 197 of the bottom panel 146 the lower left side flap 196 joined to the bottom panel 146 along a fold line 197 defining a joint between the lower left side flap 196 and the bottom panel 146. The lower left side flap 196 can define a distal edge 401 opposite the fold line 197, a first end 415, and a second end 417 opposite the first end 415. In some aspects, as shown, the lower left side flap 196 can define a rectangular shape. In some aspects, the lower left side flap 196 can define a non-rectangular shape such as polygonal shape with fewer than four or more than four sides 197,401,415,417, or even a rounded shape. Adjacent sides such as the sides 197,417, the sides 417,401, the sides 401,415, and the sides 415, 197 can intersect at corners of the lower left side flap 196. In some aspects, the lower left side flap 196 can define a side slot 196*a*, the side slot 196*a* configured to receive the side locking tab 198 when a bottom insulator box 122 is assembled from the bottom insulator box blank 410. Further, the side locking tab 198 can be configured to maintain a closed configuration between the top panel 144 and the bottom panel 146 following insertion of the side locking tab 198 into the side slot 196*a*.

A lower rear flap 416 can extend from at least a portion of the third side 215 of the bottom panel 146, the lower rear flap 416 joined to the bottom panel 146 along a fold line 215 defining a joint between the lower rear flap 416 and the bottom panel 146. The lower rear flap 416 can define a distal edge 403 opposite the fold line 215, a first end 405, and a second end 407 opposite the first end 405. In some aspects, as shown, the lower rear flap 416 can define a rectangular shape. In some aspects, the lower rear flap 416 can define a non-rectangular shape such as polygonal shape with fewer than four or more than four sides 215,403,405,407, or even a rounded shape. Adjacent sides such as the sides 215,407, the sides 407,403, the sides 403,405, and the sides 405,215 can intersect at corners of the lower rear flap 416. The lower rear flap 416 can further define a rear slot 416*a*, the rear slot 416*a* configured to receive the rear locking tab 412 when the bottom insulator box 122 is assembled from the bottom insulator box blank 410. Further, the rear locking tab 412 can be configured to maintain a closed configuration between the upper rear flap 145 and the lower rear flap 416 following insertion of the rear locking tab 412 into the rear slot 416*a*.

An upper front flap 147 can extend from at least a portion of the fourth side 203 of the top panel 144, the upper front flap 147 joined to the top panel 144 along a fold line 203 defining a joint between the upper front flap 147 and the top panel 144. The upper front flap 147 can define a distal edge 225 opposite the fold line 203, a first end 227, and a second end 229 opposite the first end 227. In some aspects, as shown, the upper front flap 147 can define a rectangular shape. In some aspects, the upper front flap 147 can define a non-rectangular shape such as polygonal shape with fewer than four or more than four sides 203,225,227,229, or even a rounded shape. Adjacent sides such as the sides 203,227, the sides 227,225, the sides 225,229, and the sides 229,203 can intersect at corners of the upper front flap 147. In some aspects, a front locking tab 414 can extend from a portion of the distal edge 225 of the upper front flap 147, the front locking tab 414 joined to the upper front flap 147 along a tenth fold line 147*a* defining a joint between the front locking tab 414 and the upper front flap 147.

A lower front flap 418 can extend from at least a portion of the fourth side 217 of the bottom panel 146, the lower front flap 418 joined to the bottom panel 146 along a fold line 217 defining a joint between the lower front flap 418 and the bottom panel 146. The lower front flap 418 can define a distal edge 409 opposite the fold line 217, a first end 411, and a second end 413 opposite the first end 411. In some aspects, as shown, the lower front flap 418 can define a rectangular shape. In some aspects, the lower front flap 418 can define a non-rectangular shape such as polygonal shape with fewer than four or more than four sides 217,409,411,413, or even a rounded shape. Adjacent sides such as the sides 217,411, the sides 411,409, the sides 409,413, and the sides 413,217 can intersect at corners of the lower front flap 418. In some aspects, the lower front flap 418 can further define a front slot 418*a*, the front slot 418*a* configured to receive the front locking tab 414 when the bottom insulator box 122 is assembled from the bottom insulator box blank 410. Further, the front locking tab 414 can be configured to maintain a closed configuration between the upper front flap 147 and the lower front flap 418 following insertion of the front locking tab 414 into the front slot 418*a*.

The Top Insulator Box Blank 420 (FIG. 19)

FIG. 19 is a top view of a blank 420 for the top insulator box 134, from the perspective of viewing the inside surface of the blank 420. The top insulator box blank 420 includes an end panel 140 defining a first side 424, a second side 426 opposite the first side 424, a third side 450, and a fourth side 452 opposite the third side 452. In some aspects, as shown, the end panel 140 can define a rectangular shape. In some aspects, the end panel 140 can define a non-rectangular shape such as polygonal shape with fewer than four or more than four sides 424,426,450,452, or even a rounded shape. Adjacent sides such as the first and fourth sides 424,452, the fourth and second sides 452,426, the second and third sides 426,450, and the third and first sides 450,424 can intersect at corners of the end panel 140.

A top panel 135 can extend from at least a portion of the first side 424 of the end panel 140, the top panel 135 joined to the end panel 140 along a fold line 424*a* defining a joint between the top panel 135 and the end panel 140, the top panel 135 defining a first side 423 along the first fold line 424*a*, a second side 422 opposite the first fold line 424*a*, a third side 210, and a fourth side 212 opposite the third side 210. In some aspects, as shown, the top panel 135 can define a rectangular shape. In some aspects, the top panel 135 can define a non-rectangular shape such as polygonal shape with fewer than four or more than four sides 423,422,210,212 or even a rounded shape. Adjacent sides such as the first and third sides 423,210, the third and second sides 210,422, the second and fourth sides 422,212, and the fourth and first sides 212, 423 can intersect at corners of the top panel 135. In some aspects, the top panel 135 can further define thumb hole cut-out sections 135*a,b* configured to facilitate lifting of the top insulator box 134 out of the outer box 102. The thumb hole cut-out sections 135*a,b* can define respective thumb hole flaps 135*c,d*. The thumb hole flap 135*c* can be joined to the top panel 135 by a fold line 421*a*, and the thumb hole flap 135*d* can be joined to the top panel 135 by a fold line 421*b*. Also in some aspects, a locking tab 216 can extend from a portion of the second side 422 of the top panel 135, the locking tab 216 joined to the top panel 135 along a fold line 422*a* defining a joint between the locking tab 216 and the top panel 135.

A bottom panel 137 can extend from at least a portion of the second side 426 of the end panel 140, the bottom panel 137 joined to the end panel 140 along a fold line 426*a* defining a joint between the bottom panel 137 and the end panel 140. The bottom panel 137 can define a first side 425 along the third fold line 426*a*, a second side 428 opposite the third fold line 426*a*, a third side 430, and a fourth side 432 opposite the third side 430. In some aspects, as shown, the bottom panel 137 can define a rectangular shape. In some aspects, the bottom panel 137 can define a non-rectangular shape such as polygonal shape with fewer than four or more than four sides 425,428,430,432 or even a rounded shape. Adjacent sides such as the first and sides 425,432, the sides 432,428, the sides 428,430, and the sides 430, 425 can intersect at corners of the bottom panel 137.

A left side panel 136 can extend from at least a portion of the third side 430 of the bottom panel 137, the left side panel 136 joined to the bottom panel 137 along a fold line 430 defining a joint between the left side panel 136 and the bottom panel 137. The left side panel 136 can define a first side along the fourth fold line 430, a second side 230 opposite the fourth fold line 430, a third side 442, and a fourth side 444 opposite the third side 442. In some aspects, as shown, the left side panel 136 can define a rectangular shape. In some aspects, the left side panel 136 can define a non-rectangular shape such as polygonal shape with fewer than four or more than four sides 430,230,442,444 or even a rounded shape. Adjacent sides such as the sides 430,442, the sides 442,230, the sides 230,444, and the sides 444,430 can intersect at corners of the left side panel 136.

A first front insulation retention flap 222 can extend from at least a portion of the third side 442 of the left side panel 136, the first front insulation retention flap 222 joined to the left side panel 136 along a fold line 442 defining a joint between the first front insulation retention flap 222 and the left side panel 136. The first front insulation retention flap 222 can further define a distal side edge 456 opposite the fold line 442, a bottom edge 454, and a top edge 458 opposite the bottom edge 454. A first rear insulation retention flap 224 can extend from at least a portion of the fourth side 444 of the left side panel 136, the first rear insulation retention flap 224 joined to the left side panel 136 along a fold line 444 defining a joint between the first rear insulation retention flap 224 and the left side panel 136. The first rear insulation retention flap 224 can further define a distal side edge 460 opposite the fold line 444, a bottom edge 450, and a top edge 462 opposite the bottom edge 450.

A left upper insulation retention flap 218 can extend from the second side 230 of the left side panel 136, the left upper insulation retention flap 218 joined to the left side panel 136 along a fold line 230 defining a joint between the left upper insulation retention flap 218 and the left side panel 136, the left upper insulation retention flap 218 defining a distal edge 472 opposite the fold line 230, a rear edge 474, and a front edge 476 opposite the rear edge 474. In some aspects, the front edge 476 of the first upper insulation retention flap 218 can be angled with respect to the distal edge 478.

A front panel 142 can extend from at least a portion of the second side 428 of the bottom panel 137, the front panel 142 joined to the bottom panel 137 along a fold line 428 defining a joint between the front panel 142 and the bottom panel 137, the front panel 142 defining a first side along the fold line 428, a second side 434 opposite the fold line 428, a third side 454, and a fourth side 456 opposite the third side 454. In some aspects, as shown, the front panel 142 can define a rectangular shape. In some aspects, the front panel 142 can define a non-rectangular shape such as polygonal shape with fewer than four or more than four sides 428,434,454,456 or even a rounded shape. Adjacent sides such as the sides 428,456, the sides 456,434, the sides 434,454, and the sides 454,428 can intersect at corners of the front panel 142.

A front upper retention flap 214 can extend from at least a portion of the second side 434 of the front panel 142, the front upper retention flap 214 joined to the front panel 142 along a fold line 434 defining a joint between the front upper retention flap 214 and the front panel 142, In some aspects, the front upper retention flap 214 can define a slot 214*a*, the slot 214*a* configured to receive the locking tab 216 when a top insulator box 134 is assembled from the top insulator box blank 420. Further, the locking tab 216 can be configured to maintain a closed configuration between the top panel 135 and the bottom panel 137 following insertion of the locking tab 216 into the slot 214*a*.

A right side panel 138 can extend from at least a portion of the fourth side 432 of the bottom panel 137, the right side panel 138 joined to the bottom panel 137 along a fold line 432 defining a joint between the right side panel 138 and the bottom panel 137. The right side panel 138 can define a first side along the fold line 432, a second side 232 opposite the fourth fold line 432, a third side 446, and a fourth side 448 opposite the third side 446. In some aspects, as shown, the right side panel 138 can define a rectangular shape. In some aspects, right side panel 138 can define a non-rectangular shape such as polygonal shape with fewer than four or more than four sides 432,232,446,448, or even a rounded shape. Adjacent sides such as the sides 432,448, the sides 448,232, the sides 232,446, and the sides 446,432 can intersect at corners of the right side panel 138.

A second front insulation retention flap 226 can extend from at least a portion of the third side 446 of the right side panel 138, the second front insulation retention flap 226 joined to the right side panel 138 along a fold line 446 defining a joint between the second front insulation retention flap 226 and the right side panel 138. The second front insulation retention flap 226 can further define a distal side edge 464 opposite the fold line 446, a bottom edge 456, and a top edge 466 opposite the bottom edge 456. A second rear insulation retention flap 228 can extend from at least a portion of the fourth side 448 of the right side panel 138, the second rear insulation retention flap 228 joined to the right side panel 138 along a fold line 448 defining a joint between the second rear insulation retention flap 228 and the right side panel 138. The second rear insulation retention flap 228 can further define a distal side edge 468 opposite the fold line 448, a bottom edge 452, and a top edge 470 opposite the bottom edge 452.

A right upper insulation retention flap 220 can extend from the second side 232 of the right side panel 138, the right upper insulation retention flap 220 joined to the right side panel 138 along a fold line 232 defining a joint between the right upper insulation retention flap 220 and the right side panel 138. The right upper insulation retention flap 220 can define a distal edge 478 opposite the fold line 232, a rear edge 480, and a front edge 482 opposite the rear edge 480. In some aspects, the front edge 482 of the right upper insulation retention flap 220 can be angled with respect to the distal edge 478.

CONCLUSION

The cardboard portions of the boxes disclosed above are preferably comprised entirely of curbside recyclable material, such as double-layered recyclable corrugated cardboard. Alternatively, the boxes can be constructed entirely of repulpable material, or comprised of some elements that are comprised of curbside recyclable material and some other elements that are comprised of repulpable material.

In some aspects, any of the panels and flaps of the blanks 300,400,410,420 that are described as being rectangular can be substantially rectangular (i.e., rectangular in shape minus any notches, chamfers, or other edge treatments). In some aspects, any of the panels and flaps of the blanks 300,400, 410,420 that are described as being or defining some non-rectangular shape can be substantially that shape (i.e., that shape minus any notches, chamfers, or other edge treatments).

Components of the blanks 300,400,410,420, or the shipping assembly 3000 and their arrangement, can comprise both functional and aesthetic elements, and any feature described as having functional aspects can have or define any one of several aesthetic designs without altering the respective parts' functions. If aesthetic elements are shown in the drawings or possibly fall within the scope of broader claim elements without being directly claimed, such disclosure or claims should not be interpreted as assigning any function to such aesthetic elements which can therefore be separately protectable.

One should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions might not be included or executed at all, can be executed out of order from that shown or discussed, including substantially concurrently or in reverse order, depending on the functionality involved, as would be understood by those reasonably skilled in the art of the present disclosure. Many variations and modifications can be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A shipping assembly [3000] for transporting refrigerated items, comprising:

an outer box [102] defining a bottom [112] and an outer box cavity [113];

a bottom insulator box assembly [122'] received in the outer box cavity [113] and superposed above the bottom [112] of the outer box [102], the bottom insulator box assembly [122'] comprising a closed box [122] defining a bottom insulator box cavity [152];

an insulated inner box [124] positioned in the outer box cavity [113] above the bottom insulator box assembly [122'], the insulated inner box [124] defining an inner box cavity, [156], an outer periphery [3500] and a ridge [158];

an insulation wrap [500] positioned in the outer box cavity [113], the insulation wrap surrounding the outer periphery [3500] of the insulated inner box [124], the insulation wrap [500] comprising an insulation batt core [505] defining a core surface [505*a,b*] and a sheet layer [518,520] attached to the core surface [505*a,b*]; and a top insulator box assembly [134'], comprising a top insulator box [134], wherein the top insulator box [134] defines a top insulator box cavity [139], the top insulator box [134] comprising a top panel [135] defining a first overhang portion [O1] and a second overhang portion [O2];

wherein the ridge [158] of the insulated inner box [124] defines ridge end portions [130*b*,132*b*] comprising a front ridge portion [130*b*] and an opposed rear ridge portion [132*b*], a first side portion [126*b*] extending between the ridge end portions [130*b*,132*b*], and a second side portion [128*b*] extending between the ridge end portions [130*b*,132*b*] opposite the first side portion [126]; and wherein the first overhang portion [O1] of the top panel [135] rests upon the first side portion [126*b*] of the ridge [158] and the second overhang portion [O2] of the top panel [135] rests upon the second side portion [126*b*] of the ridge [158]

wherein the insulated inner box [124] formed from an inner box blank [400] defining an inside surface and an outside surface, wherein the inside surface is coated with a repulpable insulating film [12];

wherein the insulated inner box blank [400] comprises a side panel [126] defining a first top side [126*b*] and a second side [331] adjacent to the first top side [126*b*], a first top flap [126*a*] extending from at least a portion of the first top side [126*b*] of the side panel [126], the first top flap [126*a*] joined to the side panel along a first fold line [126*b*] defining a joint between the first top flap [126*a*] and the side panel [126], the first top flap [126*a*] defining a first top flap edge [356] opposite the first fold line [126*b*], a first side, and a second side [362] opposite the first side [361], an end panel [130] extending from at least a portion of the second side [331] of the side panel [126], the end panel [130] joined to the side panel [126] along a second fold line [331], the second fold line [331] defining a joint between the side panel [126] and the end panel [130], the second fold line [331] further defining a first side of the end panel [130], the end panel [130] further defining a second side [130*b*] adjacent to the second fold line [331], and a second top flap [130*a*] extending from at least a portion of the second side [130*b*] of the end panel [130], the second top flap [130*a*] joined to the end panel [130] along a third fold line [130*b*] defined by the second side [130*b*] of the end panel [130], the third fold line [130*b*] defining a joint between the end panel [130] and the second top flap [130*a*], the second top flap [130*a*] defining a second top flap edge [364] opposite the third fold line [130*b*], a first side [366], and a second side opposite the first side [366], the second side of the second top flap [130*a*] defined by the first side [361] of the first top flap [126*a*], wherein the first side [361] of the first top flap [126*a*] defines a first cut-out section [358] extending downwardly from the first top flap edge [356] and the second top flap edge [364], a second cut-out section [359] axially spaced from the first cut-out section [358], the second cut-out section forming a partial gap between the first top flap [126*a*] and the second top flap [130*a*], and a fourth fold line [360] axially extending between the first cut-out section [358] and the second cut-out section [359], the fourth fold line [360] defining a joint between the first top flap [126*a*] and the second top flap [130*a*].

2. The shipping assembly [3000] of claim 1, wherein the core surface [505*a,b*] is a first core surface [505*a*], the insulation batt core [505] defines a second core surface [505*b*], and the sheet layer [518,520] is a first sheet layer [518]; and further comprising a second sheet layer [520] attached to the second core surface [505*b*].

3. The shipping assembly [3000] of claim 1, wherein the closed box [122] of the bottom insulator box assembly [122'] further defines a closed box inside surface coated with a repulpable insulating film [12].

4. The shipping assembly [3000] of claim 1, further comprising a bottom insulation batt element [200] positioned within the bottom insulator box cavity [152].

5. The shipping assembly [3000] of claim 1, wherein the insulated inner box [124] further defines an insulated inner box inside surface coated with a repulpable insulating film [12].

6. The shipping assembly [3000] of claim 1, wherein the top insulator box [134] further comprises:

an end panel [140] defining a first side [424], a second side [426] opposite the first side [424], a third side [450], and a fourth side [452] opposite the third side [450];

a bottom panel [137] extending from at least a portion of the second side [426] of the end panel [140], the bottom panel [137] joined to the end panel [140] along a third fold line [426] defining a joint between the bottom panel [137] and the end panel [140], the bottom panel [137] defining a first side along the third fold line [426], a second side [428] opposite the third fold line [426], a third side [430], and a fourth side [432] opposite the third side [430];

a first side panel [136] extending from at least a portion of the third side [430] of the bottom panel [137];

a second side panel [138] extending from at least a portion of the fourth side [432] of the bottom panel [137]; and a front panel [142] extending from at least a portion of the second side [428] of the bottom panel [137], the front panel [142] defining a front of the top insulator box;

wherein the top panel [135] of the top insulator box [134] defines a first side [424], a second side [422] opposite the first side [424], a third side [210], and a fourth side [212] opposite the third side [210]; and wherein a first width [W1] of the top panel [135] is greater than a second width [W2] of the front [142] of the top insulator box [134], such that the third side [210] of the top panel [135] extends laterally beyond the first side panel [136] to define the first overhang portion [O1] of the top panel [135], and such that the fourth side [212] of the top panel [135] extends laterally beyond the second side panel [138] to define the second overhang portion [O2] of the top panel [135].

7. The shipping assembly [3000] of claim 1, wherein the top insulator box [134] of the top insulator box assembly [134'] further defines a top insulator box inside surface coated with a repulpable insulating film [12].

8. The shipping assembly [3000] of claim 1, wherein the top insulator box assembly [134'] further comprises a top insulation batt element [201] positioned within the top insulator box cavity [139].

9. The shipping assembly [3000] of claim 1, wherein an assembled state of the insulated inner box [124] is defined by the first top flap [126*a*] assuming a downwardly folded position about the first fold line [126*b*] with respect to the side panel [126] such that an exterior surface of the first top flap [126*a*] faces an exterior surface of the side panel [126] to expose a coated inner surface of the first top flap [126*a*];

the second top flap [130*a*] assuming a downwardly folded position about the third fold line [130*b*] with respect to the end panel [130] such that an exterior surface of the second top flap [130*a*] faces an exterior surface of the end panel [130] to expose a coated inner surface of the second top flap [130*a*];

the side panel [126] and the end panel [130] assuming a folded position about the second fold line [331] such that the side panel [126] and the end panel [130] are oriented perpendicularly with respect to each other, and such that the first fold line [126*b*] and the third fold line [130*b*] together at least partially define a ridge [158] of the insulated inner box [124]; and the first top flap [126*a*] and the second top flap [130*a*] assuming a folded position about the fourth fold line [360] such that the first top flap [126*a*] and the second top flap [130*a*] are oriented perpendicularly with respect to each other.

10. The shipping assembly [3000] of claim 1, wherein the side panel is a first side panel [126], the first side panel [126] further defining a third side [133] opposite the second fold line [331], and the end panel is a first end panel [130], the first end panel [130] further defining a second side [333] opposite the second fold line [331]; and the insulated inner box [124] further comprises:

a second side panel [128] extending from at least a portion of the second side [333] of the first end panel [130], the second side panel [128] joined to the first end panel [130] along a fifth fold line [333], the fifth fold line [333] defining a joint between the second side panel [128] and the first end panel [130], the second side panel [128] defining an end [131] opposite the fifth fold line [333]; and a second end panel [132] extending from at least a portion of the third side [133] of the first side panel [126], the second end panel [132] joined to the first side panel [126] along a sixth fold line [133], the sixth fold line [133] defining a joint between the second end panel [132] and the first side panel [126], the second end panel [132] defining a panel edge [325] opposite the sixth fold line [133].

11. The shipping assembly [3000] of claim 10, wherein the insulated inner box [124] further comprises a side panel connection tab [327] extending from at least a portion of the end [131] of the second side panel [128], the side panel connection tab [327] configured to attach to a surface of the second end panel [132] when the insulated inner box [124] is assembled.

12. A shipping assembly [3000] for transporting refrigerated items, comprising:

an outer box [102] defining a bottom [112] and an outer box cavity [113];

a bottom insulator box assembly [122'] received in the outer box cavity [113] and superposed above the bottom [112] of the outer box [102], the bottom insulator box assembly [122'] comprising a closed box [122] defining a bottom insulator box cavity [152];

an insulated inner box [124] positioned in the outer box cavity [113] above the bottom insulator box assembly [122'], the insulated inner box [124] defining an inner box cavity, [156], an outer periphery [3500] and a ridge [158];

an insulation wrap [500] positioned in the outer box cavity [113], the insulation wrap [500] surrounding the outer periphery [3500] of the insulated inner box [124], the insulation wrap [500] comprising an insulation batt core [505] defining a core surface [505*a,b*] and a sheet layer [518,520] attached to the core surface [505*a,b*]; and a top insulator box assembly [134'], comprising a top insulator box [134], wherein the top insulator box [134] defines a top insulator box cavity [139], the top insulator box [134] comprising a top panel [135] defining a first overhang portion [O1] and a second overhang portion [O2];

wherein the ridge [158] of the insulated inner box [124] defines ridge end portions [130*b*,132*b*] comprising a front ridge portion [130*b*] and an opposed rear ridge portion [132*b*], a first side portion [126*b*] extending between the ridge end portions [130*b*,132*b*], and a second side portion [128*b*] extending between the ridge end portions [130*b*,132*b*] opposite the first side portion [126]; and wherein the first overhang portion [O1] of the top panel [135] rests upon the first side portion [126*b*] of the ridge [158] and the second overhang portion [O2] of the top panel [135] rests upon the second side portion [126*b*] of the ridge [158]

wherein the outer box [102] comprises an outer box side panel [104] defining a first side [103], an end panel [108] extending from at least a portion of the first side [103] of the outer box side panel [104], the end panel [108] joined to the outer box side panel [104] along a first fold line [103], the first fold line [103] defining a joint between the outer box side panel [104] and the end panel [108], the end panel [108] further defining a second fold line [3161] at a top side of the end panel [108], and a ridge panel [3119] extending from at least a portion of the second fold line [3161], the second fold line [3161] defining a joint between the end panel [108] and the ridge panel [3119], the ridge panel [3119] defining an elongated side [3179] opposite the second fold line [3161], a first end [3175] extending between the second fold line [3161] and the elongated side [3179], a second end [3177] opposite the first end [3175], the second end [3177] also extending between the second fold line [3161] and the elongated side [3179];

wherein the ridge panel [3119] of the outer box [102] covers at least a portion of the ridge [158] of the insulated inner box [124]; and wherein the second end [3177] of the ridge panel [3119] frictionally engages at least a portion of an inside surface [104*a*] of the outer box side panel [104].

13. The shipping assembly [3000] of claim 12, wherein the outer box [102] further comprises a retention flap [3118] extending from a portion of the elongated side [3179] of the ridge panel [3119], the portion of the elongated side [3179] defining a third fold line [3163], the third fold line [3163] defining a joint between the retention flap [3118] and the ridge panel [3119];

wherein the retention flap [3118] engages the insulated inner box [124] such that the insulated inner box [124] is spaced from the outer box side panel [104] by a gap distance [3501].

14. The shipping assembly [3000] of claim 13, wherein the insulated inner box [124] further comprises an end panel [130], and wherein the retention flap [3118] engages a portion of the end panel [130] when the retention flap [3118] is oriented in a fully closed position.

15. The shipping assembly [3000] of claim 13, wherein the retention flap [3118] defines an edge [3171];

wherein a shoulder portion [3179*a*] extends along the elongated side [3179] for a length measured from the first end [3175] of the ridge panel [3119] to the edge [3171] of the retention flap [3118]; and wherein the gap distance [3501] substantially equals the length of the shoulder portion [3179*a*] of the ridge panel [3119].

16. The shipping assembly [3000] of claim 13, wherein the insulated inner box [124] further comprises an inner box side panel [126], the inner box side panel [126] defining an inside surface;

wherein the retention flap [3118] of the outer box [102] defines an edge [3171]; and wherein the edge [3171] frictionally engages a portion of the inside surface of the inner box side panel [126].

17. A method of assembling a shipping assembly [3000] for transporting refrigerated items, comprising the steps of:

moving into an open position top flaps [114,116], a rear flap [3125], and a front flap [3127] of an outer box [102], the outer box [102] comprising:

a first outer box side panel [104] and an opposed second outer box side panel [106], a rear panel [108], and a front panel [110], the first outer box side panel [104], the second outer box side panel [106], the rear panel [108], and the front panel [110] together at least partially defining an outer box cavity [113], the rear panel [108] joined to the outer box side panel [104] along a first fold line [103], the first fold line [103] defining a joint between the outer box side panel [104] and the rear panel [108], the rear panel [108] further defining a second fold line [3161] at a top side of the rear panel [108];

a ridge panel [3119] extending from at least a portion of the second fold line [3161], the second fold line [3161] defining a joint between an end panel and the ridge panel [3119], the ridge panel [3119] defining an elongated side [3179] opposite the second fold line [3161], a first end [3175] extending between the second fold line [3161] and the elongated side [3179], a second end [3177] opposite the first end [3175], the second end [3177] also extending between the second fold line [3161] and the elongated side [3179];

wherein the ridge panel [3119] of the outer box [102] covers at least a portion of the ridge [158] of the insulated inner box [124]; and wherein the second end [3177] of the ridge panel [3119] frictionally engages at least a portion of an inside surface [104*a*] of the outer box side panel [104];

inserting a bottom insulator box assembly [122'] into the outer box cavity [113];

inserting an insulated inner box [124] into the outer box cavity [113] above the bottom insulator box assembly [122'], the insulated inner box [124] defining an outer periphery [3500] and comprising a rear panel [132];

positioning an insulation wrap [500] about the outer periphery [3500] of the insulated inner box [124]; and pivoting the rear flap [3125] and the front flap [3127] of the outer box [102] inwardly toward a closed position until the rear flap [3125] and the front flap [3127] engage the insulated inner box [124] to restrain the insulated inner box [124] within the outer box cavity [113], such that the rear panel [132] of the insulated inner box [124] is spaced from the first outer box side panel [104] by a gap distance [3501].

18. The method of claim 17, wherein the insulation wrap [500] comprises an insulation batt core [505] defining a core surface [505*a,b*] and a sheet layer [518,520] attached to the core surface [505*a,b*].

19. The method of claim 17, wherein the step of positioning the insulation wrap [500] about the outer periphery [3500] of the insulated inner box [124] is performed before the step of inserting the insulated inner box [124] into the outer box cavity [113], such that the insulated inner box [124] with the insulation wrap [500] surrounding it are together inserted into the outer box cavity [113].

* * * * *